United States Patent
Fukagawa et al.

(10) Patent No.: US 7,976,914 B2
(45) Date of Patent: Jul. 12, 2011

(54) RESIN FILM, PRODUCTION METHOD THEREOF, POLARIZING PLATE AND LIQUID CRYSTAL DISPLAY DEVICE

(75) Inventors: Nobutaka Fukagawa, Kanagawa (JP); Mamoru Sakurazawa, Kanagawa (JP); Shigeki Uehira, Kanagawa (JP); Masaki Noro, Kanagawa (JP)

(73) Assignee: Fujifilm Corporaton, Minato-Ku, Tokyo (JP)

( * ) Notice: Subject to any disclaimer, the term of this patent is extended or adjusted under 35 U.S.C. 154(b) by 1061 days.

(21) Appl. No.: 11/812,255

(22) Filed: Jun. 15, 2007

(65) Prior Publication Data
US 2007/0290168 A1    Dec. 20, 2007

(30) Foreign Application Priority Data
Jun. 16, 2006    (JP) ................... 2006-167880

(51) Int. Cl.
*G02F 1/335*    (2006.01)
*G02F 1/13363*    (2006.01)

(52) U.S. Cl. ........... 428/1.3; 349/96; 349/118; 428/1.31

(58) Field of Classification Search .................. 428/1.3, 428/1.31, 1.5, 1.54; 349/96, 117–118
See application file for complete search history.

(56) References Cited

U.S. PATENT DOCUMENTS
6,771,340 B1 * 8/2004 Yoshimi et al. ............... 349/118
2002/0041352 A1 * 4/2002 Kuzuhara et al. ............. 349/117

FOREIGN PATENT DOCUMENTS
| JP | 2002-022941 A | 1/2002 |
| JP | 2003-292639 A | 10/2003 |
| JP | 2003-121641 A | 4/2004 |
| JP | 2006-323329 A | 11/2006 |
| WO | WO 03/032060 A1 | 4/2003 |
| WO | WO 2006030954 A1 * | 3/2006 |

* cited by examiner

*Primary Examiner* — Sophie Hon
(74) *Attorney, Agent, or Firm* — Buchanan Ingersoll & Rooney PC

(57) ABSTRACT

A resin film has a photoelastic coefficient of from 0 to $30 \times 10^{-8}$ cm$^2$/N; and Re satisfying the following formulae (1) to (4):

| 20 nm<$Re(548)$<300 nm | Formula (1): |
| $0.5 < Re(446)/Re(548) < 1$ | Formula (2): |
| $1.0 < Re(629)/Re(548) < 2.0$ | Formula (3): |
| $0.1\% \leq [\{Re(548)$ at 25° C., 10% $RH - Re(548)$ at 25° C., 80% $RH\}/Re(548)$ at 25° C., 60% $RH] \leq 20\%$, | Formula (4): | wherein $Re(\lambda)$ represents an in-plane retardation at a wavelength of $\lambda$.

7 Claims, 2 Drawing Sheets

Fig. 1
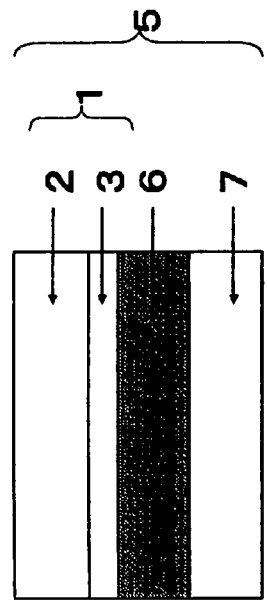
Fig. 1C
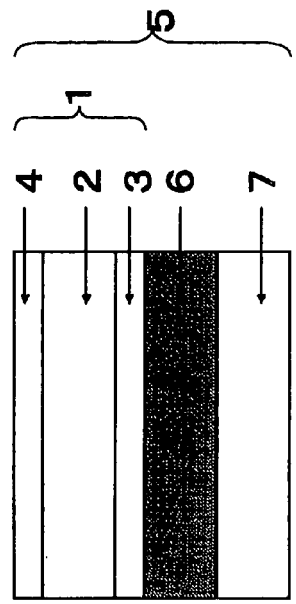
Fig. 1D
INNER SIDE OF MOISTURE-RESISTANT LAYER
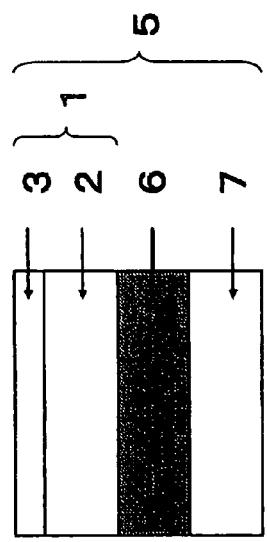
Fig. 1A
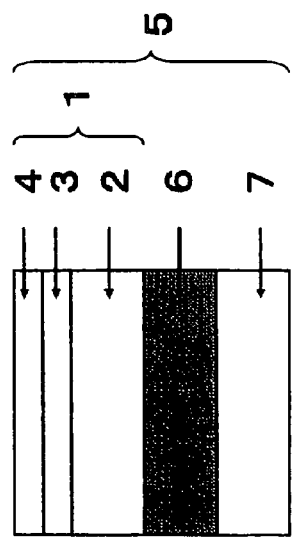
Fig. 1B
OUTER SIDE OF MOISTURE-RESISTANT LAYER

RESIN FILM, PRODUCTION METHOD THEREOF, POLARIZING PLATE AND LIQUID CRYSTAL DISPLAY DEVICE

BACKGROUND OF THE INVENTION

1. Field of the Invention

The present invention relates to a resin film, a production method thereof, a polarizing plate using the resin film, and a liquid crystal display device.

2. Description of the Related Art

The usage of a liquid crystal display device is being broadened year by year as a space-saving image display device with low power consumption. Conventionally, the large viewing angle dependency of image is a great defect of the liquid crystal display device. However, in recent years, a liquid crystal mode assured of high viewing angle by a VA mode is put into practical use and by virtue of this mode, the demand for a liquid crystal display device is abruptly expanding also on the market requiring a high-quality image, such as television.

The VA-mode liquid crystal display device is advantageous in that the contrast is generally high as compared with other liquid crystal display modes, but there is a problem that the contrast and tint are greatly changed depending on the viewing angle. For solving this problem, a method of using two kinds of retardation layers differing in the optical properties and thereby obtaining a VA-mode liquid crystal display device where the black display is clear and achromatic even when viewed from an oblique direction, is disclosed (see, for example, JP-A-2003-121641 and JP-A-2006-323329 (the term "JP-A" as used herein means an "unexamined published Japanese patent application")).

Furthermore, in International Publication No. 2003/032060 pamphlet, a method of improving a tint change depending on the viewing angle by combining an A plate with Re becoming smaller on the shorter wavelength side and a C plate with Rth becoming larger on the shorter wavelength side is proposed.

Particularly, as for the A plate of which Re becomes smaller on the shorter wavelength side, in addition to the stretched film of modified polycarbonate described in International Publication No. 2003/032060 pamphlet, for example, a stretched cellulose acylate film is proposed in JP-A-2002-22941 and a stretched film of modified norbornene resin is proposed in JP-A-2003-292639.

SUMMARY OF THE INVENTION

However, the stretched film of modified polycarbonate of International Publication No. 2003/032060 pamphlet and the stretched film of modified norbornene of JP-A-2003-292639 have a large photoelastic coefficient and are disadvantageous in that the adhesion to a polyvinyl alcohol used for the polarizer is difficult to ensure and when the display is lighted for a long time under high-temperature high-humidity conditions, large display unevenness occurs. In the case of the stretched cellulose acylate film of JP-A-2002-22941, there is a problem that due to large humidity dependency of retardation, when the display is lighted for a long time under high-temperature high-humidity conditions, light leakage or tint change occurs. Thus, improvements are demanded.

The present invention provides a resin film with Re having specific wavelength-dispersion characteristics, which is assured of small photoelastic coefficient, excellent adhesion to the polarizer and low humidity dependency of retardation, and a production method thereof.

The present invention also provides a polarizing plate and a liquid crystal display device, where by virtue of using the resin film, tint change depending on the viewing angle is small and even when used under high-temperature high-humidity conditions, display unevenness, light leakage and tint change scarcely occur.

These objects can be attained by the following means.

[1] A resin film having:
a photoelastic coefficient of from 0 to $30 \times 10^{-8}$ cm$^2$/N; and
Re satisfying the following formulae (1) to (4):

$$20 \text{ nm} < Re(548) < 300 \text{ nm} \qquad \text{Formula (1):}$$

$$0.5 < Re(446)/Re(548) < 1 \qquad \text{Formula (2):}$$

$$1.0 < Re(629)/Re(548) < 2.0 \qquad \text{Formula (3):}$$

$$0.1\% \leq [\{Re(548) \text{ at } 25° \text{ C.}, 10\% \text{ } RH - Re(548) \text{ at } 25° \text{ C.}, 80\% \text{ } RH\}/Re(548) \text{ at } 25° \text{ C.}, 60\% \text{ } RH] \leq 20\%, \qquad \text{Formula (4)}$$

wherein Re(λ) represents an in-plane retardation at a wavelength of λ.

[2] The resin film as described in [1], having:
Re and a film thickness satisfying the following formula (5):

$$0.00125 < Re(548)/\text{film thickness} < 0.00700 \qquad \text{Formula (5)}$$

[3] The resin film as described in [1], comprising:
at least one liquid crystalline compound in an amount of 0.1 to 30 mass %,
wherein a mass ratio of the liquid crystalline compound to all additives is from 40 to 100 mass %.

[4] The resin film as described in [3], comprising:
a mixture of two or more kinds of liquid crystalline compounds in an amount of 0.1 to 30 mass %,
wherein a mass ratio of the two or more kinds of liquid crystalline compounds to all additives is from 50 to 100 mass %.

[5] The resin film as described in [4],
wherein the two or more kinds of liquid crystalline compounds in an amount of 0.1 to 30 mass % comprises:
a compound represented by formula (I) in an amount of 0.1 to 30 mass %; and
a rod-like compound represented by formula (i) in an amount of 0.1 to 30 mass %:

Formula (I):

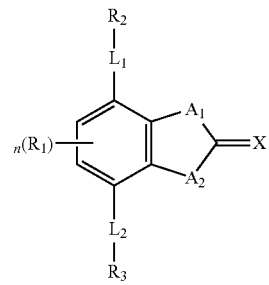

wherein L$_1$ and L$_2$ each independently represents a single bond or a divalent linking group,
A$_1$ and A$_2$ each independently represents a group selected from the group consisting of —O—, —NR—, —S— and —CO—, wherein R represents a hydrogen atom or a substituent
R$_1$, R$_2$ and R$_3$ each independently represents a substituent,
X represents an atom of Group 6, 5 or 4, and n represents an integer of 0 to 2; and $$Ar^1\text{-}L^2\text{-}X\text{-}L^3\text{-}Ar_2 \qquad \text{Formula (i)}$$

wherein $Ar^1$ and $Ar^2$ each independently represents an aromatic group, $L^2$ and $L^3$ each independently represents a divalent linking group selected from the group consisting of a —O—CO— group and a —CO—O— group, and X represents 1,4-cyclohexylene group, a vinylene group or an ethynylene group.

[6] The resin film as described in [1], comprising:
a cellulose acylate as a main component.

[7] A polarizing plate comprising:
a polarizer; and
two protective films, between which the polarizer is sandwiched,
wherein at least one of the two protective films is the resin film as described in [1].

[8] A liquid crystal display device comprising:
a liquid crystal cell; and
two polarizing plates, between which the liquid crystal cell is sandwiched, and each of which comprises:
a polarizer; and
two protective films, between which the polarizer is sandwiched,
wherein at least one of two protective films on the liquid crystal cell side of the four protective films is the resin film as described in [1].

[9] A liquid crystal display device comprising:
a liquid crystal cell; and
two polarizing plates, between which the liquid crystal cell is sandwiched, and each of which comprises:
a polarizer; and
two protective films, between which the polarizer is sandwiched,
wherein one of two protective films on the liquid crystal cell side of the four protective films is the resin film as described in [1], and
the other of two protective films on the liquid crystal cell side of the four protective films satisfies the following formulae (8) to (12):

$$0 \text{ nm} < Re(548) < 10 \text{ nm} \qquad \text{Formula (8):}$$

$$100 \text{ nm} < Rth(548) < 300 \text{ nm} \qquad \text{Formula (9):}$$

$$10 < Rth(548)/Re(548) \qquad \text{Formula (10):}$$

$$1.0 < Rth(446)/Rth(548) < 2.0 \qquad \text{Formula (11):}$$

$$0.5 < Rth(629)/Rth(548) < 1.0, \qquad \text{Formula (12):}$$

wherein $Re(\lambda)$ represents an in-plane retardation at a wavelength of $\lambda$, and
$Rth(\lambda)$ represents a retardation in a thickness-direction at a wavelength of $\lambda$.

[10] The liquid crystal display device as described in [8], wherein the liquid crystal cell is a VA-mode liquid crystal cell.

BRIEF DESCRIPTION OF THE DRAWINGS

FIGS. 1A, 1B, 1C and 1D schematically show examples of the construction of the moisture-resistant layer preferably used in the liquid crystal display device of the present invention, wherein 1 denotes Protective film for polarizing plate, 2 denotes Transparent substrate film, 3 denotes Coat layer, 4 denotes Layer having hardcoat property, 5 denotes Polarizing plate, 6 denotes Polarizer, 7 denotes Protective film for polarizing plate on the opposite side, 8 denotes Liquid crystal display device, and 9 denotes Liquid crystal cell.

DETAILED DESCRIPTION OF THE INVENTION

Retardation of Film

Figure 2:
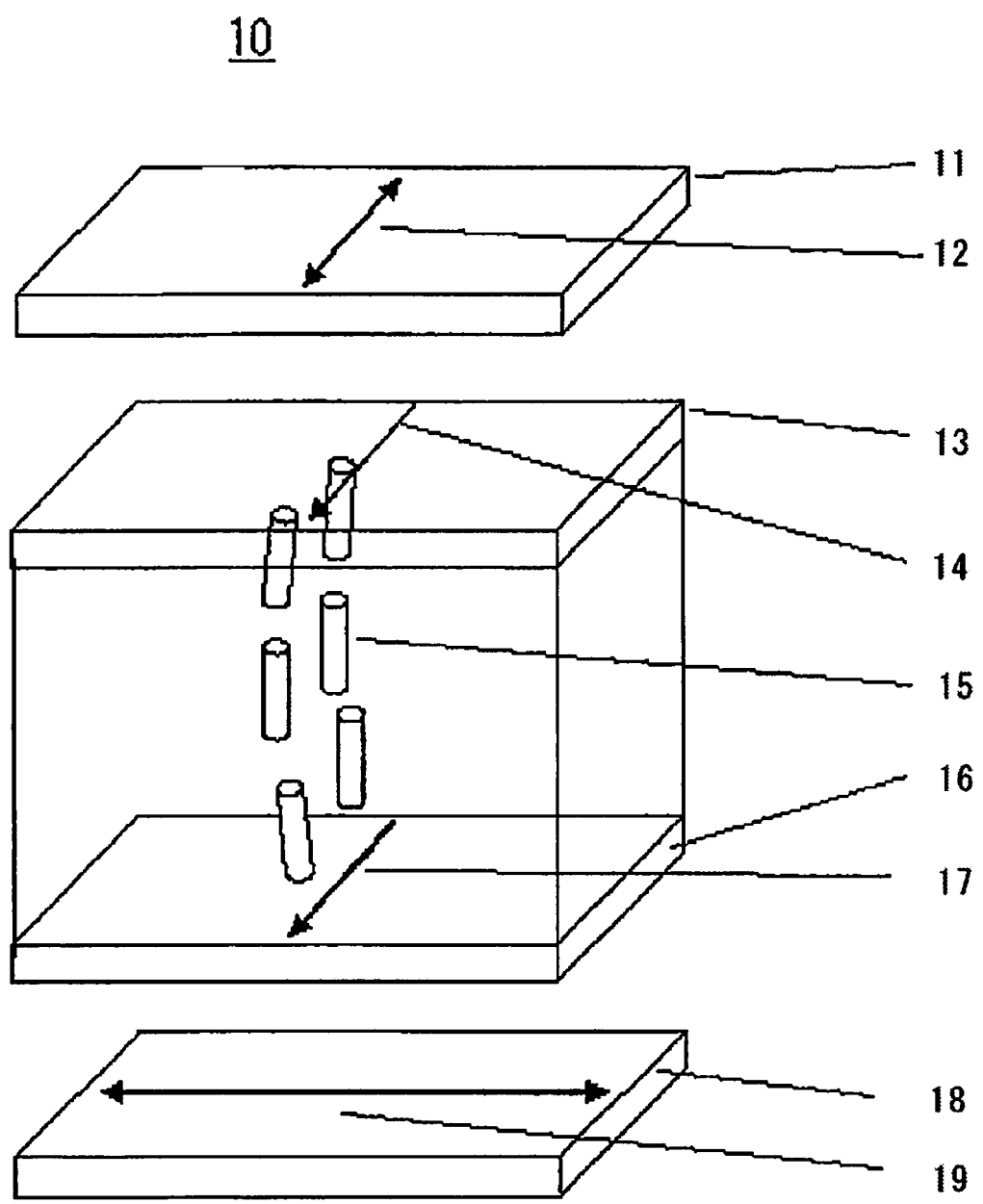
FIG. 2 schematically shows an example of the liquid crystal display device of the present invention, wherein 10 denotes Liquid crystal display device, 11 denotes Upper polarizing plate, 12 denotes Direction of absorption axis of upper polarizing plate, 13 Liquid crystal cell upper electrode substrate, 114 denotes Orientation control direction of upper substrate, 15 denotes Liquid crystal layer, 16 denotes Liquid crystal cell lower electrode substrate, 17 denotes Orientation control direction of lower substrate, 18 denotes Lower polarizing plate, and 19 denotes Direction of absorption axis of lower polarizing plate.

The reverse-dispersion resin film of the present invention (sometimes referred to as a "reverse-dispersion film" or an "Re reverse-dispersion film") satisfies the relationships of the following formulae (1) to (5).

$$20 \text{ nm} < Re(548) < 300 \text{ nm} \qquad \text{Formula (1):}$$

$$0.5 < Re(446)/Re(548) < 1 \qquad \text{Formula (2):}$$

$$1.0 < Re(629)/Re(548) < 2.0 \qquad \text{Formula (3):}$$

$$0.00125 < Re(548)/\text{film thickness (μm)} < 0.00700 \qquad \text{Formula (4)}$$

$$0.1\% \leq [\{(Re(548) \text{ at } 25° \text{ C.-}10\% \text{ } RH - Re(548) \text{ at } 25° \text{ C.-}80\% \text{ } RH)\}/Re(548) \text{ at } 25° \text{ C.-}60\% \text{ } RH] \leq 20\% \qquad \text{Formula (5)}$$

In formula (1), Re(548) is preferably from 30 to 200 nm, more preferably from 50 to 150 nm.

In formula (2), Re(446)/Re(548) is preferably from 0.55 to 0.95, more preferably from 0.60 to 0.90.

In formula (3), Re(629)/Re(548) is preferably from 1.01 to 1.5, and most preferably from 1.03 to 1.2.

By virtue of controlling the retardation of the resin film to fall in the above-described ranges, a film assured of small tint change can be obtained.

In formula (4), Re(548)/film thickness is preferably from 0.00150 to 0.00650, and most preferably from 0.00170 to 0.00600.

In formula (5), [{Re(548) at 25° C.-10% RH−Re(548) at 25° C.-80% RH}/Re(548) at 25° C.-60% RH] is preferably from 0.1 to 10%.

By virtue of using a resin film of which Re humidity dependency is set to the above-described ranges, a liquid crystal display device scarcely causing light leakage even when lighted for a long time under the high-humidity condition can be obtained.

In the present invention, $Re(\lambda)$ and $Rth(\lambda)$ indicate the in-plane retardation and the retardation in a thickness-direction, respectively, at a wavelength of $\lambda$. $Re(\lambda)$ is measured by making light at a wavelength of $\lambda$ nm to be incident in the film normal direction in KOBRA 21ADH or WR (manufactured by Oji Scientific Instruments).

In the case where the film measured is a film represented by a uniaxial or biaxial refractive index ellipsoid, the $Rth(\lambda)$ is calculated by the following method.

The above-described $Re(\lambda)$ is measured at 6 points in total by making light at a wavelength of $\lambda$ nm to be incident from directions inclined with respect to the film normal direction in 10° steps up to 50° on one side from the normal direction with the in-plane slow axis (judged by KOBRA 21ADH or WR) being used as the inclination axis (rotation axis) (when the slow axis is not present, an arbitrary direction in the film plane is used as the rotation axis) and based on the retardation values measured, the assumed values of average refractive index and the film thickness values input, Rth(λ) is calculated by KOBRA 21ADH or WR.

In the above, when the film has a direction where the retardation value becomes zero at a certain inclination angle from the normal direction with the rotation axis being the in-plane slow axis, the retardation value at an inclination angle larger than that inclination angle is calculated by KOBRA 21ADH or WR after converting its sign into a negative sign.

Incidentally, after measuring the retardation values from two arbitrary inclined direction by using the slow axis as the inclination axis (rotation axis) (when the slow axis is not present, an arbitrary direction in the film plane is used as the rotation axis), based on the values obtained, the assumed values of average refractive index and the film thickness values input, Rth can also be calculated according to the following formulae (21) and (22).

$$Re(\theta) = \left[ nx - \frac{(ny \times nz)}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (21)

Note:

In formula (21), Re(θ) represents a retardation value in the direction inclined at an angle of θ from the normal direction, nx represents a refractive index in the in-plane slow axis direction, ny represents a refractive index in the direction crossing with nx at right angles in the plane, nz represents a refractive index crossing with nx and ny at right angle, and d represents a thickness of the film.

$$Rth = ((nx+ny)/2 - nz) \times d$$

Formula (22)

In the case where the film measured is a film incapable of being represented by a uniaxial or biaxial refractive index ellipsoid or a film having no optic axis, Rth(λ) is calculated by the following method.

The Re(λ) is measured at 11 points by making light at a wavelength of λ nm to be incident from directions inclined with respect the film normal direction in 10° steps from −50° to +50° with the in-plane slow axis (judged by KOBRA 21ADH or WR) being used as the inclination axis (rotation axis) and based on the retardation values measured, the assumed values of average refractive index and the film thickness values input, Rth(λ) is calculated by KOBRA 21ADH or WR.

In the measurement above, as for the assumed value of average refractive index, those described in *Polymer Handbook* (John Wiley & Sons, Inc.) and catalogues of various optical films can be used. The average refractive index of which value is unknown can be measured by an Abbe refractometer. The values of average refractive index of main optical films are as follows: cellulose acylate (1.48), cycloolefin polymer (1.52), polycarbonate (1.59), polymethyl methacrylate (1.49) and polystyrene (1.59). When such an assumed value of average refractive index and the film thickness are input, KOBRA 21ADH or WR calculates nx, ny and nz and from these calculated nx, ny and nz, Nz=(nx−nz)/(nx−ny) is further calculated.

The term "Re having large reverse dispersion" as used in the present invention indicates that the value of Re(446)/Re(548) is made small and the value of Re(629)/Re(548) is made large.

As regards the Re reverse-dispersion film for use in the present invention, various resin films can be used.

The Re reverse-dispersion film for use in the present invention has a structure allowing the refractive index to become maximum in the direction nearly parallel to the film stretching direction (hereinafter referred to as a positive intrinsic birefringence component) and a structure allowing the refractive index to become maximum in the direction nearly perpendicular to the film stretching direction (hereinafter referred to as a negative intrinsic birefringence component), wherein the negative intrinsic birefringence component has an absorption maximum on the longer wavelength side than the positive intrinsic birefringence component. In the present invention, the positive intrinsic birefringence component and the negative intrinsic birefringence component may be possessed by a polymer or an additive.

In order to reduce the contrast change and tint change depending on the viewing angle, Re needs to be made large while maintaining the reverse dispersion. For realizing this, there are two methods of (1) using a structure having a large intrinsic birefringence (that is, a large polarizability anisotropy) for both the positive intrinsic birefringence component and the negative intrinsic birefringence component, and (2) increasing the orientation degree.

Out of these methods, the method of (1) has a problem that when a structure having a large intrinsic birefringence is incorporated into a polymer, the photoelasticity increases and in the case where a liquid crystal display device having incorporated thereinto the resin film is placed under high-temperature high-humidity conditions, large light leakage occurs. The method of (2) is liable to bring about large Re change due to ambient humidity. These problems are serious particularly in a hydrophilic polymer having sufficiently high adhesion to a polyvinyl alcohol used for a polarizer, such as cellulose acylate.

Accordingly, for obtaining a resin film having large Re reverse dispersion, small photoelastic coefficient and small humidity dependency of Re, a positive intrinsic birefringence component and a negative intrinsic birefringence component are preferably incorporated into both the polymer and the additive and complementarily used with each other.

[Photoelasticity of Resin Film]

The photoelastic coefficient of the resin film of the present invention is preferably from 0 to $30 \times 10^{-8}$ cm$^2$N, more preferably from 0 to $20 \times 10^{-8}$ cm$^2$/N. When the photoelastic coefficient of the resin film is in the above-described range, this provides an effect of enabling reduction in the light leakage of a liquid crystal display device when lighted for a long time under high-humidity and high-temperature conditions.

The photoelastic coefficient can be determined by preparing a film cut out into a size of 3.5 cm×12 cm and a thickness of 30 to 150 µm and measuring Re at a wavelength of 630 nm without a load or under a load of 250 g, 500 g, 1,000 g or 1,500 g and calculated from the gradient of a straight line of the Re change with respect to the stress. As for the measuring device, an ellipsometer (M150, manufactured by JASCO Corporation) is used.

As described above, when a structure having a large polarizability anisotropy is introduced into a polymer for increasing the Re developability, the photoelastic coefficient of the resin film becomes large, but in the case of an additive, even when a substituent having a large polarizability anisotropy is introduced, the change in the photoelastic coefficient of the resin film is small. By combining a polymer having a small photoelastic coefficient with an additive having a large polarizability anisotropy, a resin film having a large Re and a small photoelastic coefficient can be obtained.

[Polymer]

As regards the polymer for use in the Re reverse-dispersion film of the present invention, for example, a norbornene-based polymer, a cellulose acylate-based polymer, a polyvinyl alcohol derivative polymer and an aliphatic polycarbonate-based polymer can be preferably used. Among these, a cellulose acylate-based polymer is preferred, because this polymer has both a positive intrinsic birefringence component and a negative intrinsic birefringence component and at the same time, is assured of small photoelastic coefficient and high affinity for a polyvinyl alcohol used for the polarizer.

The cellulose acylate for use in the present invention is described in detail below. Hereinafter, a resin film comprising a cellulose acylate as a main component is sometimes referred to as an Re reverse-dispersion cellulose acylate film.

[Cellulose Acylate]

The substitution degree of cellulose acylate means a proportion at which three hydroxyl groups present in the cellulose constituent unit (glucose bonded to (β)1,4-glycoside) are acylated. The substitution degree (acylation degree) can be calculated by measuring the amount of a fatty acid bonded per the constituent unit mass of cellulose. In the present invention, the substitution degree of a cellulose form can be calculated by dissolving the cellulose form in a solvent such as deuterium-substituted dimethylsulfoxide, measuring the $C^{13}$-NMR spectrum, and determining the substitution degree from the peak intensity ratio of carbonyl carbons in the acyl group.

The cellulose acylate for use in the present invention is preferably a cellulose acetate having an acylation degree of 2.00 to 2.98. The acylation degree is more preferably from 2.70 to 2.97, most preferable from 2.86 to 2.97. The ratio of the acylation degree at the 6-position to the entire acylation degree is preferably 0.25 or more, more preferably 0.3 or more.

In the present invention, another preferred cellulose acylate is a mixed fatty acid ester having an acylation degree of 2 to 2.95 and having an acetyl group and an acyl group having a carbon number of 3 to 4. The acylation degree of the mixed fatty acid ester is more preferably from 2.2 to 2.85, and most preferably from 2.4 to 2.8. Also, the acetylation degree is preferably less than 2.5, more preferably less than 1.9.

In the present invention, still another preferred cellulose acylate is a mixed acid ester having an aliphatic acyl group and a substituted or unsubstituted aromatic acyl group. Here, the substituted or unsubstituted aromatic acyl group includes a compound represented by the following formula (A).

Formula (A):

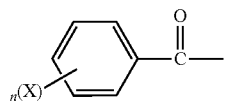

Formula (A) is described below. In formula (A), X represents a substituent. Examples of the substituent include a halogen atom, a cyano, an alkyl group, an alkoxy group, an aryl group, an aryloxy group, an acyl group, a carbonamido group, a sulfonamido group, a ureido group, an aralkyl group, a nitro, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an aryloxysulfonyl group, —S—R, —NH—CO—OR, —PH—R, —P(—R)$_2$, —PH—O—R, —P(—R)(—O—R), —P(—O—R)$_2$, —PH(=O)—R—P(=O)(—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$. In the above, R is an aliphatic group, an aromatic group or a heterocyclic group.

In formula (A), n is the number of substituents and represents an integer of 0 to 5. The number of substituents (n) is preferably from 1 to 5, more preferably from 1 to 4, still more preferably from 1 to 3, and most preferably 1 or 2. Among those substituents, a halogen atom, a cyano, an alkyl group, an alkoxy group, an aryl group, an aryloxy group, an acyl group, a carbonamido group, a sulfonamido group and a ureido group are preferred, a halogen atom, a cyano, an alkyl group, an alkoxy group, an aryloxy group, an acyl group and a carbonamido group are more preferred, a halogen atom, a cyano, an alkyl group, an alkoxy group and an aryloxy group are still more preferred, and a halogen atom, an alkyl group and an alkoxy group are most preferred.

The halogen atom includes a fluorine atom, a chlorine atom, a bromide atom and an iodine atom. The alkyl group may have a cyclic structure or may be branched. The number of carbon atoms in the alkyl group is preferably from 1 to 20, more preferably from 1 to 12, still more preferably from 1 to 6, and most preferably from 1 to 4. Examples of the alkyl group include methyl, ethyl, propyl, isopropyl, butyl, tert-butyl, hexyl, cyclohexyl, octyl and 2-ethylhexyl. The alkoxy group may have a cyclic structure or may be branched. The number of carbon atoms in the alkoxy group is preferably from 1 to 20, more preferably from 1 to 12, still more preferably from 1 to 6, and most preferably from 1 to 4. The alkoxy group may be substituted by another alkoxy group. Examples of the alkoxy group include methoxy, ethoxy, 2-methoxyethoxy, 2-methoxy-2-ethoxyethoxy, butyloxy, hexyloxy and octyloxy.

The number of carbon atoms in the aryl group is preferably from 6 to 20, more preferably from 6 to 12. Examples of the aryl group include phenyl and naphthyl. The number of carbon atoms in the aryloxy group is preferably from 6 to 20, more preferably from 6 to 12. Examples of the aryloxy group include phenoxy and naphthoxy. The number of carbon atoms in the acyl group is preferably from 1 to 20, more preferably from 1 to 12. Examples of the acyl group include formyl, acetyl and benzoyl. The number of carbon atoms in the carbonamido group is preferably from 1 to 20, more preferably from 1 to 12. Examples of the carbonamido group include acetamido and benzamido. The number of carbon atoms in the sulfonamido group is preferably from 1 to 20, more preferably from 1 to 12. Examples of the sulfonamido group include methanesulfonamido, benzenesulfonamido and p-toluenesulfonamido. The number of carbon atoms in the ureido group is preferably from 1 to 20, more preferably from 1 to 12. Examples of the ureido group include (unsubstituted) ureido.

The number of carbon atoms in the aralkyl group is preferably from 7 to 20, more preferably from 7 to 12. Examples of the aralkyl group include benzyl, phenethyl and naphthylmethyl. The number of carbon atoms in the alkoxycarbonyl group is preferably from 2 to 20, more preferably from 2 to 12. Examples of the alkoxycarbonyl group include methoxycarbonyl. The number of carbon atoms in the aryloxycarbonyl group is preferably from 7 to 20, more preferably from 7 to 12. Examples of the aryloxycarbonyl group include phenoxycarbonyl. The number of carbon atoms in the aralkyloxycarbonyl group is preferably from 8 to 20, more preferably from 8 to 12. Examples of the aralkyloxycarbonyl group include benzyloxycarbonyl. The number of carbon atoms in the carbamoyl group is preferably from 1 to 20, more preferably from 1 to 12. Examples of the carbamoyl group include (unsubstituted) carbamoyl and N-methylcarbamoyl. The number of carbon atoms in the sulfamoyl group is preferably 20 or less, more preferably 12 or less. Examples of the sulfamoyl group include (unsubstituted) sulfamoyl and N-methylsulfamoyl. The number of carbon atoms in the acyloxy group is preferably from 1 to 20, more preferably from 2 to 12. Examples of the acyloxy group include acetoxy and benzoyloxy.

The number of carbon atoms in the alkenyl group is preferably from 2 to 20, more preferably from 2 to 12. Examples of the alkenyl group include vinyl, allyl and isopropenyl. The number of carbon atoms in the alkynyl group is preferably from 2 to 20, more preferably from 2 to 12. Examples of the alkynyl group include thienyl. The number of carbon atoms in the alkylsulfonyl group is preferably from 1 to 20, more preferably from 1 to 12. The number of carbon atoms in the arylsulfonyl group is preferably from 6 to 20, more preferably from 6 to 12. The number of carbon atoms in the alkyloxysulfonyl group is preferably from 1 to 20, more preferably from 1 to 12. The number of carbon atoms in the aryloxysulfonyl group is preferably from 6 to 20, more preferably from 6 to 12. The number of carbon atoms in the alkylsulfonyloxy group is preferably from 1 to 20, more preferably from 1 to 12. The number of carbon atoms in the aryloxysulfonyl group is preferably from 6 to 20, more preferably from 6 to 12.

The fatty acid ester residue in the cellulose mixed fatty acid ester which is one example of the cellulose acylate for use in the present invention, is descried below. In the fatty acid ester residue in the cellulose mixed fatty acid ester, the aliphatic acyl group preferably has a carbon number of 2 to 20. Specific examples thereof include acetyl, propionyl, butyryl, isobutyryl, valeryl, pivaloyl, hexanoyl, octanoyl, lauroyl and stearoyl. Among these, acetyl, propionyl and butyryl are preferred. The aliphatic acyl group as used in the present invention includes an aliphatic acyl group further having a substituent. Examples of the substituent include those described above for X in formula (A).

When the number of substituents substituted to the aromatic ring is 2 or more, these substituents may be the same or different or may combine with each other to form a condensed polycyclic compound (e.g., naphthalene, indene, indane, phenanthrene, quinoline, isoquinoline, chromene, chroman, phthalazine, acridine, indole, indoline).

The aromatic acyl group for use in the present invention preferably satisfies the following relational formula (23):

$DS_B6/(DS_B2+DS_B3+DS_B6) \geqq 0.60$  Formula (23):

wherein $DS_B2$, $DS_B3$ and $DS_B6$ represent a substitution degree of the aromatic acyl group at 2-position, 3-position and 6-position, respectively.

Formula (23) is more preferably $DS_B6/(DS_B2+DS_B3+DS_B6) \geqq 0.70$ and most preferably $DS_B6/(DS_B2+DS_B3+DS_B6) \geqq 0.80$.

The substitution degree of the aromatic acyl group is, in the case of a cellulose fatty acid monoester, preferably 2.0 or less, more preferably from 0.1 to 2.0, based on the remaining hydroxyl group and in the case of a cellulose fatty acid diester (cellulose diacetate), preferably 1.0 or less, more preferably from 0.1 to 1.0, based on the remaining hydroxyl group. Specific examples (Nos. 1 to 43) of the aromatic acyl group represented by formula (A) are set forth below, but the present invention is not limited thereto. As for the aromatic acyl group represented by formula (A), Nos. 1, 3, 5, 6, 8, 13, 18 and 28 are preferred, and Nos. 1, 3, 6 and 13 are more preferred.

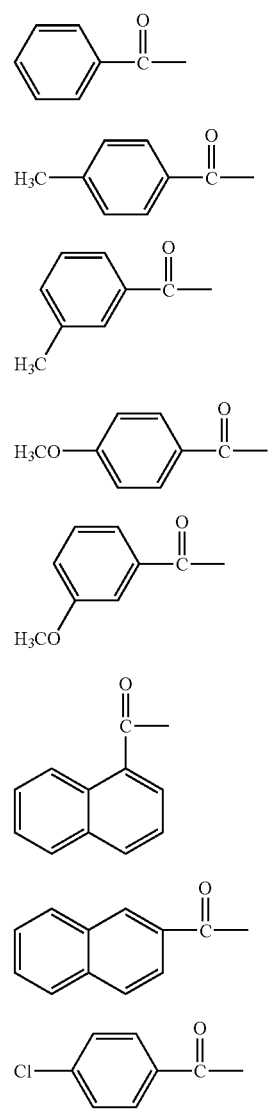

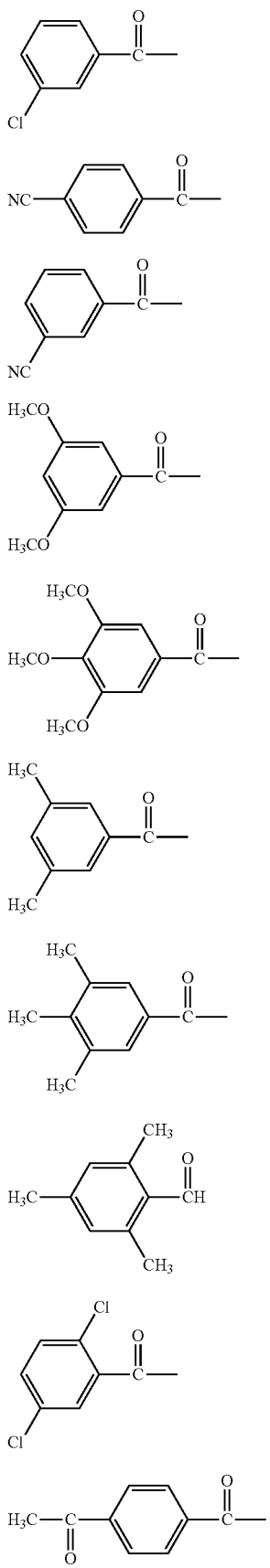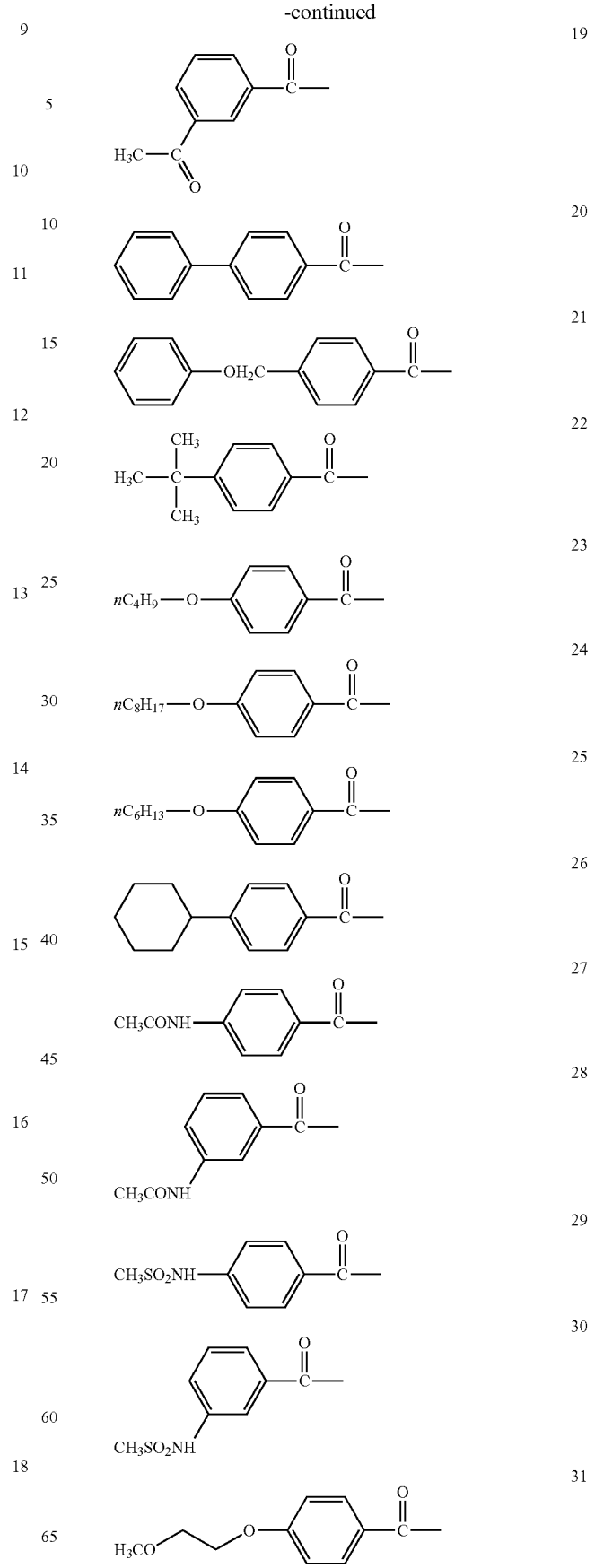

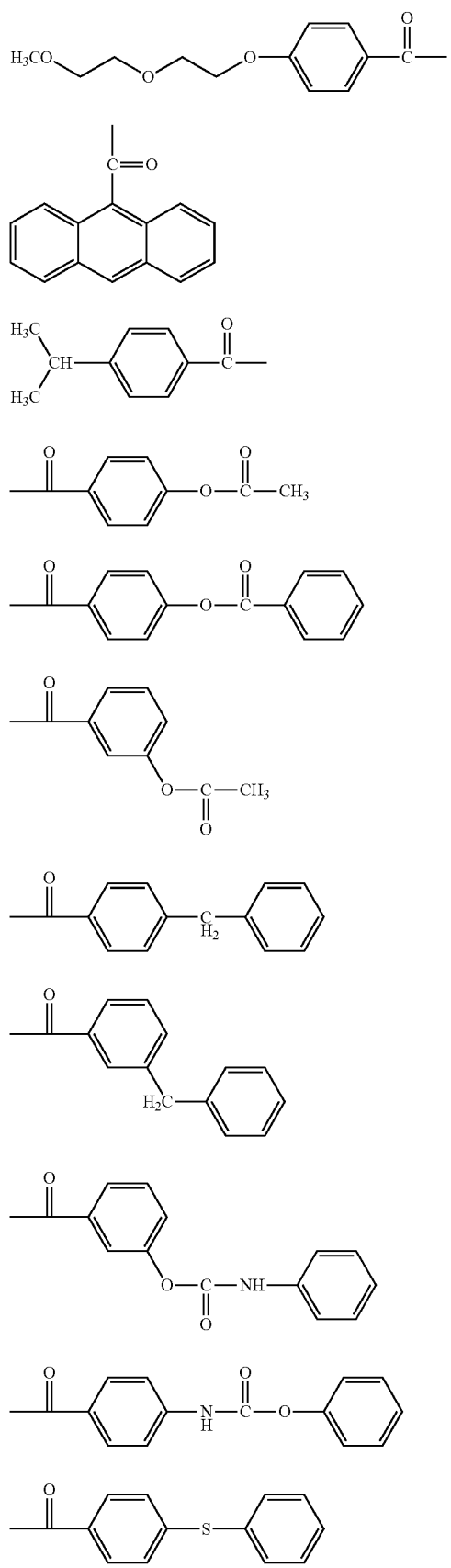
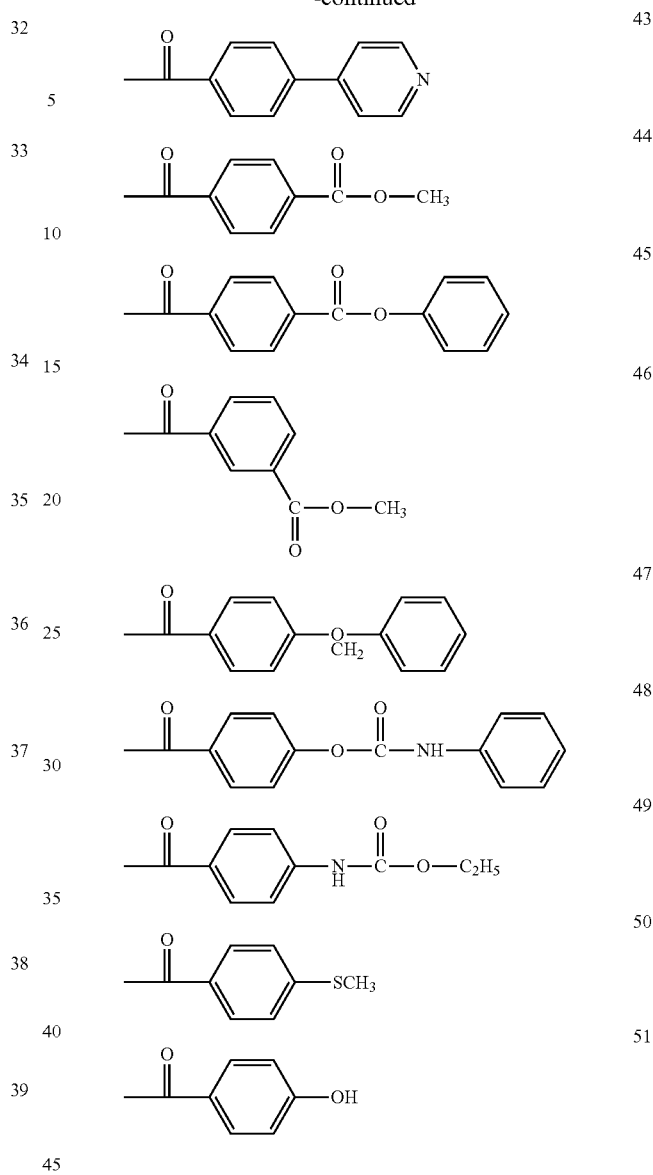

The cellulose acylate for use in the present invention preferably has a mass average polymerization degree of 350 to 800, more preferably from 370 to 600. Also, the cellulose acylate for use in the present invention preferably has a number average molecular weight of 70,000 to 230,000, more preferably from 75,000 to 230,000, and most preferably from 78,000 to 120,000.

The cellulose acylate for use in the present invention can be synthesized using an acid anhydride or an acid chloride as the acylating agent. In the case where the acylating agent is an acid anhydride, an organic solvent (e.g., acetic acid) or methylene chloride is used as the reaction solvent. Also, a protonic catalyst such as sulfuric acid may be used as the catalyst. In the case where the acylating agent is an acid chloride, a basic compound can be used as the catalyst. In a synthetic method most commonly employed in industry, a cellulose ester is synthesized by esterifying cellulose with a mixed organic acid component containing an acetyl group and an organic acid (acetic acid, propionic acid, butyric acid) corresponding to other acyl group, or its acid anhydride (acetic anhydride, propionic anhydride, butyric anhydride).

The aromatic acyl group substitution to the hydroxyl group of cellulose may be generally performed, for example, by a method using a symmetric acid anhydride derived from an aromatic carboxylic acid chloride or aromatic carboxylic acid, or a mixed acid anhydride. In particular, a method using an acid anhydride derived from an aromatic carboxylic acid (described in *Journal of Applied Polymer Science*, Vol. 29, 3981-3990 (1984)) is preferred. As for this method, examples of the method for producing a cellulose acylate in the present invention include (i) a method of once producing a cellulose fatty acid monoester or diester and introducing an aromatic acyl group represented by formula (A) into the remaining hydroxyl group, and (ii) a method of reacting a mixed acid anhydride of aliphatic carboxylic acid and aromatic carboxylic acid directly with cellulose. In (i), the production method itself of a cellulose fatty acid ester or diester is a well-known method, but the subsequent reaction of introducing an aromatic acyl group varies depending on the kind of the aromatic acyl group. At this time, the reaction temperature is preferably from 0 to 100° C., more preferably from 20 to 50° C., and the reaction time is preferably 30 minutes or more, more preferably from 30 to 300 minutes. Also in the method (ii) using a mixed acid anhydride, the reaction conditions vary depending on the kind of the mixed acid anhydride. At this time, the reaction temperature is preferably from 0 to 100° C., more preferably from 20 to 50° C., the reaction time is preferably from 30 to 300 minutes, more preferably from 60 to 200 minutes. These two methods both may be performed either in a solventless system or in a solvent but are preferably performed using a solvent. Examples of the solvent which can be used include dichloromethane, chloroform and dioxane.

In the above-described method, the cellulose such as cotton linter or wood pulp is in many cases subjected to an activation treatment with an organic acid such as acetic acid and then to esterification using a mixed solution of organic acid components described above in the presence of a sulfuric acid catalyst. The organic acid anhydride component is generally used in an excess amount with respect to the amount of the hydroxyl group present in the cellulose. In the esterification treatment, a hydrolysis reaction (depolymerization reaction) of the cellulose main chain (($\beta$)-1,4-glycoside bond) proceeds in addition to an esterification reaction. If the hydrolysis reaction of the main chain proceeds, the polymerization degree of the cellulose ester decreases and the physical properties of the produced cellulose ester film are deteriorated. Accordingly, the reaction conditions such as reaction temperature are preferably determined by taking into consideration the polymerization degree or molecular weight of the cellulose ester obtained.

In order to obtain a cellulose ester having a high polymerization degree (a large molecular weight), it is important to adjust the maximum temperature in the esterification reaction step to 50° C. or less. The maximum temperature is preferably adjusted to be from 35 to 50° C., more preferably from 37 to 47° C. When the reaction temperature is 35° C. or more, the esterification reaction smoothly proceeds and this is preferred. Also, when the reaction temperature is 50° C. or less, a trouble such as reduction in the polymerization degree of the cellulose ester is advantageously not brought about.

When the reaction is stopped while suppressing the temperature elevation after the esterification reaction, the reduction in the polymerization degree can be more suppressed and a cellulose ester having a high polymerization degree can be synthesized. That is, when a reaction stopping agent (e.g., water, acetic acid) is added after the completion of reaction, the excess acid anhydride not participating in the esterification reaction is hydrolyzed to produce a corresponding organic acid as a by-product. This hydrolysis reaction is accompanied with vigorous heat generation and therefore, the temperature within a reaction device elevates. When the addition rate of the reaction stopping agent is not excessively high, there is not caused a problem that a cooling capacity of the reaction device is exceeded to bring about abrupt heat generation and the hydrolysis reaction of the cellulose main chain significantly proceeds, giving rise to decrease in the polymerization degree of the obtained cellulose ester. Furthermore, a part of the catalyst is bonded to the cellulose during the esterification reaction, and the major part thereof is dissociated from the cellulose during the addition of the reaction stopping agent. At this time, when the addition rate of the reaction stopping agent is not excessively high, a reaction time long enough to allow for dissociation of the catalyst is ensured and there is hardly caused a problem that a part of the catalyst remains in the state of being bonded to the cellulose. A cellulose ester in which a strong acid catalyst is partially bonded is very poor in the stability and readily decomposes due to heat or the like at the drying of a product, as a result, the polymerization degree decreases. For these reasons, after the esterification reaction, the reaction is preferably stopped by adding a reaction stopping agent over 4 minutes or more, more preferably over 4 to 30 minutes. Incidentally, when the time for the addition of the reaction stopping agent is 30 minutes or less, a problem such as reduction in the industrial productivity is not caused and this is preferred.

As for the reaction stopping agent, water or an alcohol capable of decomposing an acid anhydride is generally used. However, in the present invention, in order not to allow for precipitation of a triester having low solubility in various organic solvents, a mixture of water and an organic acid is preferably used as the reaction stopping agent. When the esterification reaction is performed under such conditions, a high molecular weight cellulose ester having a mass average polymerization degree of 500 or more can be easily synthesized.

[Re Developer]

The cellulose acylate film for use in the present invention preferably contains two or more kinds of Re developers having liquid crystallinity. More preferably, at least one of these Re developers has both the positive intrinsic birefringence component and the negative intrinsic birefringence component (hereinafter sometimes referred to as a "reverse-dispersion Re developer"), and at least another Re developer is a rod-like compound (hereinafter sometimes referred to as a "rod-like Re developer"). By virtue of using a reverse-dispersion Re developer and a rod-like Re developer in combination, the Re developability can be greatly enhanced as compared with using respective developers individually and the change of Re due to ambient humidity can be remarkably reduced.

In the present invention, the first Re developer above is preferably a compound represented by the following formula (I), more preferably a compound represented by the following formula (II).

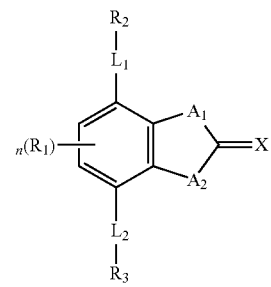

Formula (I)

(wherein L₁ and L₂ each independently represents a single bond or a divalent linking group, A₁ and A₂ each independently represents a group selected from the group consisting of —O—, —NR— (wherein R represents a hydrogen atom or a substituent), —S— and —CO—, R₁, R₂ and R₃ each independently represents a substituent, X represents a Group 6, 5 or 4 atom and is preferably, for example, =O, =S, =NR or =C(R)R (wherein R is a hydrogen atom or a substituent), and n represents an integer of 0 to 2).

Formula (II):

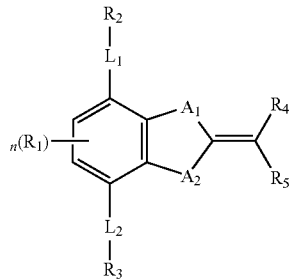

(wherein L₁ and L₂ each independently represents a single bond or a divalent linking group, A₁ and A₂ each independently represents a group selected from the group consisting of —O—, —NR— (wherein R represents a hydrogen atom or a substituent), —S— and —CO—, R₁, R₂, R₃, R₄ and R₅ each independently represents a substituent, and n represents an integer of 0 to 2).

In formulae (I) and (II), preferred examples of the divalent linking group represented by L₁ and L₂ include the followings.

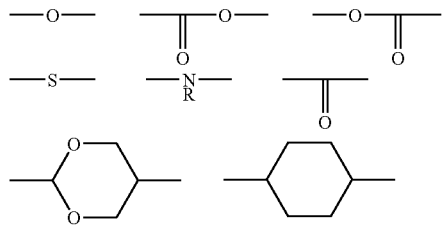

Among these, —O—, —COO— and —OCO— are more preferred.

In formulae (I) and (II), R₁ is a substituent and when a plurality of R₁'s are present, these may be the same or different or may form a ring. Examples of the substituent include:

a halogen atom (e.g., fluorine, chlorine, bromine, iodine), an alkyl group (preferably having a carbon number of 1 to 30, such as methyl group, ethyl group, n-propyl group, isopropyl group, tert-butyl group, n-octyl group and 2-ethylhexyl group), a cycloalkyl group (preferably a substituted or unsubstituted cycloalkyl group having a carbon number of 3 to 30, such as cyclohexyl group, cyclopentyl group and 4-n-dodecylcyclohexyl group), a bicycloalkyl group (preferably a substituted or unsubstituted bicycloalkyl group having a carbon number of 5 to 30, that is, a monovalent group obtained by removing one hydrogen atom from a bicycloalkane having a carbon number of 5 to 30, such as bicyclo[1,2,2,]heptan-2-yl and bicyclo[2,2,2]octan-3-yl),
an alkenyl group (preferably a substituted or unsubstituted alkenyl group having a carbon number of 2 to 30, such as vinyl group and allyl group), a cycloalkenyl group (preferably a substituted or unsubstituted cycloalkenyl group having a carbon number of 3 to 30, that is, a monovalent group obtained by removing one hydrogen atom from a bicycloalkene having a carbon number of 3 to 30, such as 2-cyclopenten-1-yl and 2-cyclohexen-1-yl), a bicycloalkenyl group (preferably a substituted or unsubstituted bicycloalkenyl group having a carbon number of 5 to 30, that is, a monovalent group obtained by removing one hydrogen atom from a bicycloalkene having one double bond, such as bicyclo[2,2,1]hept-2-en-1-yl and bicyclo[2,2,2]oct-2-en-4-yl), an alkynyl group (preferably a substituted or unsubstituted alkynyl group having a carbon number of 2 to 30, such as ethynyl group and propargyl group), an aryl group (preferably a substituted or unsubstituted aryl group having a carbon number of 6 to 30, such as phenyl group, p-tolyl group and naphthyl group), a heterocyclic group (preferably a monovalent group obtained by removing one hydrogen atom from a 5- or 6-membered, substituted or unsubstituted, aromatic or nonaromatic heterocyclic compound, more preferably a 5- or 6-membered aromatic heterocyclic group having a carbon number of 3 to 30, such as 2-furyl group, 2-thienyl group, 2-pyrimidinyl group and 2-benzothiazolyl group), a cyano group, a hydroxyl group, a nitro group, a carboxyl group, an alkoxy group (preferably a substituted or unsubstituted alkoxy group having a carbon number of 1 to 30, such as methoxy group, ethoxy group, isopropoxy group, tert-butoxy group, n-octyloxy group and 2-methoxyethoxy group), an aryloxy group (preferably a substituted or unsubstituted aryloxy group having a carbon number of 6 to 30, such as phenoxy group, 2-methylphenoxy group, 4-tert-butylphenoxy group, 3-nitrophenoxy group and 2-tetradecanoylaminophenoxy group), a silyloxy group (preferably a silyloxy group having a carbon number of 3 to 20, such as trimethylsilyloxy group and tert-butyldimethylsilyloxy group), a heterocyclic oxy group (preferably a substituted or unsubstituted heterocyclic oxy group having a carbon number of 2 to 30, such as 1-phenyltetrazol-5-oxy group and 2-tetrahydropyranyloxy group), an acyloxy group (preferably a formyloxy group, a substituted or unsubstituted alkylcarbonyloxy group having a carbon number of 2 to 30, and a substituted or unsubstituted arylcarbonyloxy group having a carbon number of 6 to 30, such as formyloxy group, acetyloxy group, pivaloyloxy group, stearoyloxy group, benzoyloxy group and p-methoxyphenylcarbonyloxy group), a carbamoyloxy group (preferably a substituted or unsubstituted carbamoyloxy group having a carbon number of 1 to 30, such as N,N-dimethylcarbamoyloxy group, N,N-diethylcarbamoyloxy group, morpholinocarbonyloxy group, N,N-di-n-octylaminocarbonyloxy group and N-n-octylcarbamoyloxy group), an alkoxycarbonyloxy group (preferably a substituted or unsubstituted alkoxycarbonyloxy group having a carbon number of 2 to 30, such as methoxycarbonyloxy group, ethoxycarbonyloxy group, tert-butoxycarbonyloxy group and n-octyloxycarbonyloxy group), an aryloxycarbonyloxy group (preferably a substituted or unsubstituted aryloxycarbonyloxy group having a carbon number of 7 to 30, such as phenoxycarbonyloxy group, p-methoxyphenoxycarbonyloxy group and p-n-hexadecyloxyphenoxycarbonyloxy group), an amino group (preferably an amino group, a substituted or unsubstituted alkylamino group having a carbon number of 1 to 30, and a substituted or unsubstituted anilino group having a carbon number of 6 to 30, such as amino group, methylamino group, dimethylamino group, anilino group, N-methylanilino group and diphenylamino group), an acylamino group (preferably a formylamino group, a substituted or unsubstituted alkylcarbonylamino group having a carbon number of 1 to 30, and a substituted or unsubstituted arylcarbonylamino group having a carbon number of 6 to 30, such as formylamino group, acetylamino group, pivaloylamino group, lauroylamino group and benzoylamino group), an aminocarbonylamino group (preferably a substituted or unsubstituted aminocarbonylamino group having a carbon number of 1 to 30, such as carbamoylamino group, N,N-dimethylaminocarbonylamino group, N,N-diethylamino-carbonylamino group and morpholinocarbonylamino group), an alkoxycarbonylamino group (preferably a substituted or unsubstituted alkoxycarbonylamino group having a carbon number of 2 to 30, such as methoxycarbonylamino group, ethoxycarbonylamino group, tert-butoxycarbonylamino group, n-octadecyloxycarbonylamino group and N-methyl-methoxycarbonylamino group), an aryloxycarbonylamino group (preferably a substituted or unsubstituted aryloxycarbonylamino group having a carbon number of 7 to 30, such as phenoxycarbonylamino group, p-chlorophenoxycarbonylamino group and m-n-octyloxyphenoxycarbonylamino group), a sulfamoylamino group (preferably a substituted or unsubstituted sulfamoylamino group having a carbon number of 0 to 30, such as sulfamoylamino group, N,N-dimethylaminosulfonylamino group and N-n-octylaminosulfonylamino group), an alkyl- or aryl-sulfonylamino group (preferably a substituted or unsubstituted alkylsulfonylamino having a carbon number of 1 to 30, and a substituted or unsubstituted arylsulfonylamino group having a carbon number of 6 to 30, such as methylsulfonylamino group, butylsulfonylamino group, phenylsulfonylamino group, 2,3,5-trichlorophenylsulfonylamino group and p-methylphenylsulfonylamino group), a mercapto group, an alkylthio group (preferably a substituted or unsubstituted alkylthio group having a carbon number of 1 to 30, such as methylthio group, ethylthio group and n-hexadecylthio group), an arylthio group (preferably a substituted or unsubstituted arylthio group having a carbon number of 6 to 30, such as phenylthio group, p-chlorophenylthio group and m-methoxyphenylthio group), a heterocyclic thio group (preferably a substituted or unsubstituted heterocyclic thio group having a carbon number of 2 to 30, such as 2-benzothiazolylthio group and 1-phenyltetrazol-5-ylthio group), a sulfamoyl group (preferably a substituted or unsubstituted sulfamoyl group having a carbon number of 0 to 30, such as N-ethylsulfamoyl group, N-(3-dodecyloxy-propyl)sulfamoyl group, N,N-dimethylsulfamoyl group, N-acetylsulfamoyl group, N-benzoylsulfamoyl group and N-(N'-phenylcarbamoyl)sulfamoyl group), a sulfo group, an alkyl- or aryl-sulfinyl group (preferably a substituted or unsubstituted alkylsulfinyl group having a carbon number of 1 to 30, and a substituted or unsubstituted arylsulfinyl group having a carbon number of 6 to 30, such as methylsulfinyl group, ethylsulfinyl group, phenylsulfinyl group and p-methylphenylsulfinyl group), an alkyl- or aryl-sulfonyl group (preferably a substituted or unsubstituted alkylsulfonyl group having a carbon number of 1 to 30, and a substituted or unsubstituted arylsulfonyl group having a carbon number of 6 to 30, such as methylsulfonyl group, ethylsulfonyl group, phenylsulfonyl group and p-methylphenylsulfonyl group), an acyl group (preferably a formyl group, a substituted or unsubstituted alkylcarbonyl group having a carbon number of 2 to 30, and a substituted or unsubstituted arylcarbonyl group having a carbon number of 7 to 30, such as acetyl group and pivaloylbenzoyl group), an aryloxycarbonyl group (preferably a substituted or unsubstituted aryloxycarbonyl group having a carbon number of 7 to 30, such as phenoxycarbonyl group, o-chlorophenoxycarbonyl group, m-nitrophenoxycarbonyl group and p-tert-butylphenoxycarbonyl group), an alkoxycarbonyl group (preferably a substituted or unsubstituted alkoxycarbonyl group having a carbon number of 2 to 30, such as methoxycarbonyl group, ethoxycarbonyl group, tert-butoxycarbonyl group and n-octadecyloxycarbonyl group), a carbamoyl group (preferably a substituted or unsubstituted carbamoyl group having a carbon number of 1 to 30, such as carbamoyl group, N-methylcarbamoyl group, N,N-dimethylcarbamoyl group, N,N-di-n-octylcarbamoyl group and N-(methylsulfonyl)carbamoyl group), an aryl- or heterocyclic azo groups (preferably a substituted or unsubstituted arylazo group having a carbon number of 6 to 30, and a substituted or unsubstituted heterocyclic azo group having a carbon number of 3 to 30, such as phenylazo group, p-chlorophenylazo group and 5-ethylthio-1,3,4-thiadiazol-2-ylazo group), an imido group (preferably an N-succinimido group and an N-phthalimido group), a phosphino group (preferably a substituted or unsubstituted phosphino group having a carbon number of 2 to 30, such as dimethylphosphino group, diphenylphosphino group and methylphenoxyphosphino group), a phosphinyl group (preferably a substituted or unsubstituted phosphinyl group having a carbon number of 2 to 30, such as phosphinyl group, dioctyloxyphosphinyl group and diethoxyphosphinyl group), a phosphinyloxy group (preferably a substituted or unsubstituted phosphinyloxy group having a carbon number of 2 to 30, such as diphenoxyphosphinyloxy group and dioctyloxyphosphinyloxy group), a phosphinylamino group (preferably a substituted or unsubstituted phosphinylamino group having a carbon number of 2 to 30, such as dimethoxyphosphinylamino group and dimethylaminophosphinylamino group), and a silyl group (preferably a substituted or unsubstituted silyl group having a carbon number of 3 to 30, such as trimethylsilyl group, tert-butyldimethylsilyl group and phenyldimethylsilyl group).

Among these substituents, those having a hydrogen atom may be deprived of the hydrogen atom and substituted by the above-described group. Examples of such a functional group include an alkylcarbonylaminosulfonyl group, an arylcarbonylaminosulfonyl group, an alkylsulfonylaminocarbonyl group and an arylsulfonylaminocarbonyl group. Specific examples thereof include a methylsulfonylaminocarbonyl group, a p-methylphenylsulfonylaminocarbonyl group, an acetylaminosulfonyl group and a benzoylaminosulfonyl group.

$R_1$ is preferably a halogen tom, an alkyl group, an alkenyl group, an aryl group, a heterocyclic group, a hydroxyl group, a carboxyl group, an alkoxy group, an aryloxy group, an acyloxy group, a cyano group, an amino group or a hydrogen atom, more preferably a halogen atom, an alkyl group, a cyano group, an alkoxy group or a hydrogen atom.

$R_2$ and $R_3$ each independently represents a substituent. Examples thereof include those described for $R_1$. The substituent is preferably a substituted or unsubstituted benzene ring, a substituted or unsubstituted cyclohexane ring, more preferably a benzene ring having a substituent or a cyclohexane ring having a substituent, still more preferably a benzene ring having a substituent at the 4-position or a cyclohexane ring having a substituent at the 4-position.

R$_4$ and R$_5$ each independently represents a substituent. Examples thereof include those described for R$_1$. The substituent is preferably an electron-withdrawing substituent having a Hammett's substituent constant σ$_p$ value more than 0, still more preferably an electron-withdrawing substituent having a σ$_p$ value of 0 to 1.5. Examples of such a substituent include a trifluoromethyl group, a cyano group, a carbonyl group and a nitro group. R$_4$ and R$_5$ may combine to form a ring.

Incidentally, the Hammett's substituent constants σ$_p$ and σ$_m$ are described in detail, for example, in Naoki Inamoto, *Hammett Soku—Kozo to Hannosei—(Hammett's Rule—Structure and Reactivity—)*, Maruzen; *Shin Jikken Kagaku Koza* 14, *Yuki Kagobutsu no Gosei to Hanno V* (*New Experimental Chemical Course* 14, *V. Synthesis and Reaction of Organic Compounds*), page 2605, edited by the Chemical Society of Japan, Maruzen; Tadao Nakaya, *Riron Yuki Kagaku Kaisetsu* (*Explanation on Theoretical Organic Chemistry*), page 217, Tokyo Kagaku Dojin; and *Chemical Review*, Vol. 91, pp. 165-195 (1991).

A$_1$ and A$_2$ each independently represents a group selected from the group consisting of —O—, —NR— (wherein R is a hydrogen atom or a substituent), —S— and —CO— and is preferably —O—, —NR— (wherein R is a substituent) or —S—. Examples of the substituent R include those described above for R$_1$.

Specific examples of the compounds represented by formulae (I) and (II) are set forth below, but the present invention is not limited to these specific examples. Unless otherwise indicated, the compounds below are denoted as Compound (X) using the numeral in the parenthesis.

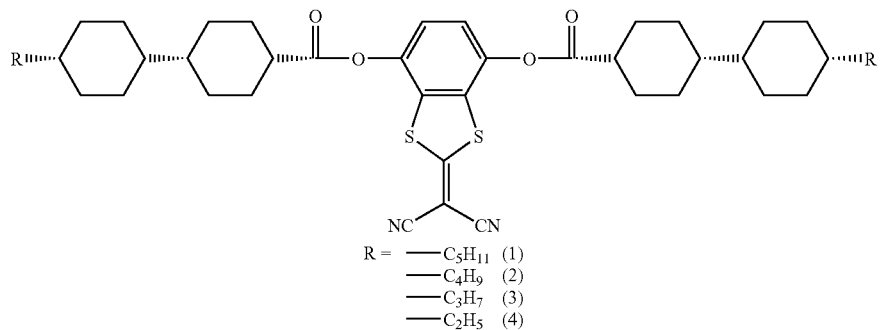

R = —C$_5$H$_{11}$ (1)
—C$_4$H$_9$ (2)
—C$_3$H$_7$ (3)
—C$_2$H$_5$ (4)

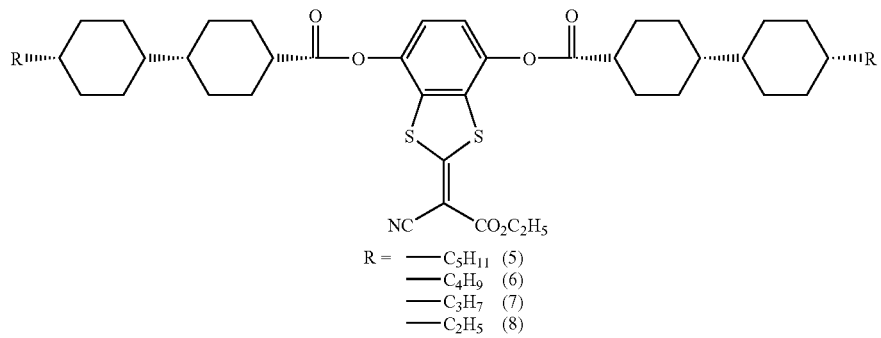

R = —C$_5$H$_{11}$ (5)
—C$_4$H$_9$ (6)
—C$_3$H$_7$ (7)
—C$_2$H$_5$ (8)

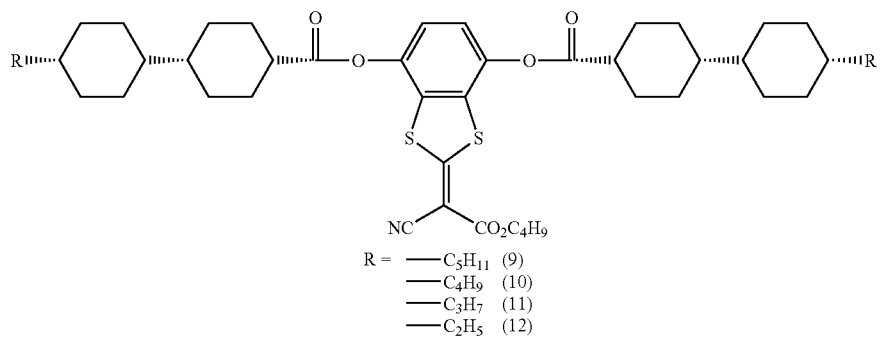

R = —C$_5$H$_{11}$ (9)
—C$_4$H$_9$ (10)
—C$_3$H$_7$ (11)
—C$_2$H$_5$ (12)

-continued
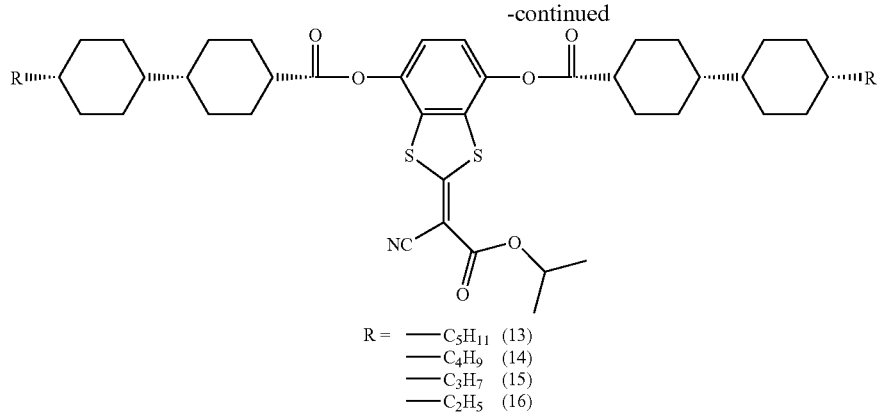
R = —C₅H₁₁ (13)
—C₄H₉ (14)
—C₃H₇ (15)
—C₂H₅ (16)
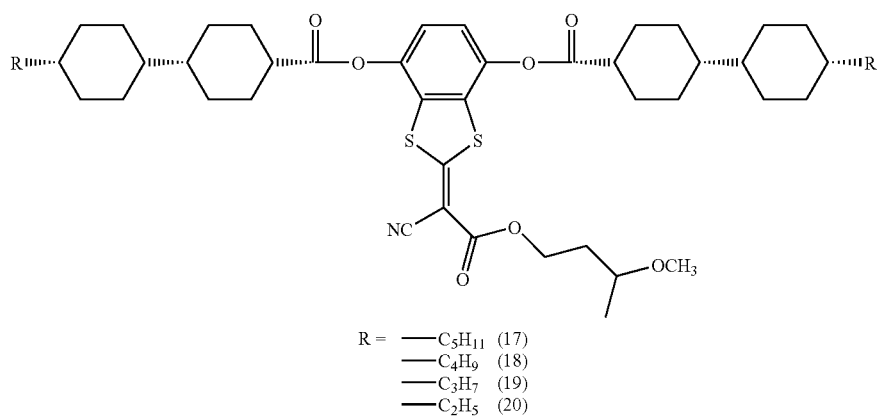
R = —C₅H₁₁ (17)
—C₄H₉ (18)
—C₃H₇ (19)
—C₂H₅ (20)
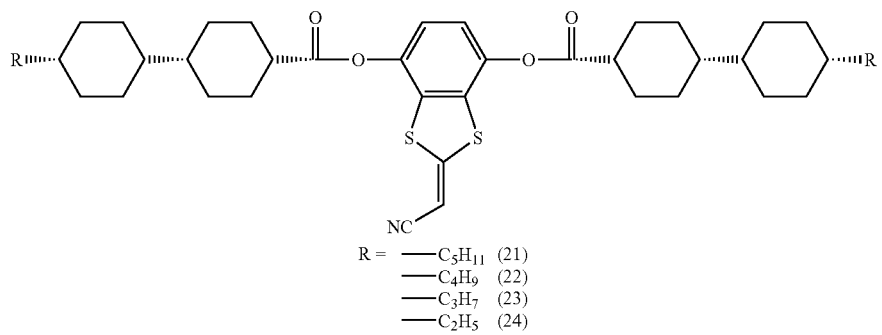
R = —C₅H₁₁ (21)
—C₄H₉ (22)
—C₃H₇ (23)
—C₂H₅ (24)
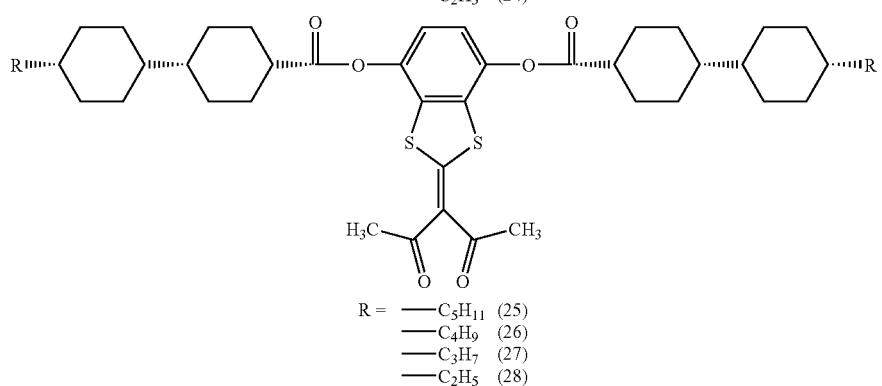
R = —C₅H₁₁ (25)
—C₄H₉ (26)
—C₃H₇ (27)
—C₂H₅ (28)

-continued
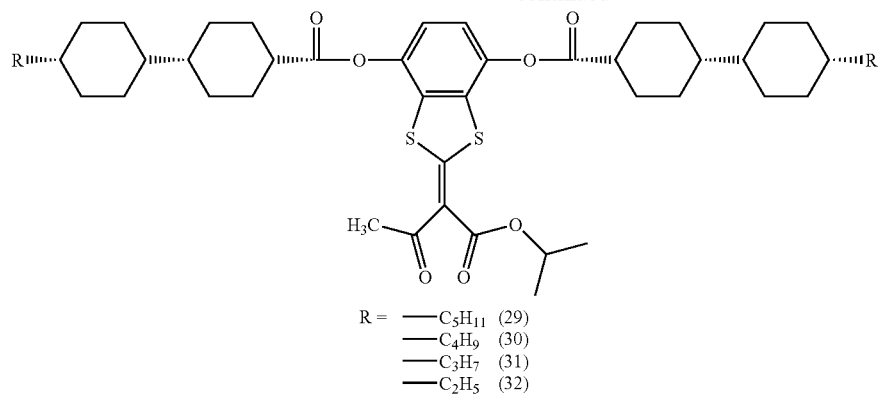
R = —C₅H₁₁ (29)
—C₄H₉ (30)
—C₃H₇ (31)
—C₂H₅ (32)
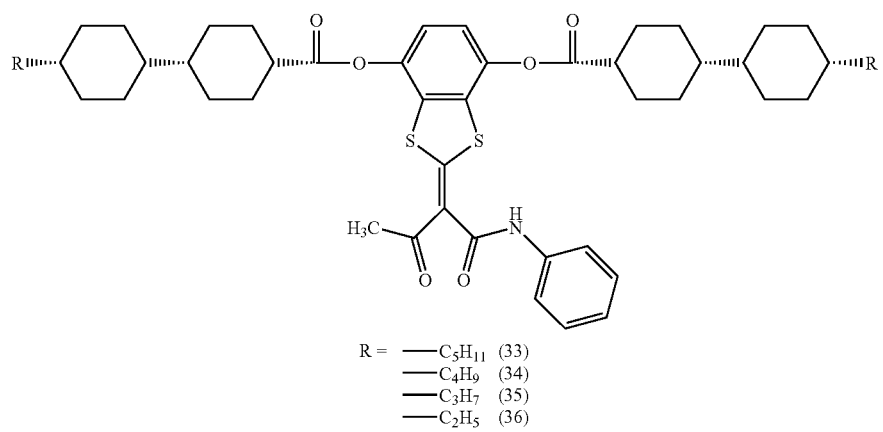
R = —C₅H₁₁ (33)
—C₄H₉ (34)
—C₃H₇ (35)
—C₂H₅ (36)
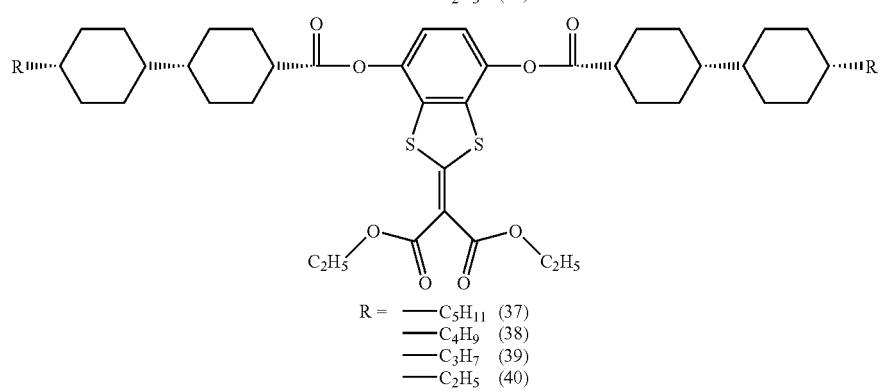
R = —C₅H₁₁ (37)
—C₄H₉ (38)
—C₃H₇ (39)
—C₂H₅ (40)
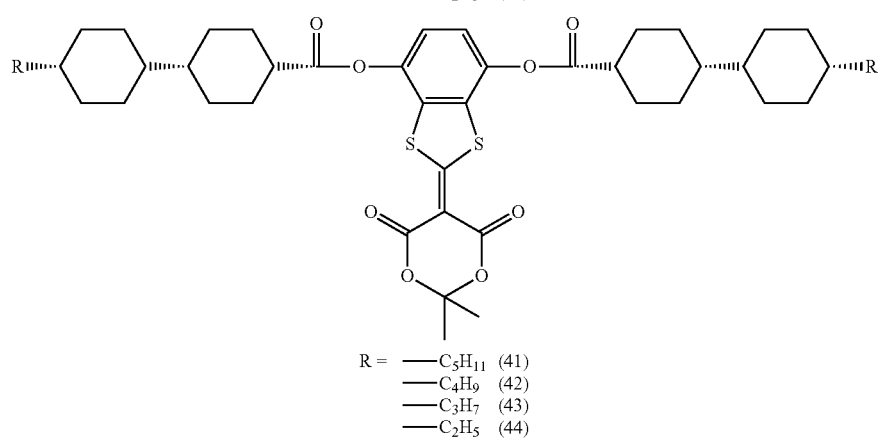
R = —C₅H₁₁ (41)
—C₄H₉ (42)
—C₃H₇ (43)
—C₂H₅ (44)

-continued
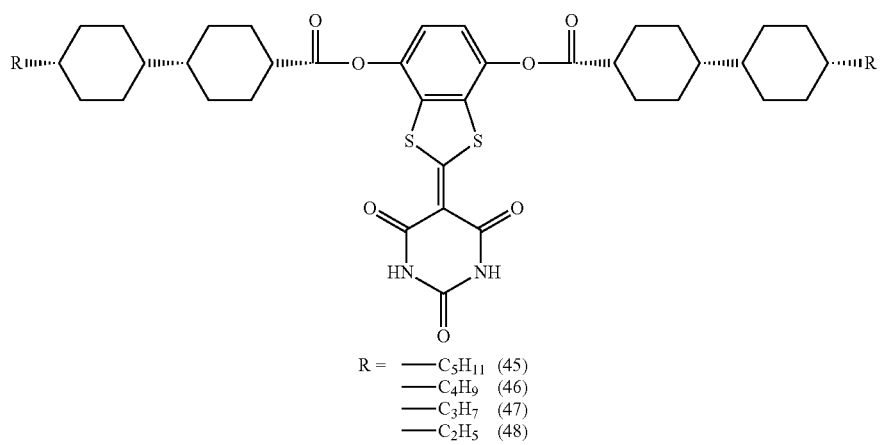
R = —C$_5$H$_{11}$ (45)
—C$_4$H$_9$ (46)
—C$_3$H$_7$ (47)
—C$_2$H$_5$ (48)
(49)
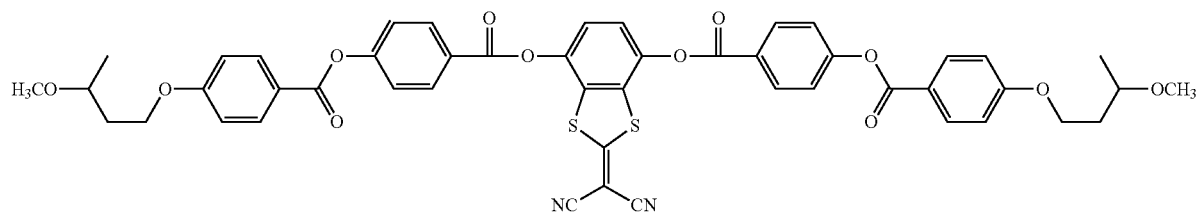
(50)
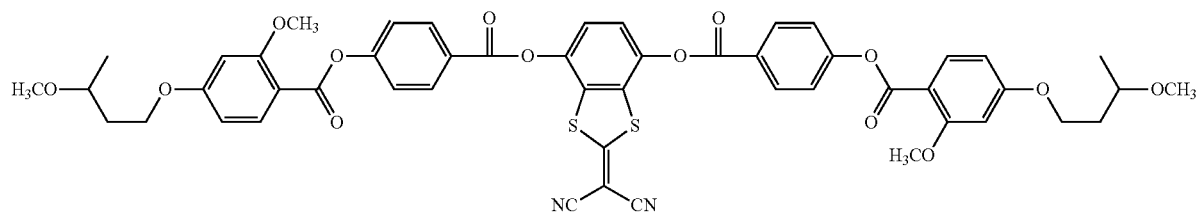
(51)
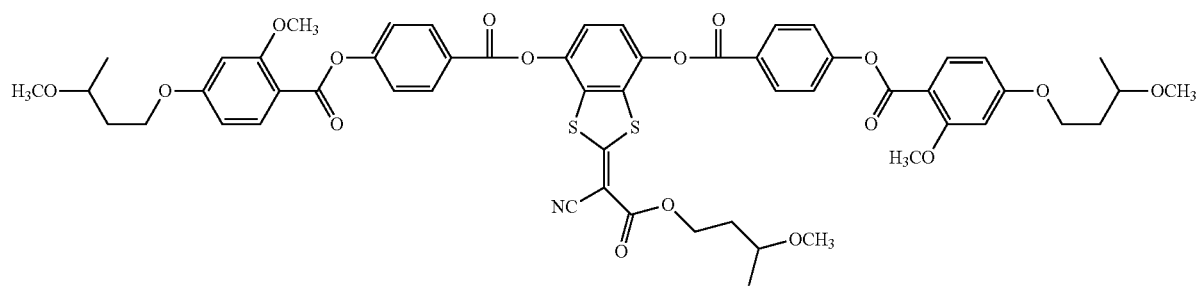
(52)
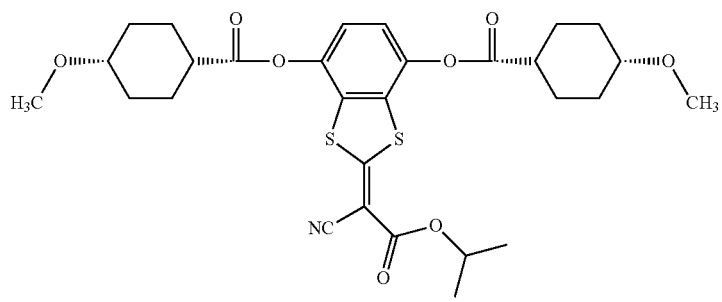

-continued
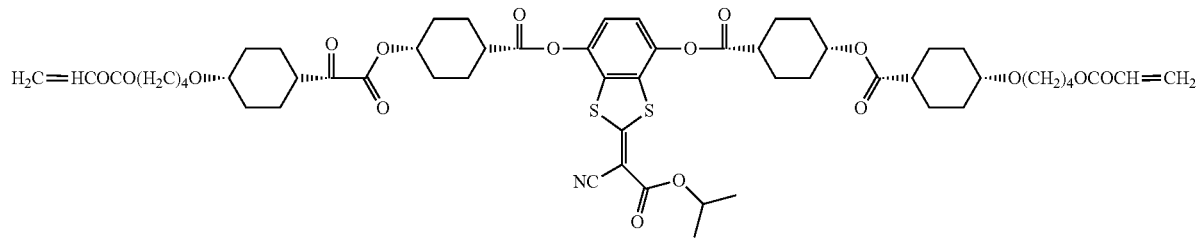
(53)
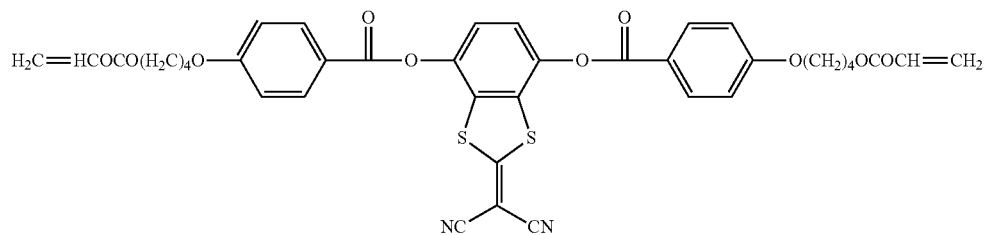
(54)
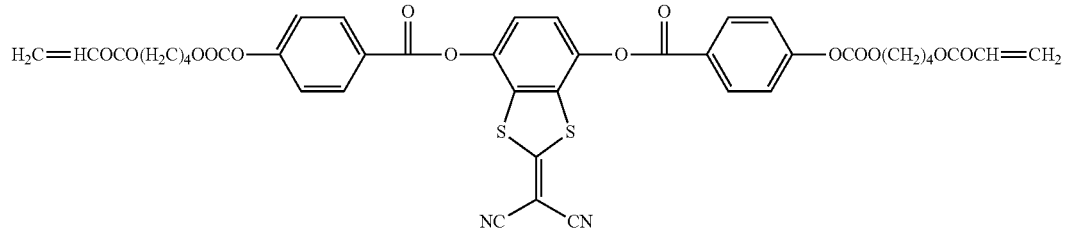
(55)
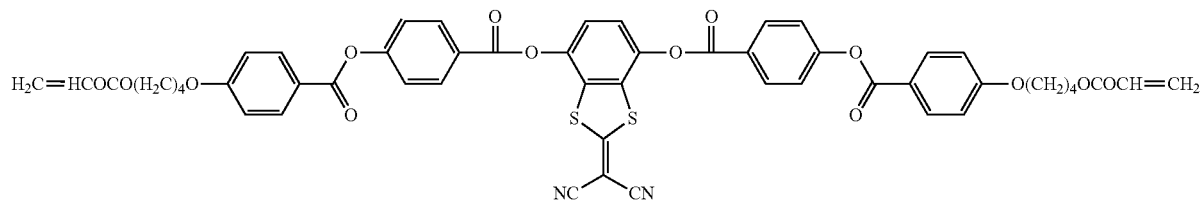
(56)
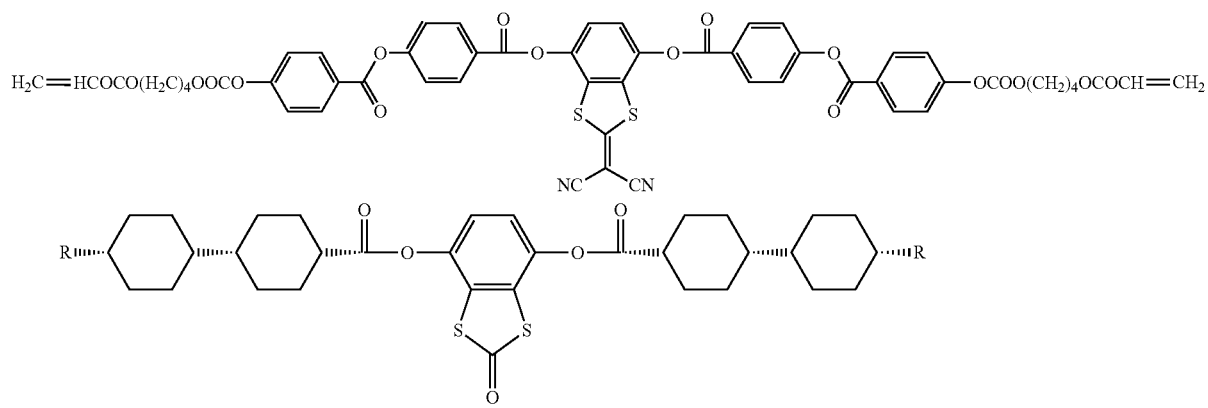
(57)
R = —$C_5H_{11}$ (58)
—$C_4H_9$ (59)
—$C_3H_7$ (60)
—$C_2H_5$ (61)

-continued
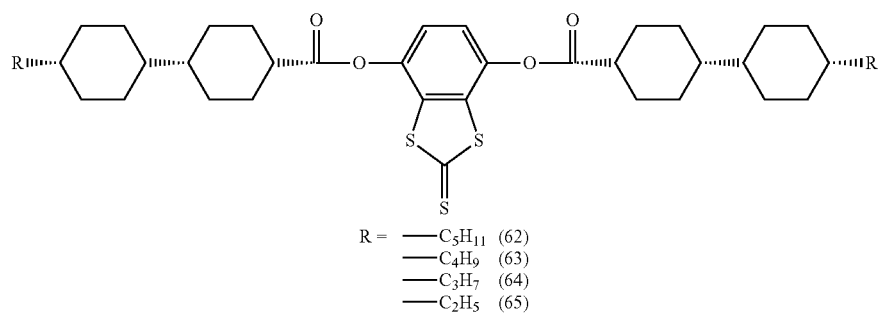
R = —C₅H₁₁ (62)
—C₄H₉ (63)
—C₃H₇ (64)
—C₂H₅ (65)
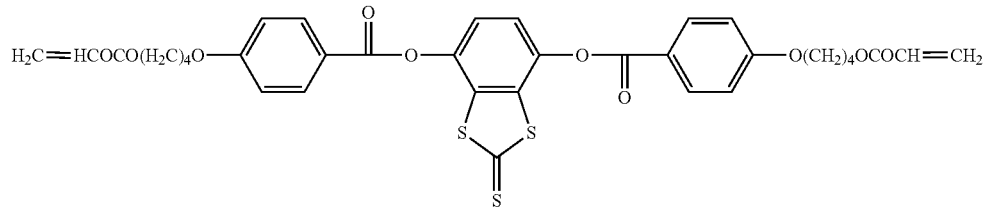
(66)
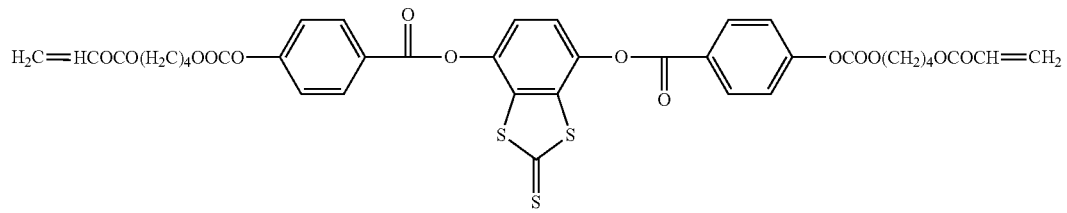
(67)
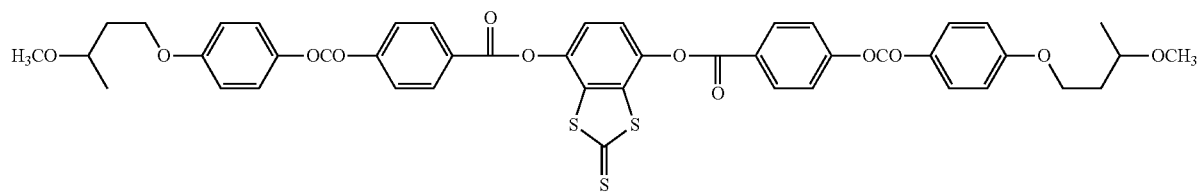
(68)
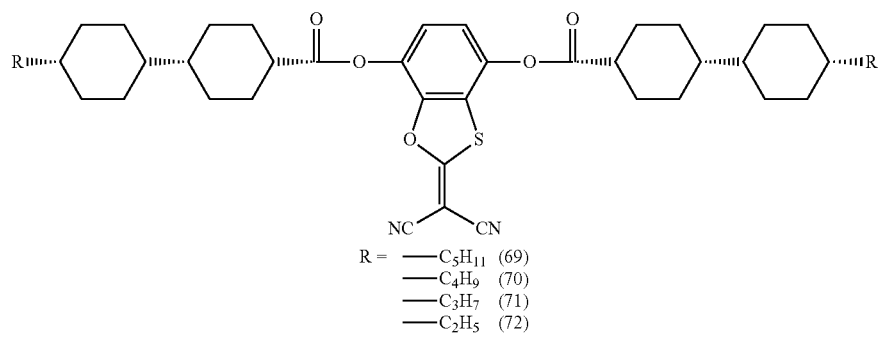
R = —C₅H₁₁ (69)
—C₄H₉ (70)
—C₃H₇ (71)
—C₂H₅ (72)
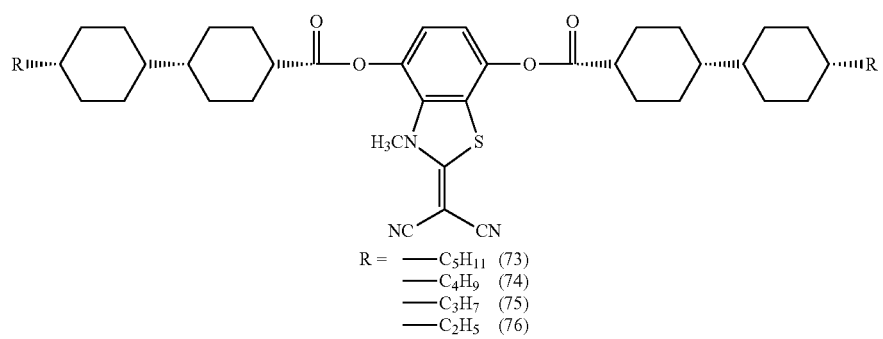
R = —C₅H₁₁ (73)
—C₄H₉ (74)
—C₃H₇ (75)
—C₂H₅ (76)

-continued
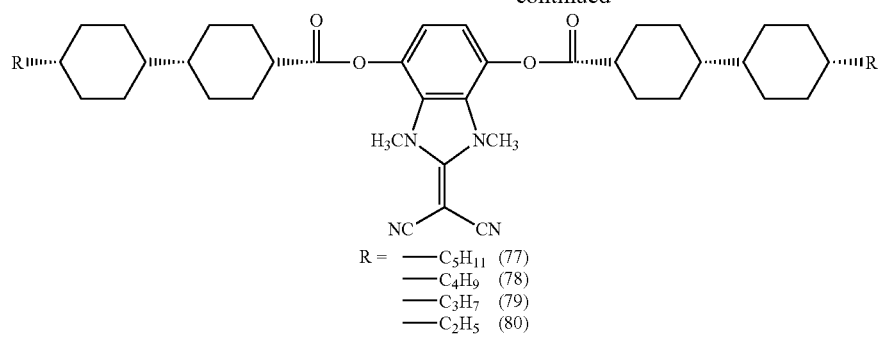
R = —C$_5$H$_{11}$ (77)
—C$_4$H$_9$ (78)
—C$_3$H$_7$ (79)
—C$_2$H$_5$ (80)
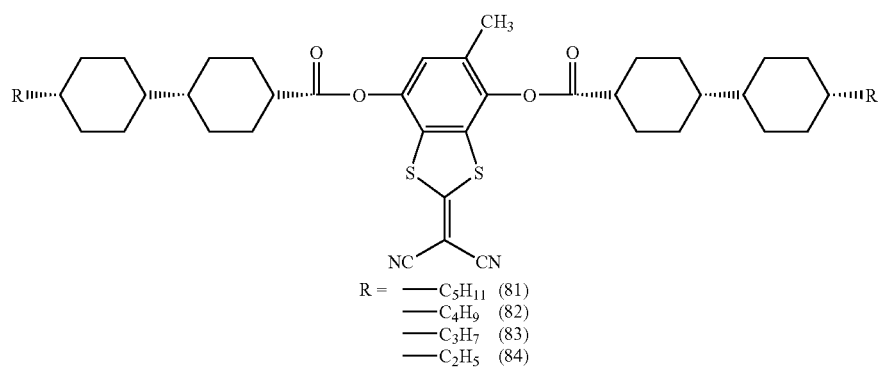
R = —C$_5$H$_{11}$ (81)
—C$_4$H$_9$ (82)
—C$_3$H$_7$ (83)
—C$_2$H$_5$ (84)
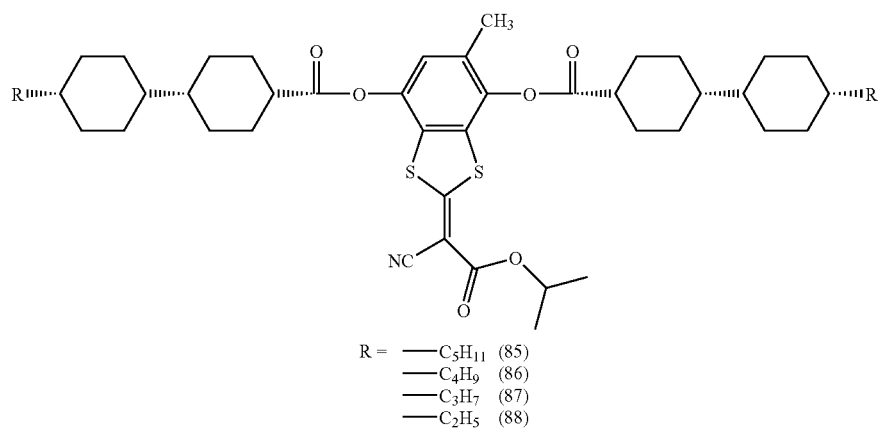
R = —C$_5$H$_{11}$ (85)
—C$_4$H$_9$ (86)
—C$_3$H$_7$ (87)
—C$_2$H$_5$ (88)
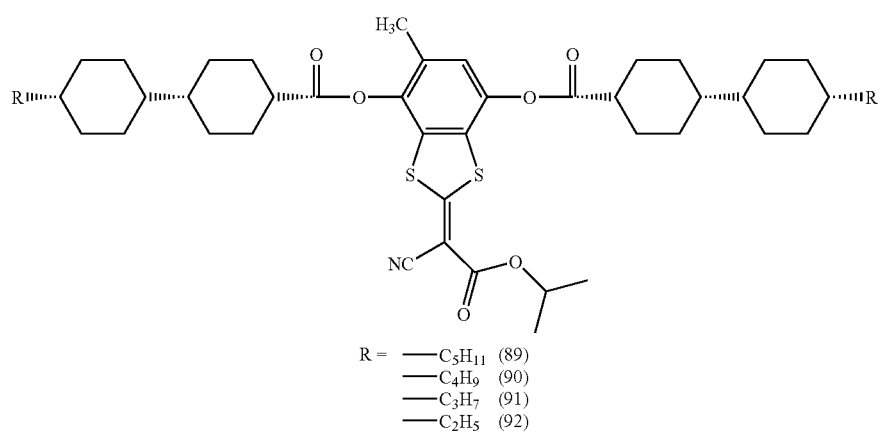
R = —C$_5$H$_{11}$ (89)
—C$_4$H$_9$ (90)
—C$_3$H$_7$ (91)
—C$_2$H$_5$ (92)

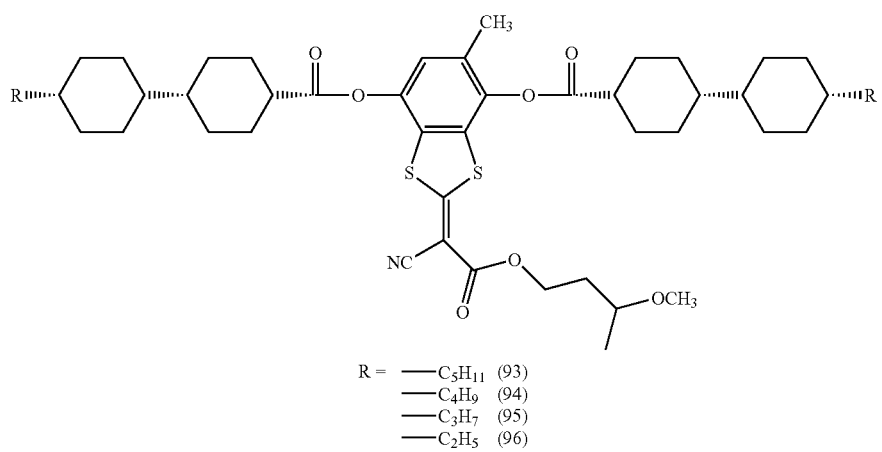
R = —C$_5$H$_{11}$ (93)
—C$_4$H$_9$ (94)
—C$_3$H$_7$ (95)
—C$_2$H$_5$ (96)
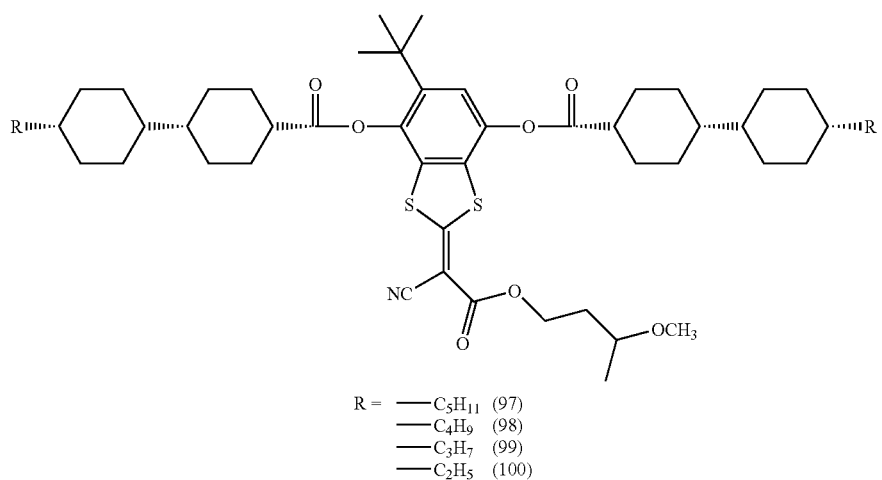
R = —C$_5$H$_{11}$ (97)
—C$_4$H$_9$ (98)
—C$_3$H$_7$ (99)
—C$_2$H$_5$ (100)
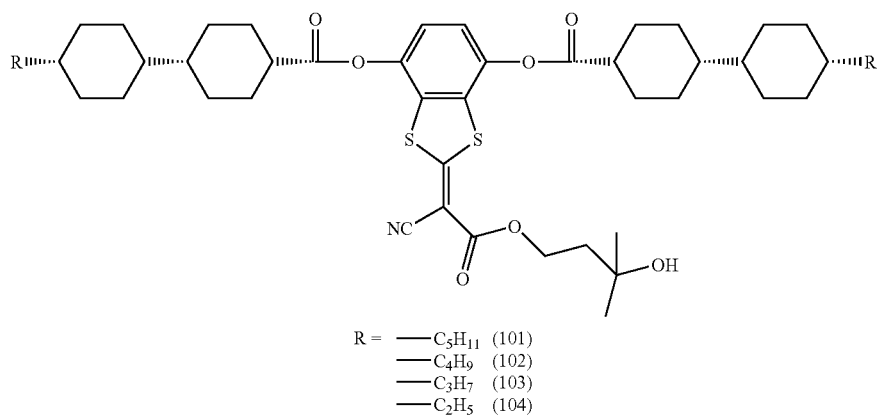
R = —C$_5$H$_{11}$ (101)
—C$_4$H$_9$ (102)
—C$_3$H$_7$ (103)
—C$_2$H$_5$ (104)

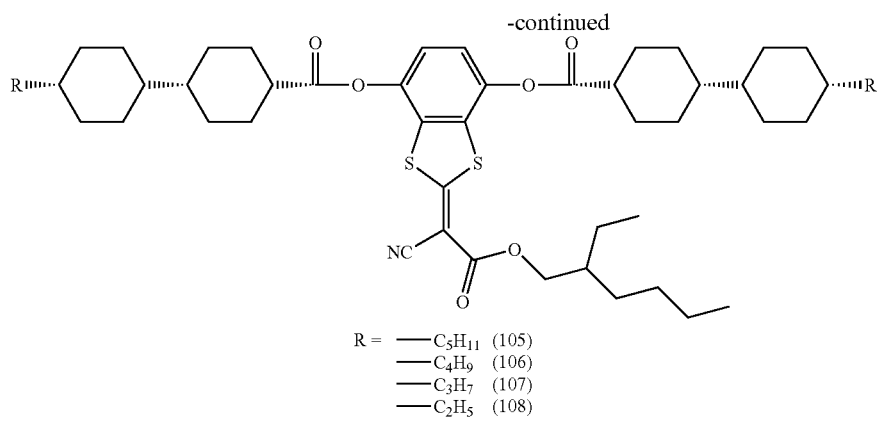

R = —C$_5$H$_{11}$ (105)
—C$_4$H$_9$ (106)
—C$_3$H$_7$ (107)
—C$_2$H$_5$ (108)

The compound represented by formula (I) or (II) can be synthesized by referring to known methods. For example, Compound (1) can be synthesized according to the following scheme.

Compound (1)

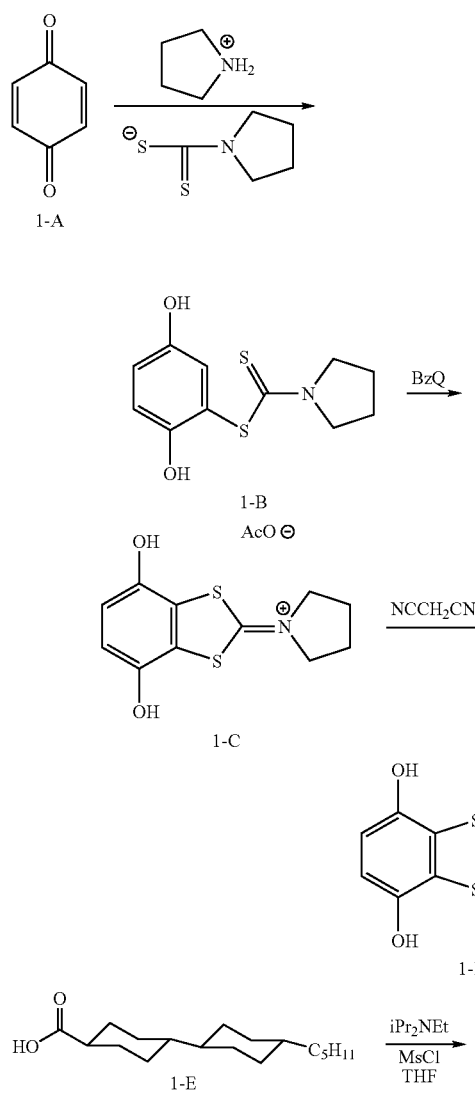

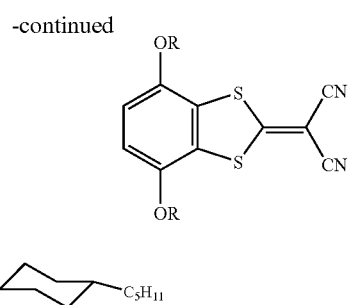

In the scheme above, the synthesis from Compound (1-A) to Compound (1-D) can be performed by referring to the method described in *Journal of Chemical Crystallography*, pp. 515-526, 27(9), (1997).

Furthermore, as shown in the scheme above, methanesulfonic acid chloride is added to a tetrahydrofuran solution of Compound (1-E), N,N-diisopropylethylamine is added dropwise, followed by stirring, N,N-diisopropylethylamine is added, a tetrahydrofuran solution of Compound (1-D) is added dropwise, and a tetrahydrofuran solution of N,N-dimethylaminopyridine (DMAP) is added dropwise, whereby Compound (1) can be obtained.

(Rod-Like Re Developer)

In the present invention, the rod-like compound indicates a compound having a linear molecular structure. The linear molecular structure means that the molecular structure of the rod-like compound is linear in a thermodynamically most stable configuration. The thermodynamically most stable configuration can be determined by crystal structure analysis or molecular orbital calculation. For example, the molecular orbital calculation is performed using a software program for molecular orbital calculation (e.g., WinMOPAC2000, produced by Fujitsu Ltd.), whereby a molecular structure capable of minimizing the heat of formation of the compound can be determined. The expression "the molecular structure is linear" means that the angle defined by the main chain of the molecular structure is 140° or more in the thermodynamically most stable configuration determined by calculation as above.

The rod-like compound is preferably a compound represented by the following formula (i):

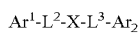  Formula (i):

In formula (i), Ar$^1$ and Ar$^2$ each is independently an aromatic group, L$^2$ and L$^3$ each is independently a divalent linking group selected from a —O—CO— group and a —CO—

O— group, and X is a 1,4-cyclohexylene group, a vinylene group or an ethynylene group.

In the present invention, the aromatic group includes an aryl group (an aromatic hydrocarbon group), a substituted aryl group, an aromatic heterocyclic group and a substituted aromatic heterocyclic group.

An aryl group and a substituted aryl group are more preferred than an aromatic heterocyclic group and a substituted aromatic heterocyclic group. The heterocyclic ring of the aromatic heterocyclic group is generally unsaturated. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom or a sulfur atom.

The aromatic ring of the aromatic group is preferably a benzene ring, a furan ring, a thiophene ring, a pyrrole ring, an oxazole ring, a thiazole ring, an imidazole ring, a triazole ring, a pyridine ring, a pyrimidine ring or a pyrazine ring, more preferably a benzene ring.

Examples of the substituent of the substituted aryl group and substituted aromatic heterocyclic group include a halogen atom (e.g., F, Cl, Br, I), a hydroxyl group, a carboxyl group, a cyano group, an amino group, an alkylamino group (e.g., methylamino, ethylamino, butylamino, dimethylamino), a nitro group, a sulfo group, a carbamoyl group, an alkylcarbamoyl group (e.g., N-methylcarbamoyl, N-ethylcarbamoyl, N,N-dimethylcarbamoyl), a sulfamoyl group, an alkylsulfamoyl group (e.g., N-methylsulfamoyl, N-ethylsulfamoyl, N,N-dimethylsulfamoyl), a ureido group, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, tert-amyl, cyclohexyl, cyclopentyl), an alkenyl group (e.g., vinyl, allyl, hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, octyloxy), an aryloxy group (e.g., phenoxy), an alkoxycarbonyl group (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl, octylsulfonyl), an amido group (e.g., acetamido, butylamido, hexylamido, laurylamido), and a non-aromatic heterocyclic group (e.g., morpholyl, pyrazinyl).

The substituent of the substituted aryl group and substituted aromatic heterocyclic group is preferably a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group or an alkyl group.

The alkyl moiety of the alkylamino group, alkoxycarbonyl group, alkoxy group and alkylthio group and the alkyl group each may further have a substituent. Examples of the substituent of the alkyl moiety and alkyl group include a halogen atom, hydroxyl, carboxyl, cyano, amino, an alkylamino group, nitro, sulfo, carbamoyl, an alkylcarbamoyl group, sulfamoyl, an alkylsulfamoyl group, ureido, an alkylureido group, an alkenyl group, an alkynyl group, an acyl group, an acyloxy group, an acylamino group, an alkoxy group, an aryloxy group, an alkoxycarbonyl group, an aryloxycarbonyl group, an alkoxycarbonylamino group, an alkylthio group, an arylthio group, an alkylsulfonyl group, an amido group, and a non-aromatic heterocyclic group. The substituent of the alkyl moiety and alkyl group is preferably a halogen atom, hydroxyl, amino, an alkylamino group, an acyl group, an acyloxy group, an acylamino group, an alkoxycarbonyl group or an alkoxy group.

In formula (i), $L^2$ and $L^3$ each is independently a divalent linking group selected from —O—CO—, —CO—O— and a combination thereof.

In formula (i), X is 1,4-cyclohexylene group, a vinylene group or an ethynylene group.

Specific examples of the compound represented by formula (i) are set forth below.

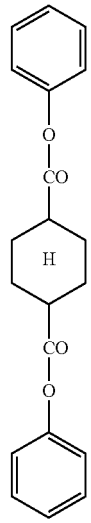

(1)

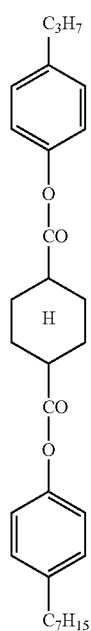
(2)
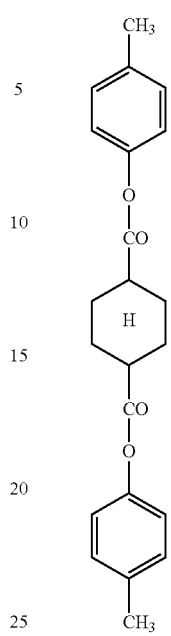
(3)
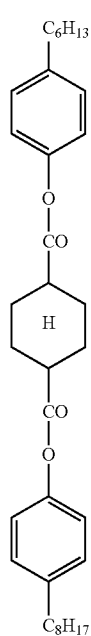
(4)
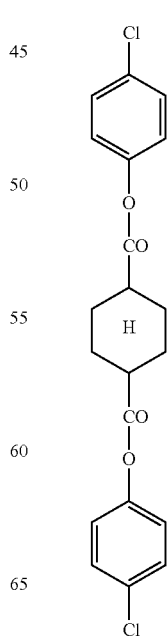
(5)

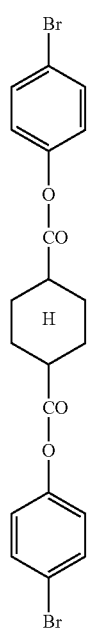 (6)
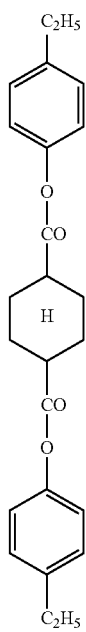 (8)
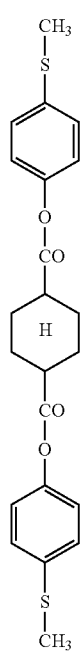 (7)
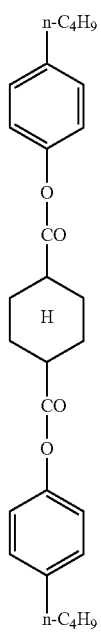 (9)

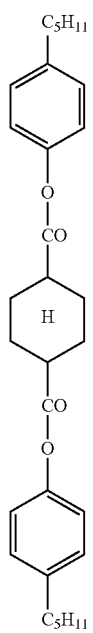
(10)
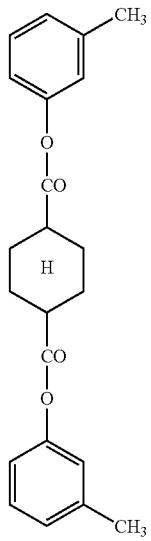
(12)
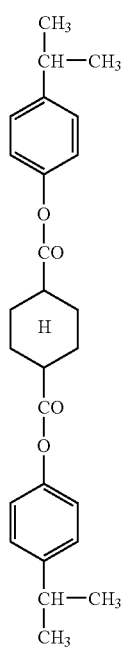
(11)
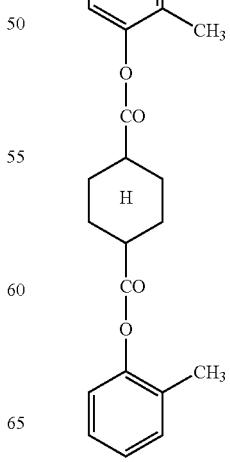
(13)

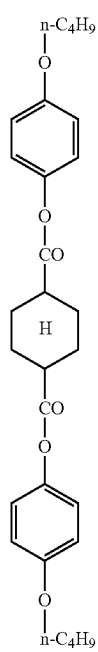 (14)
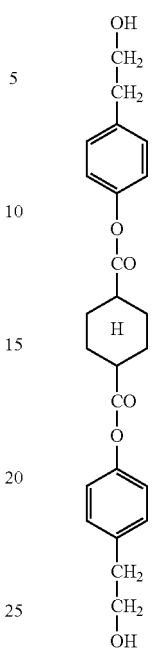 (16)
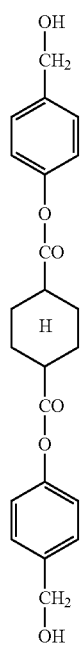 (15)
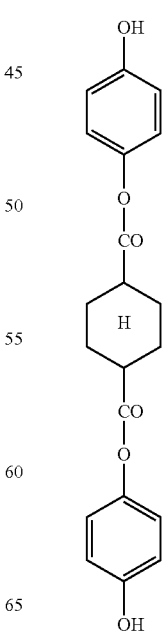 (17)

(18)
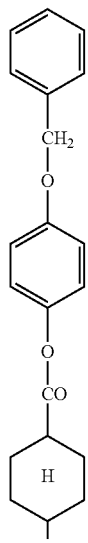
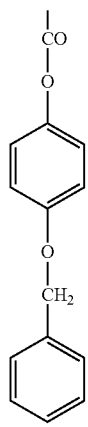
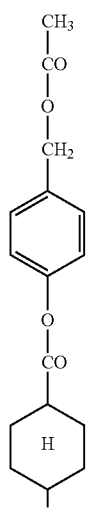
(19)
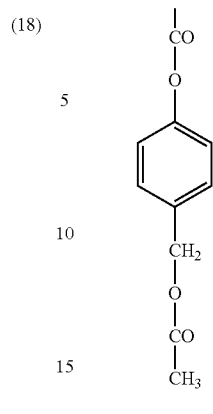
(20)
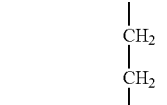
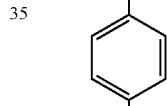
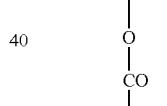
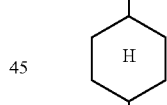
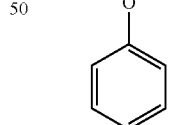
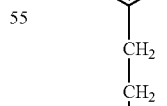
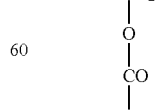
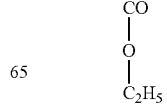

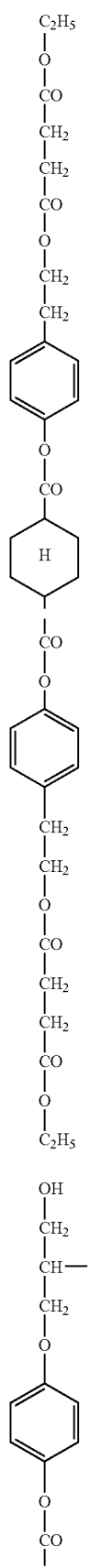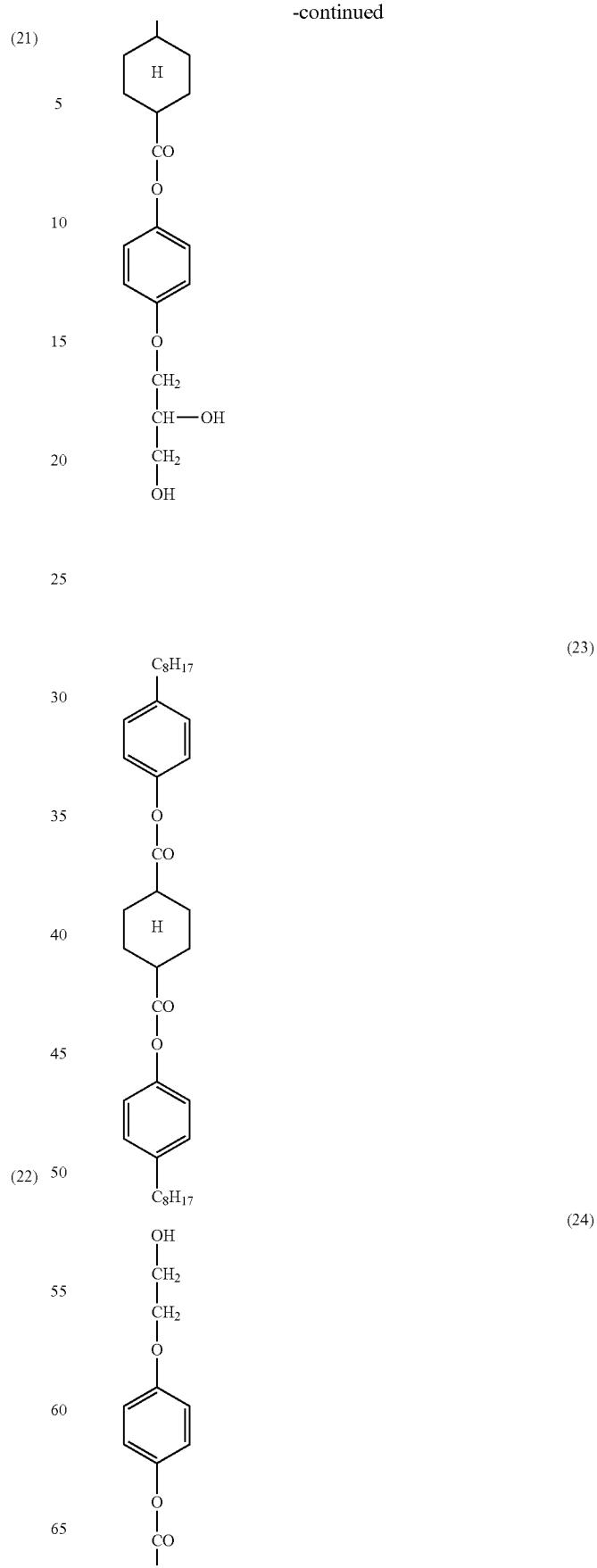

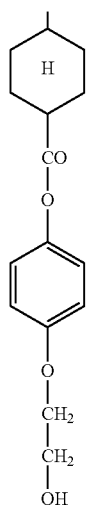
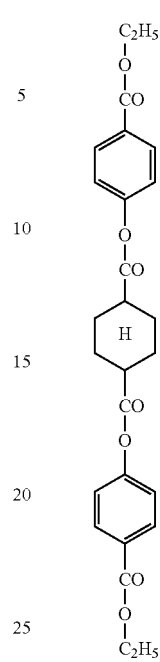
(25)
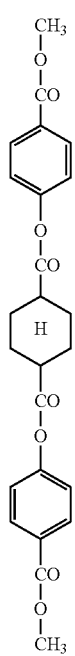
(26)
(27)
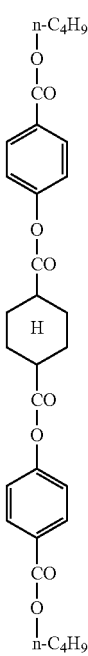

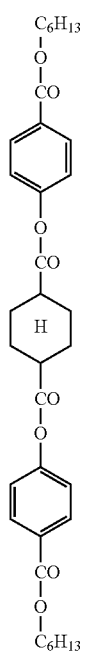
(28)
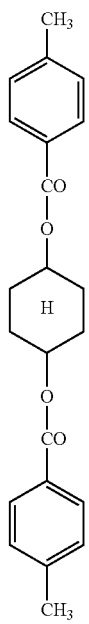
(30)
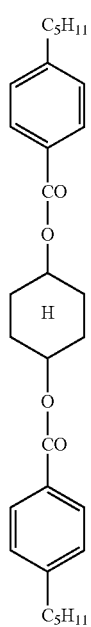
(29)
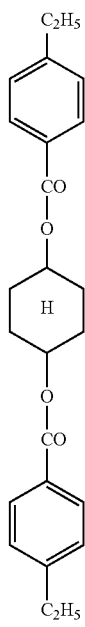
(31)

(32)
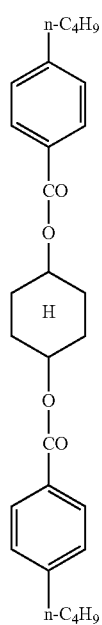
(34)
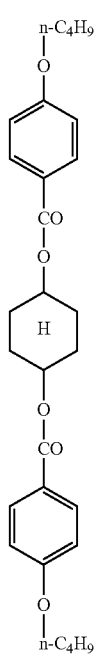
(33)
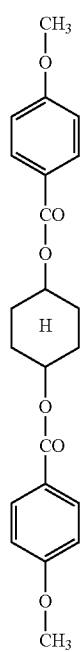
(35)
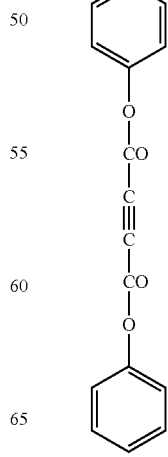

(36)
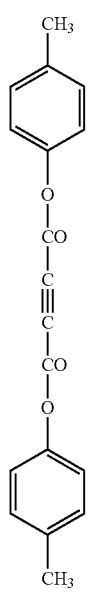
(38)
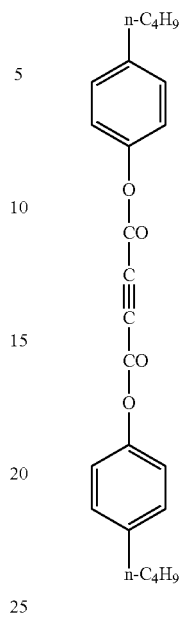
(37)
(39)
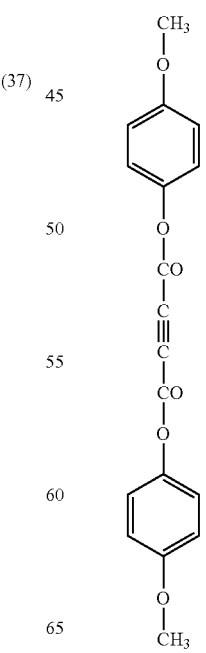

(40)
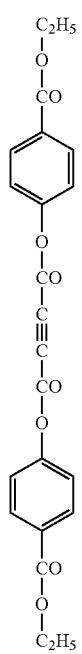
(42)
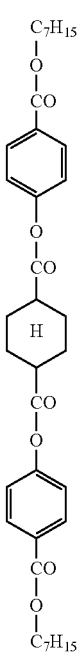
(41)
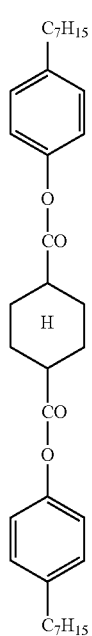
(43)
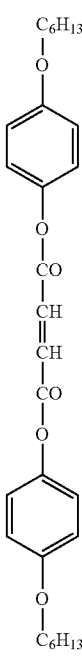

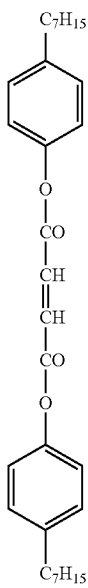

(44)

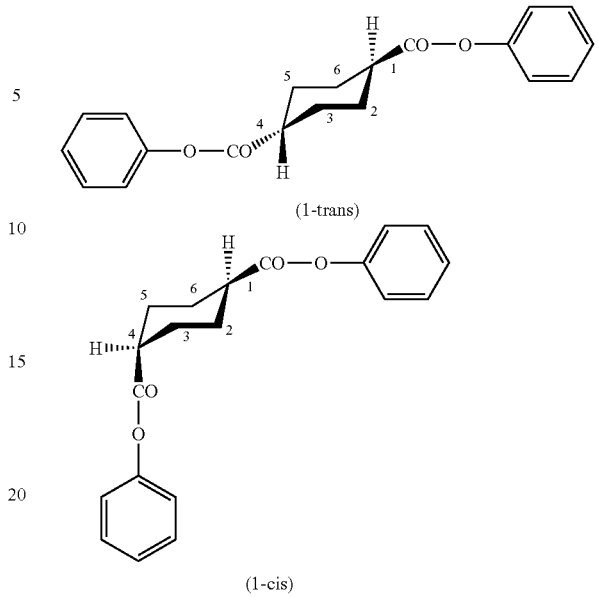

(45)

Compounds (1) to (34), (41) and (42) each has two asymmetric carbon atoms at the 1- and 4-positions of the cyclohexane ring. However, since Compounds (1), (4) to (34), (41) and (42) have a symmetrical meso-type molecular structure, these compounds have no optical isomer (optical activity), but only geometric isomers (trans-form and cis-form) are present. The trans-form (1-trans) and cis-form (1-cis) of Compound (1) are shown below.

As described above, the rod-like compound preferably has a linear molecular structure and therefore, a trans-form is more preferred than a cis-form.

Compounds (2) and (3) each has optical isomers (four isomers in total) in addition to geometric isomers. As for the geometric isomers, a trans-form is similarly more preferred than a cis-form. The optical isomers have no specific difference in the superiority and may be a D-form, an L-form or a racemic form.

In Compounds (43) to (45), the vinylene bond at the center includes a trans-form and a cis-form. From the same reason as above, a trans-form is more preferred than a cis-form.

Two or more kinds of rod-like compounds of which maximum absorption wavelength ($\lambda$max) is shorter than 250 nm in the ultraviolet absorption spectrum of the solution may be used in combination.

The rod-like compound can be synthesized by the method described in publications, and the publication includes *Mol. Crvst. Lig. Cryst.*, Vol. 53, page 229 (1979), ibid., Vol. 89, page 93 (1982), ibid., Vol. 145, page 111 (1987), ibid., Vol. 170, page 43 (1989), *J. Am. Chem. Soc.*, Vol. 113, page 1349 (1991), ibid., Vol. 118, page 5346 (1996), ibid., Vol. 92, page 1582 (1970), *J. Ora. Chem.*, Vol. 40, page 420 (1975), and *Tetrahedron*, Vol. 48, No. 16, page 3437 (1992).

High Re is imparted to the resin film of the present invention by orienting the Re developer in a high orientation degree surpassing the polymer. In this respect, the Re developer preferably has liquid crystallinity, and the mass ratio of the liquid crystalline compound to all additives is preferably from 40 to 100 mass %, more preferably from 50 to 100 mass %.

The Re developers in the present invention are preferably used in a state of the mixture of two or more species thereof. In the present invention, the amount of the Re developer added is preferably from 0.1 to 30 parts by mass, more preferably from 0.5 to 20 parts by mass, and most preferably from 1 to 10 parts by mass, per 100 parts by mass of the cellulose acylate.

As for the addition method of the Re developer for use in the present invention, the Re developer may be dissolved in an organic solvent such as alcohol, methylene chloride and dioxolane and then added to the cellulose acylate solution (dope) or may be added directly in the dope composition.

[Production of Cellulose Acylate Film]

The cellulose acylate film of the present invention can be produced by a solvent casting method. In the solvent casting method, the film is produced using a solution (dope) prepared by dissolving a cellulose acylate in an organic solvent.

The organic solvent preferably contains a solvent selected from an ether having a carbon number of 3 to 12, a ketone having a carbon number of 3 to 12, an ester having a carbon number of 3 to 12, and a halogenated hydrocarbon having a carbon number of 1 to 6.

The ether, ketone and ester each may have a cyclic structure. A compound having two or more functional groups of the ester, ketone and ether (that is, —O—, —CO— and —COO—) may also be used as the solvent. The organic solvent may have another functional group such as alcoholic hydroxyl group. In the case of an organic solvent having two or more functional groups, the number of carbon atoms is preferably within the range specified for the solvent having any one of the functional groups.

Examples of the ethers having a carbon number of 3 to 12 include diisopropyl ether, dimethoxymethane, dimethoxyethane, 1,4-dioxane, 1,3-dioxolane, tetrahydrofuran, anisole and phenetole.

Examples of the ketones having a carbon number of 3 to 12 include acetone, methyl ethyl ketone, diethyl ketone, diisobutyl ketone, cyclohexanone and methylcyclohexanone.

Examples of the esters having a carbon number of 3 to 12 include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The number of carbon atoms in the halogenated hydrocarbon having a carbon number of 1 to 6 is preferably 1 or 2 and most preferably 1. The halogen of the halogenated hydrocarbon is preferably chlorine. The proportion at which the hydrogen atom of the hydrogenated hydrocarbon is substituted by a halogen is preferably from 25 to 75 mol %, more preferably from 30 to 70 mol %, still more preferably from 35 to 65 mol %, and most preferably from 40 to 60 mol %. A representative halogenated hydro-carbon is methylene chloride.

Two or more kinds of organic solvents may be mixed and used.

A cellulose acylate solution (dope) can be prepared by a normal method comprising performing a treatment at a temperature of 0° C. or more (ordinary temperature or high temperature). The preparation of the cellulose acylate solution can be performed using a method and an apparatus for dope preparation in the general solvent casting method. In the case of a normal method, a halogenated hydrocarbon (particularly, methylene chloride) is preferably used as the organic solvent.

The amount of the cellulose acylate in the cellulose acylate solution is adjusted to occupy from 10 to 40 mass % in the solution obtained. The amount of the cellulose acylate is preferably from 10 to 30 mass %. An arbitrary additive described later may be previously added in the organic solvent (main solvent).

A cellulose acylate solution can be prepared by stirring a cellulose acylate and an organic solvent at an ordinary temperature (from 0 to 40° C.). A solution in a high concentration may be stirred under pressure and heating conditions. Specifically, a cellulose acylate and an organic solvent are charged into a pressure vessel and after sealing the vessel, the mixture is stirred under pressure while heating at a temperature in the range from a temperature not less than the boiling point of the solvent at ordinary temperature to a temperature not allowing for boiling of the solvent. The heating temperature is usually 40° C. or more, preferably from 60 to 200° C., more preferably from 80 to 110° C.

The components may be previously roughly mixed and then charged into a vessel or may be successively charged into the vessel. The vessel needs to be constructed so that stirring can be performed. The vessel can be pressurized by injecting an inert gas such as nitrogen gas. Also, the increase in vapor pressure of the solvent due to heating may be utilized. Alternatively, the components may be added under pressure after sealing the vessel.

In the case of performing heating, the heating is preferably applied from outside of the vessel. For example, a jacket-type heating device may be used. Also, the entire vessel may be heated by providing a plate heater outside the vessel, laying a piping system and circulating a liquid.

The stirring is preferably performed using a stirring blade by providing the stirring blade inside the vessel. A stirring blade having a length long enough to reach near the wall of the vessel is preferred. The tip of the stirring blade is preferably equipped with a scraping blade for renewing the liquid film on the wall of the vessel.

The vessel may be equipped with measuring meters such as pressure gauge and thermometer. Each component is dissolved in a solvent within the vessel. The dope prepared is cooled and then taken out of the vessel, or the dope is taken out of the vessel and then cooled using a heat exchanger or the like.

The cellulose acylate solution may also be prepared by a cooling dissolution method. According to the cooling dissolution method, the cellulose acylate can be dissolved even in an organic solvent where cellulose acylate can be hardly dissolved by an ordinary dissolution method. Incidentally, the cooling dissolution method has an effect that a uniform solution can be rapidly obtained also with a solvent which can dissolve cellulose acylate by an ordinary dissolution method.

In the cooling dissolution method, first, a cellulose acylate is gradually added to an organic solvent with stirring at room temperature. The amount of the cellulose acylate is preferably adjusted to occupy from 10 to 40 mass % in the mixture. The amount of the cellulose acylate is more preferably from 10 to 30 mass %. Furthermore, an arbitrary additive described later may be previously added in the mixture.

Next, the mixture is cooled to −100 to −10° C. (preferably from −80 to −10° C., more preferably from −50 to −20° C., and most preferably from −50 to −30° C.). The cooling can be performed, for example, in a dry ice-methanol bath (−75° C.) or a cooled diethylene glycol solution (from −30 to −20° C.). By the cooling, the mixture of cellulose acylate and organic solvent is solidified.

The cooling rate is preferably 4° C./min or more, more preferably 8° C./min or more, and most preferably 12° C./min or more. The cooling rate is preferably higher, but the theoretical upper limit is 10,000° C./sec, the technical upper limit is 1,000° C./sec, and the practical upper limit is 100° C./sec. Incidentally, the cooling rate is a value obtained by dividing the difference between the temperature at the beginning of cooling and the final cooling temperature by the time spent from the beginning of cooling to reaching the final cooling temperature.

Furthermore, when the cooled mixture is heated to 0 to 200° C. (preferably from 0 to 150° C., more preferably from 0 to 120° C., and most preferably from 0 to 50° C.), the cellulose acylate dissolves in the organic solvent. The temperature may be elevated by allowing the mixture to stand at room temperature or by heating it in a warm bath. The heating rate is preferably 4° C./min or more, more preferably 8° C./min or more, and most preferably 12° C./min or more. The heating rate is preferably higher, but the theoretical upper limit is 10,000° C./sec, the technical upper limit is 1,000° C./sec, and the practical upper limit is 100° C./sec. Incidentally, the heating rate is a value obtained by dividing the difference between the temperature at the beginning of heating and the final heating temperature by the time spent from the beginning of heating to reaching the final heating temperature.

In this way, a uniform cellulose acylate solution can be obtained. In the case where dissolution is insufficient, the operation of cooling and heating may be repeated. Whether dissolution is sufficient or not can be judged only by observing the outer appearance of the solution with an eye.

In the cooling dissolution method, a closed vessel is preferably used so as to avoid intermingling of water due to dew condensation at the cooling. Also, in the cooling and heating operation, when a pressure is added at the cooling and the pressure is reduced at the heating, the dissolution time can be shortened. For performing pressure addition and pressure reduction, a pressure vessel is preferably used.

Incidentally, in a 20 mass % solution obtained by dissolving a cellulose acetate (acetylation degree: 60.9%, viscosity average polymerization degree: 299) in methyl acetate by the cooling dissolution method, according to the measurement by a differential scanning calorimeter (DSC), a pseudo phase transition point between a sol state and a gel state is present in the vicinity of 33° C., and the solution comes into a uniform gel state at a temperature not more than this temperature. Accordingly, the solution is preferably kept at a temperature not lower than the pseudo phase transition temperature or at a temperature of the gel phase transition temperature plus about 10° C. However, this pseudo phase transition temperature varies depending on the acetylation degree, viscosity average polymerization degree and solution concentration of cellulose acetate or the organic solvent used.

A cellulose acylate film is produced from the prepared cellulose acylate solution (dope) by a solvent casting method. A retardation developer is preferably added to the dope. The dope is cast on a drum or a band, and the solvent is evaporated to form a film. The concentration of the dope before casting is preferably adjusted to have a solid content of 18 to 35%. The surface of the drum or band is preferably finished in a mirror state. The dope is preferably on a drum or band at a surface temperature of 10° C. or less.

The drying method in the solvent casting method is described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430, and JP-A-62-115035. Drying on the band or drum can be performed by blowing air or an inert gas such as nitrogen.

The obtained film is separated from the drum or band and may be further dried with hot air by sequentially changing the temperature from 100° C. to 160° C. to evaporate the residual solvent. This method is described in JP-B-5-17844. According to this method, the time from casting and separation can be shortened. In order to practice this method, the dope needs to be gelled at the surface temperature of the drum or band during casting.

The film may also be formed by casting the prepared cellulose acetate solution (dope) in two or more layers. In this case, the cellulose acylate film is preferably produced by a solvent casting method. The dope is cast onto a drum or a band and the solvent is evaporated to form a film. The concentration of the dope before casting is preferably adjusted to have a solid content of 10 to 40 mass %. The surface of the drum or band is preferably finished in a mirror state.

In the case of casting the cellulose acetate solution in a plurality of layers of two or more layers, a plurality of cellulose acetate solutions can be cast, and the cellulose acylate-containing solutions may be respectively cast from a plurality of casting ports provided with spacing in the support travelling direction to form a film while stacking layers one on another. This casting can be performed using the method described, for example, in JP-A-61-158414, JP-A-1-122419 and JP-A-11-198285. Also, a film can be formed by casting the cellulose acetate solution from two casting ports. This casting can be performed using the method described, for example, in JP-B-60-27562, JP-A-61-94724, JP-A-61-947245, JP-A-61-104813, JP-A-61-158413 and JP-A-6-134933. Furthermore, the casting method of a cellulose acetate film described in JP-A-56-162617 may also be used, where a flow of a high-viscosity cellulose acetate solution is enveloped with a low-viscosity cellulose acetate solution and the high-viscosity and low-viscosity cellulose acetate solutions are simultaneously extruded.

In addition, the film can also be produced using two casting ports by separating the film cast from a first casting dye and formed on a support and performing the second casting on the side which had been in contact with the support surface. For example, the method described in JP-B-44-20235 may be used.

The cellulose acylate solutions may be the same solution, or two or more different cellulose acylate solutions may be used. In order to impart functions to a plurality of cellulose acylate layers, a cellulose acylate solution according to the function may be extruded from each casting port. The cellulose acylate solution for use in the present invention may also be cast simultaneously with other functional layers (for example, adhesive layer, dye layer, antistatic layer, antihalation layer, ultraviolet absorbing layer and polarizing layer).

Many of conventional single-layer solutions have a problem that a cellulose acylate solution having a high concentration and a high viscosity must be extruded so as to obtain a required film thickness and in this case, the cellulose acylate solution has bad stability to cause particle failure or poor planarity. For solving this problem, a plurality of cellulose acylate solutions are cast from casting ports, whereby high-viscosity solutions can be simultaneously extruded on a support and not only the planarity can be enhanced and a film having excellent surface state can be produced but also the drying load can be reduced by virtue of use of thick cellulose acylate solutions and the production speed of film can be elevated.

In the cellulose acylate film, a deterioration inhibitor (e.g., antioxidant, peroxide decomposer, radical inhibitor, metal deactivator, acid scavenger, amine) may be added. The degradation inhibitor is described in JP-A-3-199201, JP-A-5-1907073, JP-A-5-194789, JP-A-5-271471 and JP-A-6-107854. The amount of the deterioration inhibitor added is preferably from 0.01 to 1 mass %, more preferably from 0.01 to 0.2 mass %, based on the solution (dope) prepared. When the amount added is 0.01 mass % or more, the effect of the deterioration inhibitor can be satisfactorily brought out and this is preferred, whereas when the amount added is 1 mass % or less, bleeding out (oozing) of the deterioration inhibitor to the film surface is advantageously less caused. Preferred examples of the deterioration inhibitor include butylated hydroxytoluene (BHT) and tribenzylamine (TBA).

In the cellulose acylate film, a fine particle is preferably added as a matting agent. Examples of the fine particle for use in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Among these, a fine particle containing silicon is preferred in view of giving low turbidity, and silicon dioxide is more preferred. The fine silicon dioxide particle is preferably a fine particle having an average primary particle diameter of 20 nm or less and an apparent specific gravity of 70 g/liter ore more. The apparent specific gravity is preferably from 90 to 200 g/liter or more, more preferably from 100 to 200 g/liter or more. As the apparent specific gravity is larger, a liquid dispersion having a higher concentration can be prepared and this is preferred in view of haze and aggregate.

Such a fine particle usually forms a secondary particle having an average particle diameter of 0.1 to 3.0 μm and in the film, this particle is present as an aggregate of primary particles to form irregularities of 0.1 to 3.0 μm on the film surface. The average secondary particle diameter is preferably from 0.2 to 1.5 μm, more preferably from 0.4 to 1.2 μm, and most preferably from 0.6 to 1.1 μm. With respect to the primary and secondary particle diameters, particles in the film are observed through a scanning electron microscope, and the diameter of a circle circumscribing a particle is defined as the particle diameter. Also, 200 particles are observed by changing the site and the average value thereof is defined as the average particle diameter.

The fine silicon dioxide particle used may be a commercially available product such as Aerosil R972, R972V, R974, R812, 200, 200V, 300, R202, OX50 and TT600 (all produced by Nihon Aerosil Co., Ltd.). The fine zirconium oxide particle is commercially available under the trade name of, for example, Aerosil R976 or R811 (both produced by Nihon Aerosil Co., Ltd.), and these may be used.

Among these, Aerosil 200V and Aerosil R972V are preferred because these are a fine silicon dioxide particle having an average primary particle diameter of 20 nm or less and an apparent specific gravity of 70 g/liter or more and provide a high effect of decreasing the coefficient of friction while maintaining low turbidity of the optical film.

In the present invention, in order to obtain a cellulose acylate film containing a particle having a small average secondary particle diameter, several techniques may be employed at the preparation of a fine particle liquid dispersion. For example, in one method, a solvent and a fine particle are mixed with stirring to previously prepare a fine particle liquid dispersion, the obtained fine particle liquid dispersion is added to a small amount of a separately prepared cellulose acylate solution and then dissolved with stirring, and the resulting solution is further mixed with a main cellulose acylate solution (dope solution). This preparation method is preferred in that good dispersibility of the fine silicone dioxide particle is, ensured and re-aggregation of the fine silicon dioxide particle scarcely occurs. In another method, a small amount of a cellulose acylate is added to a solvent and then dissolved with stirring, a fine particle is added thereto and dispersed by a disperser to obtain a fine particle-added solution, and the fine particle-added solution is thoroughly mixed with a dope solution by an in-line mixer. The present invention is not limited to these methods, but at the time of mixing and dispersing the fine silicon dioxide particle with a solvent or the like, the concentration of silicon dioxide is preferably from 5 to 30 mass %, more preferably from 10 to 25 mass %, and most preferably from 15 to 20 mass %. A higher dispersion concentration is preferred because the liquid turbidity for the amount added becomes low and the haze and aggregate are improved. In the final dope solution of cellulose acylate, the amount of the matting agent fine particle added is preferably from 0.01 to 1.0 g/m³, more preferably from 0.03 to 0.3 g/m³, and most preferably from 0.08 to 0.16 g/m³.

As for the solvent used here, preferred examples of the lower alcohols include methyl alcohol, ethyl alcohol, propyl alcohol, isopropyl alcohol and butyl alcohol. The solvent other than the lower alcohol is not particularly limited, but the solvent used at the film formation of cellulose acylate is preferably used.

The steps from casting to drying may be performed under air atmosphere or inert gas atmosphere such as nitrogen gas. The take-up machine used for the production of the cellulose acylate film of the present invention may be a generally employed machine, and the film can be taken up by a take-up method such as constant tension method, constant torque method, taper tension method and programmed tension control method keeping constant the inner stress.

[Stretching Treatment]

For the Re reverse-dispersion film of the present invention, a cellulose acylate film subjected to a stretching treatment (stretched cellulose acylate film) is preferably used. By the stretching treatment, a desired retardation can be imparted to the cellulose acylate film. As for the stretching direction of the cellulose acylate film, either the width direction or the longitudinal direction is preferred.

The stretching method in the width direction is described, for example, in JP-A-62-115035, JP-A-4-152125, JP-A-4-284211, JP-A-4-298310 and JP-A-11-48271.

The stretching of the film is performed under heating condition. The film may be stretched by a treatment during drying, and this is effective particularly when the solvent remains. In the case of stretching in the longitudinal direction, for example, the film can be stretched by adjusting the speed of the film conveying roller to make the film take-up speed higher than the film separation speed. In the case of stretching in the width direction, the film can be stretched also by conveying the film while holding the film width by a tenter, and gradually increasing the width of the tenter. The film may also be stretched after drying, by using a stretching machine (preferably uniaxial stretching using a long stretching machine).

The stretching temperature of the Re reverse-dispersion film of the present invention is preferably from a glass transition temperature (hereinafter referred to as "Tg") to (Tg+50° C.). The stretching temperature is more preferably from Tg to (Tg+30° C.).

Also, in the case where the Re reverse-dispersion film of the present invention contains a liquid crystalline Re developer, the stretching is preferably performed in a temperature region where the Re developer exhibits liquid crystallinity, that is, from the melting point (hereinafter referred to as "Tm") to the isotropic phase temperature (hereinafter referred to as "Ti") of the Re developer, more preferably at a temperature of (Tm+10° C.) or more. In the case of mixing two or more kinds of liquid crystalline compounds, the film is preferably stretched at from Tm to Ti of the mixture. By stretching the film at a temperature in the above-described range, the Re developer can be oriented to a large degree.

The Tm and Ti of the Re developer can be determined by the method described, for example, in *Ekisho no Kagaku* (*Chemistry of Liquid Crystal*), pp. 32-33. When a sample is heated under observation through a polarizing microscope, the temperature at which the crystal melts is designated as Tm, and the temperature at which the sample is deprived of clouding ascribable to liquid crystallinity and becomes transparent is designated as Ti.

The stretch ratio (percentage elongation based on the film before stretching) of the Re reverse-dispersion film of the present invention is preferably from 1 to 200%, more preferably from 5 to 150%. Particularly, the film is preferably stretched in the width direction at a stretch ratio of 1 to 200%, more preferably from 5 to 150%. The stretching speed is preferably from 1 to 300%/min, more preferably from 10 to 300%/min, and most preferably from 30 to 300%/min.

The stretched cellulose acylate film of the present invention is preferably produced by, after stretching to a maximum stretch ratio, passing through a step of holding the film at a stretch ratio lower than the maximum stretch ratio for a fixed time (hereinafter, sometimes referred to as a "relaxing step"). The stretch ratio in the relaxing step is preferably from 50 to 99%, more preferably from 70 to 97%, and most preferably from 90 to 95%, based on the maximum stretch ratio. Also, the time of the relaxing step is preferably from 1 to 120 seconds, more preferably from 5 to 100 seconds.

Furthermore, the Re reverse-dispersion film of the present invention can be preferably produced by providing a shrinking step of shrinking the film in the width direction while gripping the film.

In the production method comprising a stretching step of stretching the film in the width direction and a shrinking step of shrinking the film in the film conveying direction, the film is held by a pantograph-type or linear motor-type tenter, and the distance between clips is gradually decreased in the conveying direction while stretching the film in the width direction, whereby the film can be shrunk.

In the method described above, the stretching step and the shrinking step are at least partially performed at the same time.

As regards the stretching apparatus for specifically performing the above-described stretching step where the film is stretched either in the longitudinal direction or the width direction and at the same time, the film is shrunk in the other direction, thereby simultaneously increasing the thickness of the film, a FITZ machine manufactured by Ichikin Industry Co., Ltd. may be suitably used. This stretching machine is described in JP-A-2001-38802.

As for the stretch ratio in the stretching step and the percentage shrinking in the shrinking step, an appropriate value may be arbitrarily selected by the objective values of in-plane retardation Re and retardation Rth in a thickness-direction, but the stretch ratio in the stretching step is preferably 10% or more, and the percentage shrinking in the shrinking step is preferably 5% or more.

In particular, the method preferably contains a stretching step of stretching the film by 10% or more in the width direction and a shrinking step of shrinking the film by 5% or more in the conveying direction while gripping the film in the film width direction.

Here, the term "percentage shrinkage" as used in the present invention means a ratio of the shrunk length of the film after shrinking to the length of the film before shrinkage in the shrinking direction.

The percentage shrinkage is preferably from 5 to 40%, more preferably from 10 to 30%.

[Thickness of Stretched Cellulose Acylate Film]

The thickness of the stretched cellulose acylate film for use in the present invention is preferably from 30 to 70 μm, more preferably from 30 to 60 μm, and most preferably from 30 to 50 μm.

[Saponification Treatment]

The Re reverse-dispersion film of the present invention may be imparted with adhesion to a polarizer material such as polyvinyl alcohol by applying an alkali saponification treatment thereto and can be used as a polarizing plate protective film.

In the present invention, the alkali saponification treatment of the cellulose acylate film is preferably performed, for example, by a cycle consisting of dipping of the film surface in an alkali solution, neutralization with an acidic solution, water-washing and drying. The alkali solution includes a potassium hydroxide solution and a sodium hydroxide solution, and the hydroxide ion concentration is preferably from 0.1 to 5.0 mol/L, more preferably from 0.5 to 4.0 mol/L. The temperature of the alkali solution is preferably from room temperature to 90° C., more preferably from 40 to 70° C.

<Production of Polarizing Plate>

(Polarizing Plate Protective Film)

The protective film for use in the polarizing plate of the present invention is described below.

The protective film for use in the present invention is preferably a polymer film produced from norbornene resin, polyethylene terephthalate, polyethylene naphthalate, polycarbonate, polystyrene, polyallylate, polysulfone, cellulose acylate, polyacrylate or the like.

The polarizing plate of the present invention has two protective films in total on both sides of a polarizer, that is, one sheet on each side, and at least one sheet of these two protective films preferably also has a function as a phase difference film. In the case of using the polarizing plate of the present invention for a liquid crystal display device, at least one liquid crystal cell-side protective film of two polarizing plates dispose on both sides of a liquid crystal cell is the resin film of the present invention.

In the polarizing plate of the present invention, at least one protective film on the opposite side to the liquid crystal cell with respect to the polarizer preferably has a moisture permeability of 0 to 1,500 g/m$^2$·day, more preferably from 0 to 1,000 g/m$^2$·day, and most preferably from 0 to 300 g/m$^2$·day.

As for the measuring method of moisture permeability, the methods described in "Measurement of Amount of Water Vapor Permeated (mass method, thermometer method, vapor pressure method, adsorption amount method)" of *Kobunshi Jikken Koza* 4, *Kobunshi no Bussei II* (*Polymer Experiment Lecture* 4, *Physical Properties II of Polymers*), pp. 285-294, Kyoritsu Shuppan, can be applied. After a film sample (70 mmφ) of the present invention is humidity-conditioned for 24 hours at 60° C. and 95% RH, the water content per unit area (g/m$^2$) can be calculated according to JIS Z-0208 by moisture permeability=mass after humidity conditioning−mass before humidity conditioning. In the case of measuring the moisture permeability of a polarizing plate protective film having a resin layer comprising a vinyl alcohol-based polymer, a sample is set in a manner of the resin layer provided on a transparent substrate film coming into contact with the measuring cup, and the moisture permeability from the transparent substrate side is measured.

By incorporating into a liquid crystal cell the polarizing plate in which the moisture permeability of the protective film on the opposite side to the liquid crystal cell with respect to the polarizer is controlled to fall in the above-described range, a liquid crystal display device less causing unevenness even when continuously lighted under high-temperature high-humidity conditions can be obtained.

As regards the film of which moisture permeability is controlled to the above-described range (hereinafter sometimes referred to as a "low moisture-permeability film"), for example, a cycloolefin-based film such as Zeonoah produced by Zeon Corp. and Arton produced by JSR, and a lactone-containing resin film disclosed in JP-A-2006-171464 may be preferably used.

A film reduced in the moisture permeability by providing a coat layer on one surface of a polymer film having excellent adhesion to a polarizer (polyvinyl alcohol), such as cellulose acylate, may also be preferably used as the low moisture-permeability film of the present invention. The coat layer preferably used for the low moisture-permeability film of the present invention is described below.

[Coat Layer]

The coat layer for use in the present invention has a moisture permeability of 300 g/m²·day or less at 60° C. and a relative humidity of 95%, and a polyvinyl alcohol, an ethylene polyvinyl alcohol copolymer, a resin particle having dispersed therein an inorganic layered compound, a silica-based composition, other hydrophobic compounds and the like are used. The coat layer using these individually is described in detail below. As for the value of the moisture permeability used in the present invention, in the case of measuring a polarizing plate protective film having a coat layer formed of a polyvinyl alcohol, an ethylene vinyl alcohol copolymer or such a resin layer having dispersed therein an inorganic layered compound, the value of moisture permeability from the side of a transparent substrate film comprising cellulose acylates is used. Generally, in using a vinyl alcohol-based resin, when the resin layer is directly exposed to a high-humidity condition, its moisture permeability significantly decreases and the value of moisture permeability from the resin layer side is not included in the range of the present invention in many cases, but as long as the value of moisture permeability from the substrate film side satisfies the range of 300 g/m²·day or less, the effect of enhancing the heat and humidity resistance of the polarizing plate can be sufficiently brought out.

1. Coat Layer Formed of a Resin Comprising a Vinyl Alcohol-Based Polymer or Formed of a Resin Containing an Inorganic Layered Compound in a Vinyl Alcohol-Based Polymer Composition 1-(1) Vinyl Alcohol-Based Polymer Examples of the vinyl alcohol-based polymer constituting the coat layer include a homopolymer such as polyvinyl alcohol (PVA), and an ethylene-vinyl alcohol copolymer (EVOH). As for the vinyl alcohol-based polymer, a partially carbonyl-modified, silanol-modified, epoxy-modified, acetoacetyl-modified, amino-modified or ammonium-modified polymer may also be used, and a copolymer partially containing a diacetone acrylamide unit or the like may also be used. Furthermore, one of various vinyl alcohol-based polymers may be used alone, or two or more thereof may be used in combination.

The saponification degree of the vinyl alcohol-based polymer may be selected from the range of 80 mol % or more but is preferably 96 mol % or more, more preferably 99 mol % or more. In view of moisture permeability and coatability, the polymerization degree of the vinyl alcohol-based polymer is suitably from 200 to 5,000, preferably from 400 to 5,000, more preferably on the order of 500 to 3,000.

1-(2) Other Components

In the present invention, a crosslinking agent for the vinyl alcohol-based polymer may be further contained as a component of the resin composition, in addition to the vinyl alcohol-based polymer and the layered inorganic compound described later, and the water resistance of the adhesion layer can be thereby enhanced. The crosslinking agent which can be used for this purpose is not particularly limited, and known crosslinking agents all may be preferably used. Examples of the crosslinking agent include phenol resin, melamine resin, urea resin, polyamidopolyurea, dimethylolurea, dimethylolmelamine, a polyvalent epoxy compound, a dialdehyde compound, a polyvalent isocyanate resin, an azilidine compound, a polyamidoamine epichlorohydrin compound, an activated vinyl compound, a dicarbonate compound, a hydrazino group-containing compound (polyvalent carboxylic acid polyhydrazide compound), colloidal silica, a zirconium salt, a polyvalent metal salt, a boric acid, a phosphoric acid, a polyacrylic acid, a dicarboxylic acid, an adipic anhydride, a succinic anhydride, and a titanium compound such as tetraisopropyl titanate and diisopropoxybis(acetylacetone) titanate. Other than these, for example, a coupling agent such as 3-glycidopropylmethoxysilane, and a radical generator such as peroxide, may also be used. A catalyst for accelerating the crosslinking reaction, or other additives may also be added.

The amount of the crosslinking agent is, in terms of (crosslinking agent/(vinyl alcohol-based polymer+crosslinking agent)), preferably 0.5 mass % or more, more preferably 1 mass % or more, still more preferably 2 mass % or more. If the mass ratio of the crosslinking agent to both the PVA-based polymer and the crosslinking agent is less than 0.5 mass %, the effect by the addition of crosslinking agent is not brought out. The mass ratio of the crosslinking agent to both the vinyl alcohol-based polymer and the crosslinking agent is preferably 50 mass % or less, more preferably 40 mass % or less, still more preferably 30 mass % or less. Some of the crosslinking agents such as aldehyde-based compound are discolored yellow due to heat and in the case of using such a crosslinking agent, the amount added thereof needs to be reduced to suppress the discoloration to the allowable range.

1-(3) Formation of Coat Layer

The coat layer comprising a vinyl alcohol-based polymer or comprising a vinyl alcohol-based polymer and an inorganic layered compound can be formed on the transparent substrate film by using a applying system described later. Here, a method of adjusting the viscosity of the applying solution by adding a viscosity-adjusting agent such as thickener so that the viscosity property of the liquid can be optimized for the applying apparatus at the film formation, may also be employed. In order to more enhance the moisture resistance and water resistance of the coat layer, after applying the coat layer on the substrate formed of cellulose acylates, the resin layer is preferably heat-treated at 90 to 150° C., more preferably from 130 to 150° C. The heat treating time is, in view of productivity and water resistance, preferably from 1 to 20 minutes, more preferably from 5 to 15 minutes. Also, in view of adhesion between the resin layer and the cellulose acylate substrate, it is preferred to previously saponify the cellulose acylate.

1-(4) Thickness, Haze and Surface Roughness of Coat Layer

The thickness of the coat layer is preferably from 1 to 30 μm, more preferably on the order of 3 to 20 μm. The haze value of the resin layer produced is preferably 30% or less, more preferably 10% or less, still more preferably 8% or less, and the internal haze value is preferably 10% or less, more preferably 5% or less, still more preferably 1% or less.

Also, it is preferred that the arithmetic average roughness Ra of the surface is 0.2 or less, the root-mean-square roughness Rq is 0.2 or less, and the ten-point average roughness Rz is 1.5 or less.

1-(5) Construction

As shown in FIGS. 1A and 1B or FIGS. 1C and 1D, each being a constitutional view of the polarizing plate, the coat layer may be provided between the polarizer and the transparent substrate film, may be provided on the opposite side to the polarizer across the transparent substrate film, or may be provided on both. In view of productivity at the processing into a polarizing plate, coatability of a hardcoat layer, and the like, the resin layer is preferably provided between the polarizer and the transparent substrate film, but even when the resin layer is provided on the opposite side to the polarizer across the transparent substrate film, the productivity at the processing into a polarizing plate is not decreased and by providing an easy adhesion layer described later on the resin layer, a layer having hardcoat property or the like can be further provided thereon.

2. Coat Layer Formed of a Silica-Based Applied Film

The silica-based applied film for use in the present invention is provided on at lest one layer of a transparent substrate film comprising cellulose acylates and needs to satisfy both denseness and softness so as to achieve the objective moisture permeability and at the same time, endure the practical use as a polarizing plate protective film. Accordingly, only a silica film which is a hydrolysate prepared through hydrolysis and condensation by adding a catalyst and water to alkoxysilane is insufficient in the flexibility and not suitable for the present invention. In the present invention, a applied film containing a compound comprising alkoxysilane, a compound having a hydroxyl group or a functional group capable of reacting with an alkoxyl group, and/or a silane coupling agent is preferably used. A applied film containing all of a compound comprising alkoxysilane, a compound having a hydroxyl group or a functional group capable of reacting an alkoxyl group, and a silane coupling agent is more preferred.

2-(1) Compound Comprising Alkoxysilane

The compound comprising alkoxysilane for use in the present invention is, for example, represented by the following formula (2-1):

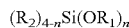　　　　　　　　　　　　　　　Formula (2-1):

(wherein $R_1$ represents a hydrogen atom, an alkyl group or an acyl group, $R_2$ represents a hydrogen atom, an alkyl group or an aromatic group, and n represents a number of 2 to 4).

Examples of the alkyl group represented by $R_1$ include a methyl group, an ethyl group, a propyl group and a butyl group. Examples of the acyl group include an acetyl group and a propionyl group. The alkyl group is preferably a methyl group, an ethyl group or a propyl group, and most preferably an ethyl group. n is preferably a number of 2 to 4, more preferably from 3 to 4, and most preferably 4. Accordingly, a tetraalkoxysilane is preferred, tetramethoxysilane, tetraethoxysilane and tetrapropoxysilnae are more preferred, and tetraethoxysilane is still more preferred. When n is 2 or 3, examples of the alkyl group represented by $R_2$ include an alkyl group having a carbon number of 1 to 18, preferably from 1 to 5, and examples of the aromatic group include a phenyl group.

2-(2) Compound Having a Hydroxyl Group or a Functional Group Capable of Reacting with an Alkoxyl Group In the present invention, a compound having a hydroxyl group or a functional group capable of reacting with an alkoxyl group can be used. A monomer, oligomer or polymer having a hydroxyl group or a functional group capable of reacting with an alkoxyl group is preferably used, and the compound can be used without any particular limitation as long as it has a hydroxyl group or a functional group capable of reacting with an alkoxyl group. For example, a hydroxyl group-containing monomer, oligomer or polymer using a thermosetting, ionizing radiation-curable or moisture-curable resin or the like selected from an acrylic resin, a polyester-based resin, an epoxy-based resin, a urethane-based resin and a melamine-based resin is more preferred, a hydroxyl group-containing polymer is still more preferred, a vinyl alcohol-based polymer such as polyvinyl alcohol (PVA) homopolymer and ethylene-vinyl alcohol copolymer (EVOH) is yet still more preferred, and a polyvinyl alcohol (PVA) homopolymer is most preferred. Furthermore, for example, the vinyl alcohol-based polymer which is partially modified with a carbonyl group or the like, or the copolymer which partially contains a diacetone acrylamide unit or the like, may also be used. One of various vinyl alcohol-based polymers may be used alone, or two or more thereof may be used in combination.

As for the vinyl alcohol-based compound which can be preferably used as the compound having a hydroxyl group or a functional group capable of reacting with an alkoxyl group, the saponification degree of the vinyl alcohol-based polymer may be selected from the range of 80 mol % or more but is preferably 96 mol % or more, more preferably 98 mol % or more. In view of moisture permeability and coatability, the polymerization degree of the vinyl alcohol-based polymer is suitably from 200 to 5,000, preferably from 400 to 5,000, more preferably on the order of 500 to 3,000.

2-(3) Silane Coupling Agent

In the present invention, a silane coupling agent can be used. The silane coupling agent is not particularly limited as long as it is a compound having an alkoxysilane at the terminal, but a compound at the same time having a vinyl group, an epoxy group, an acryl group, a methacryl group, an amine group, a mercapto group, a hydroxyl group, an isocyanate group, a carboxyl group or an acid anhydride group is more preferred, and a compound having an epoxy group, an amine group, an acryl group or a methacryl group is still more preferred.

Examples of the vinyl group-containing silane coupling agent which can be preferably used include vinyltrichlorosilane, vinyltrimethoxysilane, vinyltriethoxysilane and vinyl-tris(β-methoxyethoxy)silane.

Examples of the epoxy group-containing silane coupling agent which can be preferably used include β-(3,4-epoxycyclohexyl)ethyltrimethoxysilane, β-(3,4-epoxycyclohexyl)ethyltriethoxysilane, γ-glycidoxypropyltrimethoxysilane, γ-glycidoxypropylmethyldiethoxysilane and γ-glycidoxypropyltriethoxysilane.

Examples of the acryl group- or methacryl group-containing silane coupling agent which can be preferably used include γ-methacryloxypropylmethyldimethoxysilane, γ-methacryloxypropyltrimethoxysilane, γ-methacryloxypropylmethyldiethoxysilane and γ-methacryloxypropyltriethoxysilane.

Examples of the amine group-containing silane coupling agent which can be preferably used include N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane and N-phenyl-γ-aminopropyltrimethoxysilane.

Examples of the mercapto group-containing silane coupling agent which can be preferably used include γ-mercaptopropyltrimethoxysilane and γ-mercaptopropyl-triethoxysilane.

Examples of the isocyanate group-containing silane coupling agent which can be preferably used include γ-isocyanatopropyltrimethoxysilane and γ-isocyanatopropyl-triethoxysilane.

In the present invention, the silane coupling agent is sometimes used at the same time with the compound having a hydroxyl group or a functional group capable of reacting with an alkoxyl group. Therefore, for crosslinking the compound having a hydroxyl group or a functional group capable of reacting with an alkoxyl group, a silane coupling agent having an epoxy group is preferably used.

Also, in the present invention, the silane coupling agent is used at the same time with the compound comprising an alkoxysilane and therefore, in view of increasing the reaction rate of dehydration polycondensation of the alkoxysilane, a silane coupling agent having an amine group is preferably used.

In the present invention, a layer having a hardcoat property is preferably provided on the coat layer and for enhancing the interlayer adhesion with the layer having a hardcoat property, it is particularly preferred to use a silane coupling agent having an acryl group or a methacryl group.

Another preferred embodiment of the silane coupling agent which can be used in the present invention is a silane coupling agent having an alkoxysilane at both terminals. The silane coupling agent having an alkoxysilane at both terminals can crosslink with the compound comprising an alkoxysilane and is therefore preferred, and preferred examples of the compound as the silane coupling agent having an alkoxysilane at both terminals include an organic chain-containing both-terminal functional silane monomer described in JP-A-2000-326448.

In the present invention, a hydrolysate of the silane coupling agent, and a partial condensate of the hydrolysate of the silane coupling agent can also be preferably used. The silane coupling agent as used in the present invention includes a hydrolysate of the silane coupling agent and a partial condensate of the hydrolysate of the silane coupling agent.

The silane coupling agents having an epoxy group, an amine group, an acryl group or a methacryl group may be used individually, but use of two or more species thereof in combination is preferred, and use of three or more species thereof in combination is more preferred. It is still more preferred that a tertiary amine or the like soluble in an organic solvent is used as the polycondensation catalyst so as to increase the reaction rate and two members of an epoxy group-containing silane coupling agent and an acryl group- or methacryl group-containing silane coupling are used at the same time.

Assuming that the contents of the compound comprising an alkoxysilane, the compound having a hydroxyl group or a functional group capable of an alkoxyl group, and the silane coupling agent are a mass %, b mass % and c mass %, respectively (in this case, the content of the compound comprising an alkoxysilane is determined from a calculated value after polycondensation when the condensation is ideally performed), in the case of using two members of a compound comprising an alkoxysilane and a compound having a hydroxyl group or a functional group capable of reacting with an alkoxyl group, a/b is preferably from 10/90 to 90/10, more preferably from 20/80 to 80/20, still more preferably from 40/60 to 80/20. In the case of using two members of a compound comprising an alkoxysilane and a silane coupling agent, a/c is preferably from 40/60 to 95/5, more preferably from 50/50 to 90/10. In the case of using all together three members of a compound comprising an alkoxysilane, a compound having a hydroxyl group or a functional group capable of reacting with an alkoxyl group, and a silane coupling agent, a/(b+c) is preferably from 10/90 to 90/10, more preferably from 20/80 to 80/20, still more preferably from 40/60 to 80/20. In this case, b/c is preferably from 10/90 to 90/10, more preferably from 20/80 to 80/20, still more preferably from 40/60 to 80/20.

2-(4) Other Components

In the present invention, as described above, a catalyst and water are used for allowing the polycondensation reaction of the compound comprising an alkoxysilane to proceed. Examples of the curing catalyst include an acid such as hydrochloric acid, nitric acid, acetic acid, oxalic acid, maleic acid and fumaric acid, a tertiary amine soluble in an organic solvent, such as N,N-dimethylbenzylamine, tripropylamine, tributylamine and tripentylamine, an organic metal, and a metal alkoxide. The amount of the catalyst added is preferably from 1 to 10 parts by mass, more preferably from 1 to 5 parts by mass, per 100 parts by mass of the compound comprising an alkoxysilane. Water is preferably added in an amount more than the amount allowing for theoretically 100% hydrolysis of the partial hydrolysate, more preferably in a 100 to 300%-equivalent amount, still more preferably in a 120 to 200%-equivalent amount. In the present invention, an ultraviolet absorbent may be further contained in the coat layer, if desired. In the case of using a silane coupling agent having an acryl group or a methacryl group, it is also preferred to contain a photoinitiator which is described later in the paragraph of Hardcoat Layer, at a proportion of approximately from 0.5 to 5 mass % based on the silane coupling agent content.

2-(5) Applying Solvent

As regards the solvent of the applying composition for forming a silica-based applied film as the coat layer of the present invention, one species of water, methyl alcohol, ethyl alcohol, isopropyl alcohol, n-butanol, isobutanol and octanol, or a mixture of two or more species thereof is preferably used. The amount of the solvent is preferably adjusted to give a solid content concentration of 15 to 60 mass %.

2-(6) Polysilazane

Another preferred material for the silica-based applied film as the coat layer of the present invention includes a cured product of a applying composition containing polysilazane. Preferred examples of the polysilazane used here include the polysilazanes described in JP-A-11-240103, paragraphs 0097 to 0104. The polysilazane may be used as a simple body but may be used in place of the compound comprising an alkoxysilane.

2-(7) Adhesion to Substrate

In the case of using a silica-based applied film as the coat film of the present invention, the adhesion to the transparent substrate film is a problem to be solved. In order to enhance the adhesion, a method of providing an undercoat layer described later on the transparent substrate film and forming a silica-based applied film thereon may be preferably used, but the increase in the number of layers incurs a problem such as reduction of productivity, rise of cost and increase of layer thickness. In the present invention, it is more preferred to apply a pretreatment such as hydrophilization treatment and irregularity treatment to one surface or both surfaces of the substrate film. Examples of the pretreatment include corona discharge treatment, glow discharge treatment, chromic acid treatment (wet), saponification treatment (wet), flame treatment, hot air treatment, and ozone/ultraviolet irradiation treatment. Among these, corona discharge treatment, glow discharge treatment and saponification treatment (wet) are preferred, and saponification treatment is more preferred.

2-(8) Adhesion to Hardcoat Layer

In the case of using a silica-based applied film as the coat film of the present invention, the adhesion to the hardcoat layer is another problem to be solved. In order to enhance the adhesion to the hardcoat, one effective means is preferably to incorporate a silane coupling agent into the silica-based applied film and/or the hardcoat layer, more preferably to incorporate a silane coupling agent into the silica-based applied film, still more preferably to incorporate a silane coupling agent having the same functional group into both the silica-based applied film and the hardcoat layer. For the resin component of the hardcoat layer, a polyfunctional acrylate or methacrylate monomer, oligomer or polymer is generally used in many cases. Therefore, the silane coupling agent is preferably a silane coupling agent having an acryl group or a methacryl group.

In the case of using a silica-based applied film as the coat film of the present invention, another preferred means for enhancing the adhesion to the hardcoat layer is to provide an intermediate layer between the coat layer and the hardcoat layer. As for the intermediate layer, an undercoat layer described later may be provided, but a layer containing a silane coupling agent is preferably provided, and a layer containing a silane coupling agent having an acryl group or a methacryl group is more preferably provided, and a layer containing both a silane coupling agent and a polyfunctional acrylate or methacrylate monomer, oligomer or polymer is still more preferably provided. In the case of providing a silane coupling agent-containing layer, a hydrolysate of the silane coupling agent or a partial condensate of the hydrolysate of the silane coupling agent is particularly preferred. The film thickness of the intermediate layer is preferably from 0.05 to 2 µm.

2-(9) Thickness of Coat Layer

In the case of using a silica-based applied film as the coat film of the present invention, the thickness of the coat layer is preferably from 0.2 to 10 µm, more preferably from 0.3 to 5 µm, still more preferably from 0.4 to 2 µm. If the thickness is less than 0.2 µm, poor moisture resistance results, whereas if the thickness exceeds 10 µm, the obtained film may become brittle or strongly curled and is not suited as the polarizing plate protective film. The haze of the coat layer is preferably 5% or less, more preferably 3% or less, and most preferably 1% or less. The surface haze and the internal haze may be at an arbitrary ratio, but the surface haze is preferably 1% or less.

2-(10) Construction

As shown in FIGS. 1A and 1B or FIGS. 1C and 1D, each being a constitutional view of the polarizing plate when a silica-based applied film is used as the coat film of the present invention, the coat layer may be provided between the polarizer and the transparent substrate film, may be provided on the opposite side to the polarizer across the transparent substrate film, or may be provided on both. In view of adhesion to the polarizer and suitability for processing into a polarizing plate, the coat layer is preferably provided on the opposite side to the polarizer across the transparent substrate film as shown in FIGS. 1A and 1B. A construction having a hardcoat layer on the surface as shown in FIG. 1B is more preferred in view of scratch resistance and less occurrence of cracking in the coat layer.

4. Coat Layer Comprising Hydrophobic Compound 4-(1) Hydrophobic Compound

The coat layer having low moisture permeability of the present invention can be formed by using a hydrophobic compound for the main component of the matrix constituting the layer. When a hydrophobic layer comprising a hydrophobic compound as the main component is formed, this enables preventing particularly a water molecule from adsorbing to the film surface, dissolving in the film or passing through the film, and the moisture permeability can be reduced. Also, by increasing the intermolecular interaction between matrix-forming compounds or other interactions or by performing the crosslinking more densely, the moving freedom degree of a matrix molecule in the film can be decreased and the moisture permeability can be more reduced.

Examples of the binder system constituting the hydrophobic matrix for achieving these purposes include a system comprising a hydrophobic monomer, a system comprising a hydrophobic monomer and a polyfunctional monomer (cross-linking agent), a system comprising hydrophobic polymer, and a system comprising a hydrophobic polymer and a crosslinking agent. Examples of the binder having a large interaction between compounds include a system comprising a liquid crystalline monomer, a system comprising a liquid crystalline monomer and a crosslinking agent, a system comprising a liquid crystalline polymer, and a system comprising a liquid crystalline polymer and a crosslinking agent.

In view of hydrophobicity and handleability such as solubility and film-forming property, the binder preferably has a logP value of 1.0 to 12.0, more preferably from 2.0 to 11.5, still more preferably from 3.0 to 11.0.

(LogP Value)

The octanol-water partition coefficient (logP value) can be measured by the flask-shaking method described in JIS (Japanese Industrial Standards) Z7260-107 (2000). It is also possible to estimate the octanol-water partition coefficient (logP value) by a computational chemical technique or an empirical method in place of actual measurement. As regards the computation method, for example, the Crippen's fragmentation method (see, *J. Chem. Inf. Comput. Sci.*, 27, 21 (1987)), the Viswanadhan's fragmentation method (see, *J. Chem. Inf. Comput. Sci.*, 29, 163 (1989)), and the Broto's fragmentation method (see, *Eur. J. Med. Chem. Chim. Theor.*, 19, 71 (1984)) are preferred, with the Crippen's fragmentation method (see, *J. Chem. Inf. Comput. Sci.*, 27, 21 (1987)) being more preferred. In the case where the logP value of a certain compound differs depending on the measuring method or the computation method, whether or not the logP value of the compound is within the range of the present invention is preferably judged by the Crippen's fragmentation method.

Specific examples of the hydrophobic monomer which can be used include a fluorine-based monomer, a cycloolefin-based monomer, and an aromatic-containing monomer. Examples of the fluorine-based monomer which can be used include a fluorine-containing compound having a crosslinking or polymerizable functional group which is described later, and the compounds described in JP-A-9-5519 and JP-A-2000-159840. Examples of the cycloolefin-based monomer which can be used include the compounds described in JP-A-2006-83225, JP-A-5-51542, JP-A-6-313056 and JP-A-6-340849.

Specific examples of the hydrophobic polymer which can be used include a fluorine-based polymer, a cycloolefin-based polymer, and an aromatic-containing polymer. Examples of the fluorine-based polymer which can be used include the compounds described in JP-B-63-18964, JP-A-7-70107 and *Reports Res. Lab. Asahi Glass Co., Ltd.*, 55, pp. 47-51 (2005). Examples of the cycloolefin-based polymer which can be used include the resin compositions described in JP-A-7-228673 and JP-A-8-259784.

In the hydrophobic layer of the present invention, in addition to the hydrophobic binder (monomer or polymer), a polyfunctional polymerizable monomer or a crosslinking monomer can be used in combination for the purpose of increasing the denseness of film, reducing the moisture permeability, or more enhancing the film properties such as brittleness and curling. Examples of the monomer which can be used in combination include polyfunctional monomers and polyfunctional oligomers described later in the paragraph of [Hardcoat Layer].

A polymer containing a repeating unit derived from a chlorine-containing vinyl monomer (hereinafter sometimes referred to as a "chlorine-containing polymer") can also be preferably used as the hydrophobic layer of the present invention. The chlorine-containing vinyl monomer generally includes vinyl chloride and vinylidene chloride. The chlorine-containing polymer can be obtained by copolymerizing such a vinyl chloride or vinylidene chloride monomer and a monomer copolymerizable therewith.

[Monomer Copolymerizable with Chlorine-Containing Vinyl Monomer]

The copolymerizable monomer includes a monomer selected from olefins, styrenes, acrylic acid esters, methacrylic acid esters, acrylamides, methacrylamides, itaconic acid diesters, maleic acid esters, fumaric acid diesters, N-alkylmaleimides, maleic anhydride, acrylonitrile, vinyl ethers, vinyl esters, vinyl ketones, vinyl heterocyclic compounds, glycidyl esters, unsaturated nitriles and unsaturated carboxylic acids.

Examples of the olefins include dicyclopentadiene, ethylene, propylene, 1-butene, 1-pentene, isoprene, chloroprene, butadiene and 2,3-dimethylbutadiene.

Examples of the styrenes include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, trifluoromethylstyrene and methyl vinylbenzoate.

Specific examples of the acrylic acid esters and methacrylic acid esters include the followings.

Methyl acrylate, ethyl acrylate, propyl acrylate, butyl acrylate, amyl acrylate, 2-ethylhexyl acrylate, octyl acrylate, tert-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, phenyl acrylate, methyl methacrylate, ethyl methacrylate, propyl methacrylate, isopropyl methacrylate, butyl methacrylate, amyl methacrylate, hexyl methacrylate, 2-ethylhexyl methacrylate, octyl methacrylate, benzyl methacrylate, cyanoacetoxyethyl methacrylate, chlorobenzyl methacrylate, sulfopropyl methacrylate, N-ethyl-N-phenylaaminoethyl methacrylate, 2-methoxyethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, hydroxyethyl acrylate, hydroxyethyl methacrylate, hydroxypropyl acrylate, hydroxypropyl methacrylate, 3-chloro-2-hydroxypropyl methacrylate, 3-chloro-2-hydroxypropyl methacrylate, 2,2-dimethylhydroxypropyl acrylate, 5-hydroxypentyl acrylate, diethylene glycol monoacrylate, trimethylolpropane monoacrylate, pentaerythritol monoacrylate, 2,2-dimethyl-3-hydroxypropyl methacrylate, 5-hydroxypropyl methacrylate, diethylene glycol monomethacrylate, trimethylolpropane monomethacrylate and pentaerythritol monomethacrylate.

Specific examples of the vinyl ethers include the followings.

Methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, dimethylaminoethyl vinyl ether, diethylaminoethyl vinyl ether, butylaminoethyl vinyl ether, benzyl vinyl ether, tetrahydrofurfuryl vinyl ether, vinylphenyl ether, vinyltolyl ether, vinylchlorophenyl ether, vinyl-2,4-dichlorophenyl ether, vinylnaphthyl ether and vinylanthranyl ether.

Specific examples of the vinyl esters include the followings.

Vinyl acetate, vinyl propionate, vinyl butyrate, vinyl isobutyrate, vinyldimethyl propionate, vinylethyl butyrate, vinyl valerate, vinyl caproate, vinyl chloroacetate, vinyl dichloroacetate, vinylmethoxy acetate, vinylbutoxy acetate, vinylphenyl acetate, vinyl acetoacetate, vinyl lactate, vinyl-β-phenyl butyrate, vinylcyclohexyl carboxylate, vinyl benzoate, vinyl salicylate, vinyl chlorobenzoate, vinyl tetrachlorobenzoate and vinyl naphthoate.

Specific examples of the acrylamides include acrylamide, methylacrylamide, ethylacrylamide, propylacrylamide, butylacrylamide, tert-butylacrylamide, cyclohexylacrylamide, benzylacrylamide, hydroxymethylacrylamide, methoxyethyl-acrylamide, dimethylaminoethylacrylamide, phenylacrylamide, dimethylacrylamide, diethylacrylamide, β-cyanoethylacrylamide and N-(2-acetoacetoxyethyl) acrylamide.

Specific examples of the methacrylamides include methacrylamide, methylmethacrylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacrylamide, dimethylaminoethylmethacrylamide, phenylmethacrylamide, dimethylmethacrylamide, diethylmethacrylamide, β-cyanoethylmethacrylamide and N-(2-acetoacetoxyethyl) methacrylamide.

Acrylamides having a hydroxyl group may also be used, and examples thereof include N-hydroxymethyl-N-(1,1-dimethyl-3-oxo-butyl)acrylamide, N-methylolacrylamide, N-methylolmethacrylamide, N-ethyl-N-methylolacrylamide, N,N-dimethylolacrylamide, N-ethanolacrylamide, N-propanolacrylamide and N-methylolacrylamide.

Examples of the itaconic acid diesters include dimethyl itaconate, diethyl itaconate and dibutyl itaconate. Examples of the maleic acid diesters include diethyl maleate, dimethyl maleate and dibutyl maleate. Examples of the fumaric acid diesters include diethyl fumarate, dimethyl fumarate and dibutyl fumarate.

Examples of the vinyl ketones include methyl vinyl ketone, phenyl vinyl ketone and methoxyethyl vinyl ketone. Examples of the vinyl heterocyclic compounds include vinylpyridine, N-vinylimidazole, N-vinyloxazolidone, N-vinyltriazole and N-vinylpyrrolidone. Examples of the glycidyl esters include glycidyl acrylate and glycidyl methacrylate. Examples of the unsaturated nitriles include acrylonitrile and methacrylonitrile. Examples of the N-alkylmaleimides include N-ethylmaleimide and N-butylmaleimide.

Examples of the unsaturated carboxylic acids include acrylic acid, methacrylic acid, itaconic acid, maleic acid, fumaric acid, crotonic acid, and anhydrides of fumaric acid, itaconic acid and maleic acid.

These copolymerizable monomers may be used in combination of two or more thereof.

The chlorine-containing polymer for use in the present invention is described, for example, in JP-A-53-58553, JP-A-55-43185, JP-A-57-139109, JP-A-57-139136, JP-A-60-235818, JP-A-61-108650, JP-A-62-256871, JP-A-62-280207 and JP-A-63-256665.

The ratio of the chlorine-containing vinyl monomer in the chlorine-containing polymer is preferably from 50 to 99 mass %, more preferably from 60 to 98 mass %, and most preferably from 70 to 97 mass %. When the ratio of the chlorine-containing vinyl monomer is 50% or more, there arises no trouble such as worsening of moisture permeability, and when the ratio is 99% or less, solubility in various solvent is obtained and this is preferred.

The chlorine-containing polymer is available from Asahi Kasei Chemicals Corp. and Kureha Chemical Industry Co., Ltd. The chlorine-containing polymer available from Asahi Kasei Chemicals Corp. includes the followings.

"Saran Resin R241C", "Saran Resin F216", "Saran Resin R204", "Saran Latex L502", "Saran Latex L529B", "Saran Latex L536B", "Saran Latex L544D", "Saran Latex L549B", "Saran Latex L551B", "Saran Latex L557", "Saran Latex "L561A", "Saran Latex L116A", "Saran Latex L411A", "Saran Latex L120", "Saran Latex L123D", "Saran Latex L106C", "Saran Latex L131A", "Saran Latex L111", "Saran Latex L232A" and "Saran Latex L321B".

In the case where the main component of the hydrophobic layer of the present invention is a monomer or a polymerizable compound, the layer can be film-formed through curing by polymerization. As for the polymerization initiator used here, a photoinitiator described later can be used. In the case of using a polymerization initiator, the amount of the polymerization initiator used is preferably from 0.01 to 10.0 wt %, more preferably from 0.1 to 7.0 wt %, still more preferably from 0.5 to 5.0 wt %, based on the monomer or polymerizable compound.

Those described above are a hydrophobic binder for the organic solvent-system applying, but a water-dispersive polyester or the like described in JP-A-2003-165188 may also be used as a material for the aqueous applying.

4-(3) Thickness and Haze of Hydrophobic Layer

From the standpoint of the effect of reducing the moisture permeability and in view of the film property (e.g., brittleness, curling), productivity and cost, the thickness of the hydrophobic layer for use in the present invention is preferably from 0.5 to 40 μm, more preferably from 1.0 to 30 μm, and most preferably from 2.0 to 25 μm. The haze of the hydrophobic layer for use in the present invention is preferably lower in view of handling as an optical film and is preferably 5.0% or less, more preferably 3.0% or less, still more preferably 1.0% or less. However, in the case where the hydrophobic layer serves also as a hardcoat layer or an antiglare layer described later, the haze is preferably in the range specified for each layer.

4-(4) Formation of Mixed Region

In the hydrophobic layer for use in the present invention, for the purpose of ensuring adhesion between the hydrophilic cellulose-based substrate film and the hydrophobic layer comprising a hydrophobic compound and thereby reducing the moisture permeability or maintaining the strength or durability of the film, a mixed region where both resins are mixed at the interface of the hydrophobic layer and the cellulose-based substrate film is preferably formed. When such a mixed region is formed, this enables suppressing the interference unevenness and reducing the moisture permeability or maintaining the strength or durability of the film by ensuring the adhesion between the hydrophilic substrate film and the hydrophobic layer which are usually less compatible.

The thickness of the layer of mixed region is preferably from 0.2 to 10 μm, more preferably from 0.3 to 7 μm, still more preferably from 0.5 to 5 μm. If the thickness of the layer of mixed region is less than this range, the effect on the suppression of interference unevenness and on the adhesion is small, whereas if the thickness exceeds the range above, the effect of reducing the moisture permeability tends to be weakened. The thickness of the layer of mixed region can be determined as follows. A cross-sectional surface of an anti-reflection film is cut using a microtome, the cross-sectional surface is observed and photographed using a scanning electron microscope (S-570, manufactured by Hitachi, Ltd.) in a reflection electron mode, and the thickness of the layer of mixed region is measured from the photograph.

In the present invention, for forming the mixed region, a solvent having a property of dissolving or swelling the support needs to be selected as the solvent of the applying solution for forming the hydrophobic layer. When such a solvent is used for the applying solution, the hydrophobic layer is formed while dissolving or swelling the support immediately after the applying, as a result, the interface between the substrate film and the hydrophobic layer becomes indefinite and at the same time, a layer of the region allowing for mixing of the resin component of the hydrophobic layer and the resin component of the substrate film is formed.

Also, at least one kind of a solvent incapable of dissolving the substrate film (for example, triacetyl cellulose support) is preferably mixed so that the hydrophobic layer can maintain the function of reducing the moisture permeability. More preferably, at least one kind of the solvent which dissolves the substrate film has a boiling point higher than that of at least one kind of a solvent out of the solvents incapable of dissolving the substrate film.

The main component of the hydrophobic layer for use in the present invention is a hydrophobic compound and therefore, its solubility in a solvent which dissolves dissolving or swelling the substrate film may not be sufficient. In this meaning, at least either one of the solvent capable of dissolving or swelling the substrate film and the solvent incapable of dissolving the substrate film is preferably a solvent in which the hydrophobic compound for use in the present invention has sufficiently high solubility. If this is the case, a fluorine-based solvent may be preferably used particularly for a fluorine-based binder.

In the case where the support is a cellulose acylate film, the solvent having a property of dissolving or swelling the support includes:

ethers having a carbon number of 3 to 12, specifically, dibutyl ether, dimethoxymethane, dimethoxyethane, diethoxyethane, propylene oxide, 1,4-dioxane, 1,3-dioxolane, 1,3,5-trioxane, tetrahydrofuran, anisole and phenetol; ketones having a carbon number of 3 to 12, specifically acetone, methyl ethyl ketone, diethyl ketone, dipropyl ketone, diisobutyl ketone, cyclopentanone, cyclohexanone and methyl cyclohexanone; esters having a carbon number of 3 to 12, specifically ethyl formate, propyl formate, n-pentyl formate, methyl acetate, ethyl acetate, methyl propionate, ethyl propionate, n-pentyl acetate and γ-butyrolactone;

an organic solvent having two or more kinds of functional groups, specifically 2-methoxymethyl acetate, 2-ethoxymethyl acetate, 2-ethoxyethyl acetate, 2-ethoxyethyl propionate, 2-methoxyethanol, 2-propoxyethanol, 2-butoxyethanol, 1,2-diacetoxyacetone, acetylacetone, diacetone alcohol, methyl acetoacetate and ethyl acetoacetate; and a chlorine-containing solvent such as methylene chloride and chloroform.

One of these solvents may be used alone, or two or more thereof may be used in combination. As for the solvent which dissolves the substrate film, a ketone-based solvent is preferred, methyl ethyl ketone and cyclohexanone are more preferred.

Examples of the solvent incapable of dissolving the substrate film (preferably triacetyl cellulose) include methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone, 4-heptanone and toluene.

One of these solvents may be used alone, or two or more thereof may be used in combination.

Other examples of the solvent which dissolves the fluorine-based binder include a fluorine-containing solvent such as perfluoropentane, perfluoropropane, perfluorohexane, perfluoromethanol and perfluoroethanol.

The mass ratio (A/B) of the total amount (A) of solvents capable of dissolving the substrate film and the total amount (B) of solvents incapable of dissolving the substrate film is preferably from 10/90 to 100/0, more preferably from 20/80 to 100/0, still more preferably from 30/70 to 100/0.

4-(5) Adhesion to Other Layers

In the present invention, as used in the constitution examples described later, a hardcoat layer, an antiglare layer and an antireflection layer are preferably further stacked on the hydrophobic layer and therefore, the hydrophobic layer preferably maintains the adhesion to other layers. In this case, the other layer may be formed directly on the hydrophobic layer but in another method, a layer the same as the [undercoat layer] described later may be separately provided, whereby both adhesion and low moisture permeability can be satisfied.

4-(6) Construction

With respect to the construction of the low moisture-permeability layer by the hydrophobic layer of the present invention, as shown in FIGS. 1A and 1B or FIGS. 1C and 1D, each being a constitutional view of the polarizing plate, the hydrophobic layer may be provided between the polarizer and the substrate film, may be provided on the opposite side to the polarizer across the substrate film, or may be provided on both. In view of adhesion to the polarizer and suitability for processing into a polarizing plate, the hydrophobic layer is preferably provided on the opposite side to the polarizer across the substrate film as shown in FIGS. 1A and 1B.

The hydrophobic layer for use in the present invention may serve also as a hardcoat layer. In this case, the performance of the layer may be sufficient if it is equal to the performance of the hardcoat layer described later.

5. Coat Layer Using Hydrophilic Polyfunctional Compound and Crosslinking Agent

As for the low moisture-permeability coat layer usable in the present invention, in view of reducing the moisture permeability by forming a dense film, a layer comprising a combination of a hydrophilic polyfunctional compound and a crosslinking agent may be used. More specifically, for example, (A) a method of forming the layer by stacking a resin composition comprising sugars and a formyl group-containing compound, or (B) a method of forming the layer by stacking a resin composition comprising an amino group-containing polymer compound and an organic silane compound containing an amino group-reactive functional group and a silanol group, may be used. An effect of forming a dense film can be obtained by using such a crosslinking compound or a reactive compound in combination, and the low moisture permeability can be maintained under high-humidity conditions by virtue of reaction with a hydrophilic functional group.

In the present invention, a coat layer mainly comprising a compound containing such a hydrophilic group is formed as a low moisture-permeability layer on the cellulose-based transparent substrate having high hydrophilicity, whereby the adhesion to the substrate can be more satisfactorily ensured, the moisture permeability can be more reduced, and a low moisture-permeability layer with excellent durability of low moisture permeability can be formed.

5-(1) Composition Comprising Hydrophilic Polyfunctional Compound and Crosslinking Agent As regards (A) the resin composition comprising sugars and a formyl group-containing compound, which is used in the present invention, the resin compositions described in JP-A-2003-238827 and JP-A-2003-238734 can used.

As regards (B) the resin composition comprising an amino group-containing polymer compound and an organic silane compound containing an amino group-reactive functional group and a silanol group, the resin compositions described in JP-A-2004-255601 can be used.

5-(2) Surface Treatment of Substrate

In the present invention, for the purpose of satisfactorily ensuring the adhesion of the coat layer using a hydrophilic polyfunctional compound and a crosslinking agent to the substrate, the substrate film is preferably subjected to a surface treatment before stacking the coat layer thereon. In the general method for the surface treatment of a substrate comprising a cellulose acylate, it is known to apply a saponification treatment to the substrate surface for the purpose of enhancing the adhesion as a polarizing plate protective film to the polarizer comprising PVA or producing an optical film where an orientation film represented by PVA is formed on a cellulose acylate film and an aligned layer of a liquid crystal compound or the like is formed thereon. In this case, the adhesion is ensured by the hydrogen bonding between the hydroxyl group exposed to or newly formed on the surface by the saponification treatment and the hydroxyl group of PVA, and in view of durability or the like under high-humidity conditions, there is fear that the hydrogen bonding is inhibited by the water content and the adhesion deteriorates.

On the other hand, in the present invention, the durability under high-humidity conditions is satisfactorily ensured by virtue of the formyl group-containing compound contained in resin composition of (A) or the organic silane compound contained in the resin composition of (B) being crosslinked to the substrate film surface by the surface treatment of the substrate film, and sufficiently high adhesion can be ensured by making the crosslinking density higher. As for the surface treatment method, a flame treatment such as corona treatment and plasma treatment, or a known method such as saponification treatment, may be selected, but in view of productivity and safety of adhesion, the surface treatment is preferably performed by the method described later in [Saponification Treatment], more preferably by the method of applying an alkali solution.

The surface contact angle of the substrate after surface treatment is, in terms of the contact angle for water, is preferably 50° or less, more preferably 45° or less, and most preferably 40° or less.

For the purpose of more enhancing the adhesion to the substrate, it is also preferred to further use a coupling agent in the resin composition. Examples of the coupling agent which can be used include, for the resin composition of (A), a compound containing a plurality of hydroxyl group-reactive functional groups, and a compound containing a formyl group-reactive functional group and a hydroxyl group-reactive functional group; and for the resin composition of (B), a compound containing a silanol group and a hydroxyl group-reactive functional group, a compound containing an amino group-reactive functional group and a hydroxyl group-reactive functional group, and a compound containing an amino group and a hydroxyl group-reactive functional group.

Examples of the functional group reactive with a hydroxyl group include an isocyanate group, an epoxy group and a formyl group; examples of the functional group reactive with a formyl group include a hydroxyl group, an amino group and a thiol group; examples of the functional group reactive with an amino group include an isocyanate group, an epoxy group and a formyl group.

5-(3) Adhesion to Other Layers

In the present invention, a functional group such as hardcoat layer, antiglare layer and antireflection layer is preferably further stacked on the coat layer using a hydrophilic polyfunctional group and a crosslinking agent. In this case, from the standpoint of ensuring the adhesion to the functional layer, a coupling agent is preferably used in combination in the coat layer using a hydrophilic polyfunctional group and a crosslinking agent. Preferred examples of the coupling agent include a compound containing a formyl group and a polymerizable group, and a silane coupling agent comprising a polymerizable group and an alkoxysilane. Here, preferred examples of the polymerizable group include a double-bonding group such as acryloyl group, methacryloyl group and allyl group, and an epoxy group.

Examples of the silane coupling agent include the compounds described for the silane coupling agent above, and an epoxy group-containing silane coupling group and an acryl group- or methacryl group-containing silane coupling are preferred.

The amount of the silane coupling agent used is, in terms of the content in the solid content in the coat composition, preferably from 0.01 to 10.0 wt %, more preferably from 0.1 to 7.0 wt %, still more preferably from 0.5 to 5.0 wt %.

5-(4) Thickness and Haze of Coat Layer Using Hydrophilic Polyfunctional Compound and Crosslinking Agent From the standpoint of the effect of reducing the moisture permeability and in view of the film property (e.g., brittleness, curling), productivity and cost, the thickness of the coat layer using a hydrophilic polyfunctional compound and a crosslinking agent, which is used in the present invention, is preferably from 0.5 to 40 µm, more preferably from 1.0 to 30 µm, and most preferably from 1.5 to 25 µm. The haze of the coat layer using a hydrophilic polyfunctional compound and a crosslinking agent is preferably lower in view of handling as an optical film and is preferably 5.0% or less, more preferably 3.0% or less, still more preferably 1.0% or less.

5-(5) Construction

In the present invention, with respect to the construction of the low moisture-permeability layer by the coat layer using a hydrophilic polyfunctional compound and a crosslinking agent, as shown in FIGS. 1A and 1B or FIGS. 1C and 1D, each being a constitutional view of the polarizing plate, the coat layer may be provided between the polarizer and the substrate film, may be provided on the opposite side to the polarizer across the substrate film, or may be provided on both. In view of adhesion to the polarizer and suitability for processing into a polarizing plate, the coat layer is preferably provided on the opposite side to the polarizer across the substrate film as shown in FIGS. 1A and 1B.

6. Coat Layer Containing Inorganic Layered Compound

In order to more reduce the moisture permeability of the coat layer for use in the present invention, it is more preferred to disperse an inorganic layered compound in a binder which can be used for the above-described coat layers. The inorganic layered compound has a hydrophilic surface and therefore, is preferably used by dispersing it in a water-soluble binder. The inorganic layered compound is preferably dispersed in the coat layer comprising a vinyl alcohol-based polymer or in the coat layer comprising a silica-based applied film, more preferably dispersed in the coat layer comprising a vinyl alcohol-based polymer. By combining the inorganic layered compound with the preferred vinyl alcohol-based polymer described above, a most preferred performance can be exerted. Also, when the inorganic layered compound is subjected to an organification treatment, the inorganic layered compound can be dispersed also in a solvent having low hydrophilicity and the moisture permeability can be reduced.

6-(1) Inorganic Layered Compound

The inorganic layered compound for use in the present invention is an inorganic compound having a structure where unit crystal layers are stacked, and exhibiting a property of undergoing swelling or cleavage by coordinating or absorbing a solvent between layers. Examples of such an inorganic compound include a swelling hydrous silicate such as smectite group clay mineral (e.g., montmorillonite, saponite, hectorite), a vermiculite group clay mineral, a kaolinite group clay mineral, and a phyllosilicate (e.g., mica). A synthetic inorganic layered compound is also preferably used, and examples of the synthetic inorganic layered compound include a synthetic smectite (e.g., hectorite, saponite, stevensite), and a synthetic mica. Among these, smectite, montmorillonite and mica are preferred, montmorillonite and mica are more preferred, and mica is still more preferred. From the standpoint of reducing the moisture permeability and preventing tinting, synthetic mica is most preferred. The inorganic layered compound may be a compound obtained by organifying such an inorganic layered compound.

From the standpoint of satisfying both the gas barrier property and the adhesion between substrate and gas barrier layer, the swelling layered inorganic compound is preferably subjected to a microparticulation treatment. The swelling layered inorganic compound after microparticulation usually has a plate-like or flat shape, and its planar shape is not particularly limited and may be an amorphous shape or the like. The average particle diameter (average particle diameter of the planar shape) of the microparticulated swelling layered inorganic compound is, for example, preferably from 0.1 to 10 µm, more preferably from 0.5 to 8 µm, still more preferably from 0.8 to 6 µm. If the particle diameter is less than this range, the effect of reducing the moisture permeability is not sufficient, whereas if the particle diameter exceeds the range above, this may disadvantageously cause increase of haze value, increase of surface roughness, and the like. The concentration of the inorganic compound is from 3 to 60 wt %, preferably from 3 to 50 wt %, more preferably from 3 to 40 wt %. If the concentration is less than this range, the effect of reducing the moisture permeability is not sufficient, whereas if the concentration exceeds the range above, this may disadvantageously cause increase of haze value, worsening of brittleness, and the like.

6-(2) Dispersion Treatment of Inorganic Layered Compound

The inorganic layered compound is dispersed in a binder, in the state of clear cleavage being created between layers, whereby the length of moisture permeation path is increased and the moisture permeability is reduced. Accordingly, a dispersion treatment for obtaining the state of clear cleavage being created between layers of the inorganic layered compound is very important. As for the dispersion treatment, a high-pressure dispersion treatment in a solution is preferably performed a plurality of times. The treatment pressure is preferably 10 MPa or more, more preferably 20 MPa or more. The solvent is not particularly limited, but for the non-organified inorganic layered compound, examples of the solvent include water and a water-soluble solvent (for example, a lower alcohol such as methanol, ethanol and isopropyl alcohol, or acetone), with water being preferred. A mixed solvent of water and a lower alcohol may also be preferably used. Examples of the method for the high-pressure dispersion treatment include a method where a swelling layered inorganic compound is swelled in a solvent and then stirred by a high-pressure homogenizer, thereby effecting high-pressure dispersion. The method for preparing the applying solution is not particularly limited, but a method of uniformly dissolving the above-described binder component for the coat layer in a solvent, and mixing the resulting solution with a solvent having uniformly dispersed therein layered particles, is effectively used.

6-(3) Inorganic Layered Compound Subjected to Organification Treatment

In the case of dispersing the inorganic layered compound in a compound having low hydrophilicity, an inorganic layered compound dispersible in an organic solvent is preferably used, and an inorganic layered compound subjected to an organification treatment is preferred. Example of this inorganic layered compound include a layered compound organified with an organifying agent such as alkylamine. Also, for the purpose of more increasing the strength of coat layer and more reducing the moisture permeability, an organification treatment with an organifying agent containing a polymerizable group is preferred. Examples of the commercially available organified inorganic layered compound which can be used include SOMASIF MAE, MTE, MEE and MPE (synthetic mica, all produced by Co-op Chemical Co., Ltd.); and LUCENTITE SAN, STN, SEN and SPN (synthetic smectite, all produced by Co-op Chemical Co., Ltd.).

It is also preferred to organify a non-organified inorganic layered compound, for example, as a commercial product, LUCENTITE ME-100 (synthetic mica, produced by Co-op Chemical Co., Ltd.) or LUCENTITE SWN (synthetic smectite, produced by Co-op Chemical Co., Ltd.). The organifying agent is preferably a quaternary ammonium salt and although not particularly limited, more preferably a quaternary ammonium salt represented by formula (6-3).

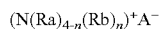  Formula(6-3):

(wherein Ra represents $(CH_2)_mH$, $(CH_2)_mRcH$ or $(CH_2Rc)_m$ H, m represents an integer of 2 or more, Rc represents an arbitrary structure or may not be present, Rb represents $CH_3$, n represents 0 or an integer of 1 to 3, and $A^-$ represents $Cl^-$ or $Br^-$).

n is preferably from 0 to 3, more preferably from 0 to 2, still more preferably 0 or 1. If n is large, the dispersibility is worsened and this is not preferred. The groups Ra all may have the same structure or may be different in the structure. m is 2 or more and in at least one group out of the groups Ra, m is preferably 4 or more, more preferably 8 or more, still more preferably from 8 to 30. The integer m is preferably larger because higher dispersibility is obtained, but if m is too large, the ratio of the organic material to the inorganic layered compound excessively increases and this is not preferred.

It is also preferred that a structure increasing the interaction between molecules is contained in Ra. Examples of the structure increasing the interaction between molecules include —OH, —$CH_2CH_2O$— and —$CHO(CH)_3$—. Examples of the quaternary ammonium salt used for the organification treatment include dimethyldiocta-decylammonium bromide, trimethyloctadecylammonium chloride, benzyltrimethylammonium chloride, dimethylbenzyloctadecylammonium bromide, trioctylmethylammonium chloride, polyoxypropylene-trimethylammonium chloride, di(polyoxypropylene) dimethylammonium chloride, di(polyoxyethylene)-dodecylmethylammonium chloride, tri(polyoxypropylene) methylammonium chloride and tri(polyoxypropylene) methylammonium bromide.

Examples of the method for using the organified inorganic layered compound include a method of thoroughly dispersing a layered compound in an organic solvent and adding thereto a solution prepared by dissolving and/or dispersing a hydrophobic binder in a solvent, and a method of adding the solution having dispersed therein an organified inorganic layered compound, obtained above, to a hydrophobic binder solution. As for the method of directly adding the inorganic layered compound to a hydrophobic binder, a method of adding an inorganic layered compound to a hydrophobic binder which is in the melted state, and completing the addition while dispersing the layered compound into the hydrophobic binder by a method such as kneading, may also be used.

(Polarizer)

The polarizer for use in the polarizing plate of the present invention is described below.

The polarizer for use in the present invention preferably comprises a polyvinyl alcohol (PVA) and a dichroic molecule, but a polyvinylene-based polarizer obtained, as described in JP-A-11-248937, by dehydrating PVA or polyvinyl chloride, producing a polyene structure through dechlorination, and orienting the structure may also be used.

The PVA is preferably a polymer material obtained by saponifying a polyvinyl acetate but may contain a component copolymerizable with vinyl acetate, such as unsaturated carboxylic acid, unsaturated sulfonic acid, olefins and vinyl ethers. Also, a modified PVA containing an acetoacetyl group, a sulfonic acid group, a carboxyl group, an oxyalkylene group or the like may be used.

The saponification degree of PVA is not particularly limited but in view of solubility or the like, is preferably from 80 to 100 mol %, more preferably from 90 to 100 mol %. The polymerization degree of PVA is not particularly limited but is preferably from 1,000 to 10,000, more preferably from 1,500 to 5,000.

The syndiotacticity of PVA is, as described in Japanese Patent 2,978,219, preferably 55% or more for improving durability, but as described in Japanese Patent 3,317,494, PVA having a syndiotacticity of 45 to 52.5% may also be preferably used.

After forming a PVA film, a dichroic molecule is preferably introduced to fabricate a polarizer. As for the production method of PVA film, a film-forming method of casting a stock solution prepared by dissolving a PVA-based resin in water or an organic solvent is preferably used in general. The concentration of the polyvinyl alcohol-based resin in the stock solution is usually from 5 to 20 mass %. By film-forming this stock solution according to a casting method, a PVA film having a thickness of 10 to 200 μm can be produced. The production of PVA film can be performed by referring to, for example, Japanese Patent 3,342,516, JP-A-09-328593, JP-A-2001-302817 and JP-A-2002-144401.

The crystallization degree of the PVA film is not particularly limited, but a PVA film having an average crystallization degree (Xc) of 50 to 75 mass % described in Japanese Patent 3,251073 or in order to reduce the fluctuation of in-plane color hue, a PVA film having a crystallization degree of 38% or less described in JP-A-2002-236214 may be used.

The birefringence (Δn) of the PVA film is preferably small, and a PVA film having a birefringence of $1.0×10^{-3}$ or less described in Japanese Patent 3,342,516 may be preferably used. However, as described in JP-A-2002-228835, the birefringence of the PVA film may be set to 0.002 to 0.01 so as to obtain a high polarization degree while preventing breakage of the PVA film at the stretching. Also, as described in JP-A-2002-060505, the value of (nx+ny)/2−nz may be set to 0.0003 to 0.01. The Re(1090) of the PVA film is preferably from 0 to 100 nm, more preferably from 0 to 50 nm. Furthermore, the Rth(1090) of the PVA film is preferably from 0 to 500 nm, more preferably from 0 to 300 nm.

Other than these, in the polarizing plate of the present invention, a PVA film having a 1,2-glycol bond amount of 1.5 mol % or less described in Japanese Patent 3,021,494, a PVA film described in JP-A-2001-316492 where the number of optical foreign matters of 5 μm or more is 500 or less per 100 $cm^2$, a PVA film described in JP-A-2002-030163 where the hot water breaking temperature in the TD direction of the film is 1.5° C. or less, and a PVA film formed from a solution in which from 1 to 100 parts by mass of 3 to 6-valent polyhydric alcohol such as glycerin or 15 mass % or more of a plasticizer described in JP-A-06-289225 is mixed, may be preferably used.

The film thickness of the PVA film before stretching is not particularly limited but in view of film holding stability or homogeneity of stretching, is preferably from 1 μm to 1 mm, more preferably from 20 to 200 μm. A thin PVA film described in JP-A-2002-236212 where 10 N or less of a stress is generated when stretched in water at a ratio of 4 to 6 times, may also be used.

As for the dichroic molecule, a higher iodine ion such as $I_3^-$ or $I_5^-$ or a dichroic dye may be preferably used. In the present invention a higher iodine ion is preferred. As described in Ryo Nagata (compiler), *Henkoban no Oyo* (*Application of Polarizing Plate*), CMC Shuppan, and *Kogyo Zairyo* (*industrial Materials*), Vol. 28, No. 7, pp. 39-45, the higher iodine ion can be produced in the state of being adsorbed or oriented to PVA after dipping PVA in a liquid comprising an aqueous potassium iodide solution having dissolved therein iodine and/or in an aqueous boric acid solution.

In the case of using a dichroic dye as the dichroic molecule, an azo-based coloring matter is preferred, and a bisazo-based or trisazo-based coloring matter is more preferred. The dichroic dye is preferably water-soluble and therefore, is preferably used in the form of a free acid, an alkaline metal salt, an ammonium salt or an amine salt by introducing a hydrophilic substituent such as sulfonic acid group, amino group or hydroxyl group into the dichroic molecule.

Specific examples of the dichroic dye include a benzidine type such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151 and C.I. Direct Green 1; a diphenylurea type such as C.I. Direct Yellow 44, C.I. Direct Red 23 and C.I. Direct Red 79; a stilbene type such as C.I. Direct Yellow 12; a dinaphthylamine type such as C.I. Direct Red 31; and a J-acid type such as C.I. Direct Red 81, C.I. Direct Violet 9 and C.I. Direct Blue 78.

Other preferred examples include C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and dichroic dyes described in JP-A-62-70802, JP-A-1-161202, JP-A-1-172906, JP-A-1-172907, JP-A-1-183602, JP-A-1-248105, JP-A-1-265205 and JP-A-7-261024. In order to produce a dichroic dye having various hues, two or more species of these dichroic dyes may be compounded. In the case of using a dichroic dye, the adsorption thickness may be 4 μm or more as described in JP-A-2002-082222.

If the content of the dichroic molecule in the film is too small, a low polarization degree results, whereas if the content is too large, the single plate transmittance decreases. Therefore, the content is usually adjusted to a range from 0.01 to 5 mass % by mass based on the polyvinyl alcohol-based polymer constituting the matrix of the film.

The thickness of the polarizer is preferably 5 to 40 μm, more preferably from 10 to 30 μm. It is also preferred to adjust the ratio between the thickness of the polarizer and the thickness of the protective film to the range of 0.01≦A (thickness of polarizer)/B (thickness of protective film)≦0.16 described in JP-A-2002-174727.

Furthermore, the crossing angle between the slow axis of the protective film and the absorption axis of the polarizer may have an arbitrary value, but the axes preferably run in parallel or at an azimuthal angle of 45±20°.

<Production Process of Polarizing Plate>

The production process of the polarizing plate in the present invention is described below.

In the present invention, the production process of the polarizing plate preferably comprises a swelling step, a dyeing step, a hardening step, a stretching step, a drying step, a protective film laminating step, and a lamination after-drying step. The order of the dyeing step, hardening step and stretching step may be arbitrarily changed, or several steps may be combined and performed simultaneously. Also, as described in Japanese Patent 3331615, water washing after the hardening step is preferred.

In the present invention, a swelling step, a dyeing step, a hardening step, a stretching step, a drying step, a protective film laminating step, and a lamination after-drying step are preferably successively performed in this order. Also, an on-line surface inspection step may be provided during or after these steps.

The swelling step is preferably performed using only water, but as described in JP-A-10-153709, the swelling degree of the polarizing substrate may be controlled by swelling the polarizing plate substrate with an aqueous boric acid solution so as to improve the optical performance stability and prevent wrinkling of the polarizing plate substrate in the production line.

The temperature and time of the swelling step may be arbitrarily selected but are preferably from 10 to 60° C. and from 5 to 2,000 seconds.

The dyeing step may be performed using the method described in JP-A-2002-86554. As for the dyeing method, not only dipping but also an arbitrary method such as applying or spraying of iodine or a dye solution may be employed. Furthermore, as described in JP-A-2002-290025, a method of performing the dyeing while controlling the iodine concentration, dyeing bath temperature and stretch ratio in the bath and while stirring the solution in the bath may be employed.

In the case of using a higher iodine ion as the dichroic molecule, the dyeing step is preferably performed using a solution prepared by dissolving iodine in an aqueous potassium iodide solution so as to obtain a high-contrast polarizing plate. In this case, it is preferred that the iodine concentration in the aqueous iodine-potassium iodide solution is from 0.05 to 20 g/liter, the potassium iodide concentration is from 3 to 200 g/liter, and the mass ratio between iodine and potassium iodide is from 1 to 2,000. The dyeing time is preferably from 10 to 1,200 seconds, and the solution temperature is preferably from 10 to 60° C. It is more preferred that the iodine concentration is from 0.5 to 2 g/liter, the potassium iodide concentration is from 30 to 120 g/liter, the mass ratio between iodine and potassium iodide is from 30 to 120, the dyeing time is from 30 to 600 seconds, and the solution temperature is from 20 to 50° C.

Also, as described in Japanese Patent 3,145,747, a boron-based compound such as boric acid or borax may be added to the dyeing solution.

In the hardening step, the film is preferably dipped in a crosslinking agent solution or coated with the solution, thereby incorporating a crosslinking agent into the film. Furthermore, as described in JP-A-11-52130, the hardening step may be performed in several parts.

As for the crosslinking agent, those described in U.S. Reissue Patent 232,897 may be used. A polyvalent aldehyde may be used as the crosslinking agent for enhancing the dimensional stability as described in Japanese Patent 3,357,109, but boric acids are most preferred. In the case of using boric acid as the crosslinking agent in the hardening step, a metal ion may be added to the aqueous boric acid-potassium iodide solution. The metal ion is preferably zinc chloride but as described in JP-A-2000-35512, a zinc halide such as zinc iodide, or a zinc salt such as zinc sulfate or zinc acetate may be used instead of zinc chloride.

In the present invention, the hardening is preferably performed by preparing an aqueous boric acid-potassium iodide solution containing zinc chloride and dipping the PVA film therein. It is preferred that the boric acid concentration is from 1 to 100 g/liter, the potassium iodide concentration is from 1 to 120 g/liter, the zinc chloride concentration is from 0.01 to 10 g/liter, the hardening time is from 10 to 1,200 seconds, and the solution temperature is from 10 to 60° C. It is more preferred that the boric acid concentration is from 10 to 80 g/liter, the potassium iodide concentration is from 5 to 100 g/liter, the zinc chloride concentration is from 0.02 to 8 g/liter, the hardening time is from 30 to 600 seconds, and the solution temperature is from 20 to 50° C.

In the stretching step, a vertical uniaxial stretching method described, for example, in U.S. Pat. No. 2,454,515, or a tenter method described in JP-A-2002-86554 may be preferably used. The stretch ratio is preferably from 2 to 12 times, more preferably from 3 to 10 times. It is also preferred that the stretch ratio, the thickness of original film and the original film of polarizer satisfy the relationship of (thickness of polarizer after lamination of protective film/thickness of original film)×(total raw ratio)>0.17 described in JP-A-2002-040256, or the width of polarizer leaving from the final bath and the width of polarizer at the lamination of the protective film satisfy the relationship of 0.80≦(width of polarizer at lamination of protective film/width of polarizer leaving from final bath)≦0.95 described in JP-A-2002-040247.

In the drying step, a known method described in JP-A-2002-86554 may be used, but the drying temperature is preferably from 30 to 100° C., and the drying time is preferably from 30 seconds to 60 minutes. It is also preferred to perform a heat treatment for adjusting the in-water discoloring temperature to 50° C. or more as described in Japanese Patent 3,148,513 or perform the aging in an atmosphere having controlled temperature and humidity as described in JP-A-07-325215 and JP-A-07-325218.

The protective film laminating step is a step of laminating two protective films to both sides of the polarizer leaving from the drying step. A method of supplying an adhesive liquid immediately before lamination, and laminating the polarizer and the protective film by a pair of rollers to lay one on another is preferred. Also, as described in JP-A-2001-296426 and JP-A-2002-86554, the moisture content of the polarizer at the lamination is preferably adjusted to reduce groove-like irregularities ascribable to stretching of the polarizer. In the present invention, the moisture content is preferably from 0.1 to 30%.

The adhesive for laminating the polarizer and the protective films is not particularly limited, but examples thereof include a PVA-based resin (including a modified PVA modified with an acetoacetyl group, a sulfonic acid group, a carboxyl group, an oxyalkylene group or the like) and an aqueous boron compound solution. Among these, a PVA-based resin is preferred. The dry thickness of the adhesive layer is preferably from 0.01 to 5 μm, more preferably from 0.05 to 3 μm.

In order to increase the adhesive strength between the polarizer and the protective films, the protective film is preferably surface-treated and rendered hydrophilic before bonding. The method for the surface treatment is not particularly limited, but a known method such as saponification using an alkali solution or corona treatment may be used. Also, an easy adhesion layer such as gelatin undercoat layer may be provided after the surface treatment. As described in JP-A-2002-267839, the contact angle of the protective film surface with water is preferably 50° or less.

The conditions for the lamination after-drying may be selected according to the method described in JP-A-2002-86554, but the drying temperature is preferably from 30 to 100° C. and the drying time is preferably from 30 seconds to 60 minutes. It is also preferred to perform the aging in an atmosphere having controlled temperature and humidity as described in JP-A-07-325220.

The element content in the polarizer is preferably such that the iodine is from 0.1 to 3.0 g/m$^2$, the boron is from 0.1 to 5.0 g/m$^2$, the potassium is from 0.1 to 2.00 g/m$^2$, and the zinc is from 0 to 2.00 g/m$^2$. The potassium content may be 0.2 mass % or less as described in JP-A-2001-166143, or the zinc content in the polarizer may be set to be from 0.04 to 0.5 mass % as described in JP-A-2000-035512.

As described in Japanese Patent 3,323,255, for increasing the dimensional stability of the polarizing plate, at least one compound selected from an organic titanium compound and an organic zirconium compound may be incorporated by adding or using an organic titanium compound and/or an organic zirconium compound in any one step of the dyeing step, the stretching step and the hardening step. Furthermore, a dichroic dye may be added so as to control the color hue of the polarizing plate.

<Properties of Polarizing Plate>
(1) Transmittance and Polarization Degree

The single plate transmittance of the polarizing plate of the present invention is preferably from 42.5 to 49.5%, more preferably from 42.8 to 49.0%. The polarization degree defined by the following formula 4 is preferably from 99.900 to 99.999%, more preferably from 99.940 to 99.995%. The parallel transmittance is preferably from 36 to 42%, and the cross transmittance is preferably from 0.001 to 0.05%.

$$\text{Polarization degree}(\%) = 100 \times \sqrt{\frac{\text{parallel transmittance} - \text{cross transmittance}}{\text{parallel transmittance} + \text{cross transmittance}}} \quad \text{Formula 4}$$

The transmittance above is defined by the following formula in accordance with JIS Z8701.

$$T = K \int S(\lambda) y(\lambda) \tau(\lambda) d\lambda$$

In the formula above, K, S(λ), y(λ), and τ(λ) are as follows.

$$K = \frac{100}{\int S(\lambda) y(\lambda) d\lambda} \quad \text{Formula 3}$$

S(λ): spectral distribution of standard light used for color display
y(λ): color matching function in XYZ system
τ(λ): spectral transmittance Also, the dichroic ratio defined by the following formula 5 is preferably from 48 to 1,215, more preferably from 53 to 525.

$$\text{Dichroic ratio } (Rd) = \frac{\log\left[\frac{\text{single plate transmittance}}{100}\left(1 - \frac{\text{polarization degree}}{100}\right)\right]}{\log\left[\frac{\text{single plate transmittance}}{100}\left(1 + \frac{\text{polarization degree}}{100}\right)\right]} \quad \text{Formula 5}$$

The iodine concentration and the single plate transmittance may be in range described in JP-A-2002-258051, paragraph [0017].

The parallel transmittance may have small wavelength dependency as described in JP-A-2001-083328 and JP-A-2002-022950. In the case of disposing the polarizing plate in the cross-Nicol arrangement, the optical property may be in the range described in JP-A-2001-091736, paragraph [0007], and the relationship between the parallel transmittance and the cross transmittance may be in the range described in JP-A-2002-174728, paragraph [0006].

Also, as described in JP-A-2002-221618, the standard deviation of parallel transmittance every 10 nm may be 3 or less in the light wavelength range of 420 to 700 nm, and the minimum value of (parallel transmittance/cross transmittance) every 10 nn may be 300 or more in the light wavelength range of 420 to 700 nm.

It is also preferred that the parallel transmittance and cross transmittance of the polarizing plate at a wavelength of 440 nm, the parallel transmittance and cross transmittance at a wavelength of 550 nm, and the parallel transmittance and cross transmittance at a wavelength of 610 nm are within the ranges described in JP-A-2002-258042, paragraph [0012], or JP-A-2002-258043, paragraph [0012].

(2) Color Hue

The color hue of the polarizing plate of the present invention is preferably evaluated using a lightness index L* and chromaticness indexes a* and b* of an L*a*b* color specification system recommended as a CIE uniform perceptual space.

The definitions of L*, a*, and b* are described, for example, *Shikisai Kogaku (Color Engineering)*, Tokyo Denki University Press.

The a* of single polarizing plate is preferably from −2.5 to 0.2, more preferably from −2.0 to 0. The b* of single polarizing plate is preferably from 1.5 to 5, more preferably from 2 to 4.5. The a* of parallel transmitted light of two polarizing plates is preferably from −4.0 to 0, more preferably from −3.5 to −0.5. The b* of parallel transmitted light of two polarizing plates is preferably from 2.0 to 8, more preferably from 2.5 to 7. The a* of cross transmitted light of two polarizing plates is preferably from −0.5 to 1.0, more preferably from 0 to 2. The b* of cross transmitted light of two polarizing plates is preferably from −2.0 to 2, more preferably from −1.5 to 0.5.

The color hue may also be evaluated by chromaticity coordinates (x, y) calculated from X, Y, and Z above. For example, it is preferred to set the chromaticity $(x_p, y_p)$ of parallel transmitted light and the chromaticity $(x_c, y_c)$ of cross transmitted light of two polarizing plates to the ranges described in JP-A-2002-214436, column 0017, JP-A-2001-166136, paragraph [0007], or JP-A-2002-169024, paragraphs [0005] to [0008], or set the relationship between the color hue and the absorbance to the range described in JP-A-2001-311827, paragraphs [0005] to [0006].

(3) Viewing Angle Properties

In the case where the polarizing plate is disposed in the cross-Nicol arrangement and light at a wavelength of 550 nm is made incident thereon, the transmittance ratio or xy chromaticity difference between vertically incident light and light incident at an angle of 40° with respect to the normal direction from the direction at 45° with respect to the polarizing axis may be preferably set to the range described in JP-A-2001-166135 or JP-A-2001-166137. Also, the ratio $(T_{60}/T_0)$ between the light transmittance $(T_0)$ in the vertical direction of a polarizing plate stack disposed in the cross-Nicol arrangement and the light transmittance $(T_{60})$ in the direction inclined at 60° from the normal line of the stack may be preferably set to 10,000 or less as described in JP-A-10-068817; when natural light is made incident on the polarizing plate at an arbitrary angle from the normal line to an elevation angle of 80°, the transmittance difference of transmitted light within a wavelength region 20 nm in the wavelength range from 520 to 640 nm of transmission spectrum may be preferably set to 6% or less as described in JP-A-2002-139625; or the brightness difference of transmitted light between 1-cm apart arbitrary sites on the film may be preferably set to 30% or less as described in JP-A-08-248201.

(4) Durability (4-1) Humidity-Heat Durability

The rate of change in the light transmittance and polarization degree before and after allowing the polarizing plate to stand for 500 hours in an atmosphere of 60° C. and a relative humidity of 95% is preferably 3% or less based on the absolute value. The rate of change in the light transmittance is morre preferably 2% or less, and the rate of change in the polarization degree is more preferably 1.0% or less based on the absolute value. It is also preferred that as described in JP-A-07-077608, the polarization degree after standing for 500 hours at 80° C. and a relative humidity of 90% is 95% or more and the single plate transmittance is 38% or more.

(4-2) Dry Durability

The rate of change in the light transmittance and polarization degree before and after standing for 500 hours in a dry atmosphere at 80° C. is also preferably 3% or less based on the absolute value. The rate of change in the light transmittance is more preferably 2% or less, and the rate of change in the polarization degree is more preferably 1.0% or less, still more preferably 0.1% or less, based on the absolute value.

(4-3) Other Durability

Furthermore, the percentage shrinkage after standing for 2 hours at 80° C. may be preferably set to 0.5% or less as described in JP-A-06-167611; the x value or y value after allowing a polarizing plate stack disposed in the cross-Nicol arrangement on both surfaces of a glass plate to stand for 750 hours in an atmosphere at 69° C. may be preferably set to the range described in JP-A-10-068818; or the change of spectral intensity ratio between 105 cm$^{-1}$ and 157 cm$^{-1}$ according to Raman spectroscopy after standing for 200 hours in an atmosphere at 80° C. and a relative humidity of 90% may be preferably set to the range described in JP-A-08-094834 or JP-A-09-197127.

(5) Orientation Degree

As the orientation degree of PVA is higher, a more excellent polarization performance can be obtained. The orientation degree calculated as an order parameter value by a method such as polarized Raman scattering or polarized FT-IR is preferably from 0.2 to 1.0. Also, as described in JP-A-59-133509, the difference between the orientation coefficient of a high-molecular segment in the entire amorphous region of the polarizer and the orientation coefficient of the occupying molecule (0.75 or more) may be preferably set to at least 0.15; or as described in JP-A-04-204907, the orientation coefficient of the amorphous region of the polarizer may be preferably set to 0.65 to 0.85 or the orientation degree of the higher iodine ion such as $I_3^-$ and $I_5^-$ may be preferably set to 0.8 to 1.0 in terms of an order parameter value.

(6) Other Properties

As described in JP-A-2002-006133, when the polarizing plate is heated at 80° C. for 30 minutes, the shrinkage force in the absorption axis direction per unit width may be preferably set to 4.0 N/cm or less; as described in JP-A-2002-236213, when the polarizing plate is placed under heating condition of 70° C. for 120 hours, the rate of change of the dimension in the absorption axis direction of the polarizing plate and the rate of change of the dimension in the polarizing axis direction both may be preferably set to within ±0.6%; or as described in JP-A-2002-090546, the moisture content of the polarizing plate may be preferably set to 3 mass % or less. Furthermore, as described in JP-A-2000-249832, the surface roughness in the direction perpendicular to the stretching axis may be preferably set to 0.04 µm or less based on the center-line average roughness; as described in JP-A-10-268294, the refractive index no in the transmission axis direction may be preferably set to exceed 1.6; or the relationship between the thickness of polarizing plate and the thickness of protective film may be preferably set to the range described in JP-A-10-111411, paragraph [0004].

<Functionalization of Polarizing Plate>

The polarizing plate may also be preferably used as a functionalized polarizing plate by combining it with an antireflection film or brightness enhancing film for enhancing the visibility of a display, or an optical film having a functional layer such as hardcoat layer, forward scattering layer and antiglare layer.

(3) Antireflection Film

The polarizing plate of the present invention can be used in combination with an antireflection film. As for the antireflection film, either a film having a reflectance of about 1.5%, in which only a low refractive index material such as fluorine-based polymer is provided only in a single layer, or a film having a reflectance of 1% or less, which utilizes multilayer interference of a thin film, may be used. In the present invention, a construction obtained by stacking a low refractive index layer and at least one layer having a refractive index higher than that of the low refractive index layer (that is, a high refractive index layer or a medium refractive index layer) on a transparent support is preferably used. Also, an antireflection film described, for example, in *Nitto Giho*, Vol. 38, No. 1, pp. 26-28 (May 2000) and JP-A-2002-301783 may be preferably used.

The refractive index of each layer satisfies the following relationship.

Refractive index of high refractive index layer>refractive index of medium refractive index layer>refractive index of transparent support>refractive index of low refractive index layer As regards the transparent support for use in the antireflection film, a resin film used in the protective film of the polarizer above may be preferably used.

The refractive index of the low refractive index layer is preferably from 1.20 to 1.55, more preferably from 1.30 to 1.50. The low refractive index layer is preferably used as an outermost layer having scratch resistance or antifouling property. For the purpose of enhancing the scratch resistance, it is also preferred to impart slipperiness to the surface by using a material such as silicone-containing compound containing a silicone group, or fluorine-containing compound containing fluorine.

Examples of the fluorine-containing compound which can be preferably used include the compounds described in JP-A-9-222503, paragraphs [0018] to [0026], JP-A-11-38202, paragraphs [0019] to [0030], JP-A-2001-40284, paragraphs [0027] to [0028], and JP-A-2000-284102.

The silicone-containing compound is preferably a compound having a polysiloxane structure, and useful examples thereof include a reactive silicone (e.g., SILAPLANE (produced by Chisso Corp.) and a polysiloxane containing a silanol group at both terminals (see, JP-A-11-258403). An organometallic compound such as silane coupling agent and a silane coupling agent containing a specific fluorine-containing hydrocarbon group may be cured by a condensation reaction in the presence of a catalyst (for example, compounds described in JP-A-58-142958, JP-A-58-147483, JP-A-58-147484, JP-A-9-157582, JP-A-11-106704, JP-A-2000-117902, JP-A-2001-48590 and JP-A-2002-53804).

The low refractive index layer may preferably contain, as the additive other than those described above, a filler (for example, a low refractive index inorganic compound having an average primary particle diameter of 1 to 150 nm such as silicon dioxide (silica) and fluorine-containing particle (e.g., magnesium fluoride, potassium fluoride, barium fluoride), and an organic fine particle described in JP-A-11-3820, paragraphs [0020] to [0038]), a silane coupling agent, a lubricant, a surfactant and the like.

The low refractive index layer may be formed by a vapor phase method (e.g., vacuum vapor deposition, sputtering, ion plating, plasma CVD) but is preferably formed by a applying method because the production cost is low. As for the applying method, a dip applying method, an air knife coating method, a curtain coating method, a roller coating method, a wire bar coating method, a gravure coating method, and a microgravure method may be preferably used.

The film thickness of the low refractive index layer is preferably from 30 to 200 nm, more preferably from 50 to 150 nm, and most preferably from 60 to 120 nm.

The medium refractive index layer and the high refractive index layer each preferably has a construction that a high refractive index inorganic compound ultrafine particle having an average particle diameter of 100 nm or less is dispersed in a matrix material. Examples of the high refractive index inorganic compound fine particle which can be preferably used include an inorganic compound having a refractive index of 1.65 or more, such as oxide of Ti, Zn, Sb, Sn, Zr, Ce, Ta, La and In, and composite oxide containing such a metal atom.

Such an ultrafine particle may be used in an embodiment of, for example, treating the particle surface with a surface treating agent (such as a silane coupling agent, see, JP-A-11-295503, JP-A-11-153703 and JP-A-2000-9908; or an anionic compound or organometallic coupling agent, see, for example, JP-A-2001-310432), taking a core-shell structure with the core being a high refractive index particle (see, for example, JP-A-2000-166104), or using a specific dispersant in combination (see, for example, JP-A-11-153703, U.S. Pat. No. 6,210,858B1 and JP-A-2002-2776069).

As for the matrix material, a conventionally known thermoplastic resin or curable resin film or the like may be used, but a polyfunctional material described, for example, in JP-A-2000-47004, JP-A-2001-315242, JP-A-2001-31871, JP-A-2001-296401, or a curable film obtained from a metal alkoxide composition described, for example, in JP-A-2001-293818 may also be used.

The refractive index of the high refractive index layer is preferably from 1.70 to 2.20. The thickness of the high refractive index layer is preferably from 5 nm to 10 μm, more preferably from 10 nm to 1 μm.

The refractive index of the medium refractive index is adjusted to take a value between the refractive index of the low refractive index layer and the refractive index of the high refractive index layer. The refractive index of the medium refractive index layer is preferably from 1.50 to 1.70.

The haze of the antireflection film is preferably 5% or less, more preferably 3% or less. Also, the strength of the film is preferably H or more, more preferably 2H or more, and most preferably 3H or more, by a pencil hardness test according to JIS K5400.

(Brightness Enhancing Film)

The polarizing plate of the present invention can be used in combination with a brightness enhancing film. The brightness enhancing film has a function of separating circularly polarized light or linearly polarized light and is disposed between the polarizing plate and the backlight such that the one-sided circularly polarized light or linearly polarized light causes backward reflection or backward scattering on the backlight side. The light re-reflected from the backlight part partially changes the polarization state and is partially transmitted when coming again into the brightness enhancing film and the polarizing plate. Therefore, by repeating this process, the rate of utilization of light is increased, and the front brightness is enhanced by about 1.4 times. As for the brightness enhancing film, an anisotropic reflection system and an anisotropic scattering system are known, and either may be combined with the polarizing plate of the present invention.

With respect to the anisotropic reflection system, there is known a brightness enhancing film in which a uniaxially stretched film and an unstretched film are stacked in a multiple manner to make large the difference in the refractive index in the stretching direction, thereby having anisotropy of the reflectance and transmittance. A multilayer film system using the principle of dielectric mirror (described in International Publication Nos. 95/17691, pamphlet, 95/17692, pamphlet, and 95/17699, pamphlet), and a cholesteric liquid crystal system (described in European Patent 606,940A2 and JP-A-8-271731) are known. In the present invention, DBEF-E, DBEF-D and DBEF-M (all produced by 3M) are preferably used as the brightness enhancing film in a multilayer system using the principle of dielectric mirror, and NIPOCS (produced by Nitto Denko Corp.) is preferably used as the brightness enhancing film in a cholesteric liquid crystal system. As for NIPOCS, *Nitto Giho*, Vol. 38, No. 1, pp. 19-21 (May 2000) and the like may be referred to.

In the present invention, it is also preferred to use the polarizing plate in combination with a brightness enhancing film in an anisotropic scattering system obtained by blending a positive intrinsic birefringent polymer and a negative intrinsic birefringent polymer and uniaxially stretching the blend, described in International Publication Nos. 97/32223, pamphlet, 97/32224, pamphlet, 97/32225, pamphlet, 97/32226, pamphlet, JP-A-9-274108 and JP-A-11-174231. As for the brightness enhancing film in an anisotropic scattering system, DRPF-H (produced by 3M) is preferred.

(Other Functional Optical Film)

The polarizing plate of the present invention is also preferably used in combination with a functional optical film in which a hardcoat layer, a forward scattering layer, an anti-glare layer, a gas barrier layer, a lubricating layer, an antistatic layer, an undercoat layer, a protective layer and the like are provided. Also, such a functional layer may be preferably used to be mutually compounded with, for example, the anti-reflection layer in the antireflection film above or an optically anisotropic layer, within the same layer. Such a functional layer can be provided on either one surface or both surfaces of the polarizer side, and the surface opposite the polarizer (the surface closer to the air side) and used.

[Hardcoat Layer]

In order to impart a dynamic strength such as scratch resistance, the polarizing plate of the present invention may be preferably combined with a functional optical film in which a hardcoat layer is provided on the surface of the transparent support. In the case of using the hardcoat layer by applying it to the antireflection film above, the hardcoat layer is preferably provided between the transparent support and the high refractive index layer.

The hardcoat layer is preferably formed by a crosslinking reaction of a photo- and/or heat-curable compound or a polymerization reaction. The curable functional group is preferably a photopolymerizable functional group, and the hydrolyzable functional group-containing organometallic compound is preferably an organic alkoxysilyl compound. As for the specific constitutional composition of the hardcoat layer, those described, for example, in JP-A-2002-144913, JP-A-2000-9908 and International Publication No. 00/46617, pamphlet, can be preferably used.

The film thickness of the hardcoat layer is preferably from 0.2 to 100 μm.

The strength of the hardcoat layer is preferably H or more, more preferably 2H or more, and most preferably 3H or more, by a pencil hardness test according to JIS K5400. Also, in the Taber test according to JIS K5400, the abrasion amount of the specimen before and after the test is preferably smaller.

As for the material forming the hardcoat layer, an ethylenically unsaturated group-containing compound and a ring-opening polymerizable group-containing compound may be used. These compounds can be used alone or in combination. Preferred examples of the ethylenically unsaturated group-containing compound include polyacrylates of polyol, such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether and diacrylate of hexanediol diglycidyl ether; and urethane acrylates obtained by a reaction of a polyisocyanate and a hydroxyl group-containing acrylate such as hydroxyethyl acrylate. Examples of the commercially available compound include EB-600, EB-40, EB-140, EB-1150, EB-1290K, IRR214, EB-2220, TMPTA and TMPTMA (all produced by Daicel-UCB Company, Ltd.); and UV-6300 and UV-1700B (both produced by Nippon Synthetic Chemical Industry Co., Ltd.).

Preferred examples of the ring-opening polymerizable group-containing compound include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl cyanurate, sorbitol tetraglycidyl ether, pentaerythritol tetraglycidyl ether, polyglycidyl ether of cresol novolak resin, and polyglycidyl ether of phenol novolak resin; alicyclic epoxys such as CELLOXIDE 2021P, CELLOXIDE 2081, EPOLEAD GT-301, EPOLEAD GT-401 and EHPE3150CE (all produced by Daicel Chemical Industries, Ltd.), and polycyclohexyl epoxy methyl ether of phenol novolak resin; and oxetanes such as OXT-121, OXT-221, OX-SQ and PNOX-1009 (all produced by Toagosei Co., Ltd.). In addition, a polymer of glycidyl (meth)acrylate or a copolymer of glycidyl (meth)acrylate and a monomer copolymerizable therewith may be used in the hardcoat layer.

In order to decrease the hardening shrinkage of hardcoat layer, improve the adhesion to substrate or reduce the curling of hardcoat-treated article in the present invention, a crosslinked fine particle, for example, an oxide fine particle of silicon, titanium, zirconium or aluminum, a crosslinked particle of polyethylene, polystyrene, poly(meth)acrylic acid esters or polydimethylsiloxane, or an organic fine particle such as crosslinked rubber fine particle (e.g., SBR, NBR), may be preferably added in the hardcoat layer. The average particle diameter of such a crosslinked fine particle is preferably from 1 to 20,000 nm. As for the shape of the crosslinked fine particle, for example, spherical, rod-like, needle-like and tabular shapes may be used without limitation. The amount of the fine particle added is preferably 60 vol % or less, more preferably 40 vol % or less, based on the hardcoat layer after hardening.

In the case of adding the above-described inorganic fine particle, since the inorganic fine particle generally has poor affinity for the binder polymer, it is also preferred to perform a surface treatment by using a surface treating agent containing a metal such as silicon, aluminum and titanium and having a functional group such as alkoxide group, carboxylic acid group, sulfonic acid group and phosphonic acid group.

The hardcoat layer is preferably hardened using a heat or active energy ray. Above all, an active energy ray such as radiation, gamma ray, alpha ray, electron beam and ultraviolet ray is preferably used. In view of stability and productivity, an electron beam or an ultraviolet ray is preferred. In the case of hardening the hardcoat layer by heat, in view of heat resistance of the plastic itself, the heating temperature is preferably 140° C. or less, more preferably 100° C. or less.

[Forward Scattering Layer]

The forward scattering layer is used for improving the viewing angle characteristic (color hue and brightness distribution) in the up/down and right/left directions when the polarizing plate of the present invention applied to a liquid crystal display device. In the present invention, the forward scattering layer preferably has a construction that fine particles differing in the refractive index are dispersed in a binder. For example, a construction described in JP-A-11-38208 where the coefficient of forward scattering is specified; a construction described in JP-A-2000-199809 where the relative refractive index between a transparent resin and a fine particle is set to a specific range; and a construction described in JP-A-2002-107512 where the haze value is specified as 40% or more, can be employed. For the purpose of controlling the viewing angle property of haze, the polarizing plate of the present invention may also be preferably used in combination with "LUMISTRY" described in *Hikari Kinousei Film (Photo-functional Film)*, pp. 31-39, which is a technical report by Sumitomo Chemical Co., Ltd.

[Antiglare Layer]

The antiglare layer is used for scattering reflected light and thereby preventing reflection. The antiglare function is obtained by forming irregularities on the outermost surface (on the display side) of a liquid crystal display device. The haze of the optical film having an antiglare function is preferably from 3 to 30%, more preferably from 5 to 20%, and most preferably from 7 to 20%.

Preferred examples of the method for forming irregularities on the film surface include a method of adding a fine particle to form irregularities on the film surface (see, for example, JP-A-2000-271878); a method of adding a small amount (from 0.1 to 50 mass %) of a relatively large particle (particle diameter: from 0.05 to 2 μm) to form a surface irregularity film (see, for example, JP-A-2000-281410, JP-A-2000-95893, JP-A-2001-100004 and JP-A-2001-281407); and a method of physically transferring an irregularity shape onto the film surface (as an embossing method, described, for example, in JP-A-63-278839, JP-A-11-183710 and JP-A-2000-275401).

[Liquid Crystal Display Device]

The liquid crystal display device of the present invention is described below.

FIG. 2 is a schematic view showing an example of the liquid crystal display device of the present invention. In FIG. 2, the liquid crystal display device 10 comprises a liquid crystal cell having a liquid crystal layer 15 and having a liquid crystal cell upper electrode substrate 5 and a liquid crystal cell lower electrode substrate 16 disposed on the top and bottom of the liquid crystal layer, and further comprises an upper polarizing plate 11 and a lower polarizing plate 18 disposed on both sides of the liquid crystal cell. A color filter may be disposed between the liquid crystal cell and each polarizing plate. When the liquid crystal display 10 is used as a transmission type, a cold cathode or hot cathode fluorescent tube, or a backlight using, as a light source, an light-emitting diode, a field emission element or an electroluminescent element, is disposed in the back side.

The upper polarizing plate 11 and the lower polarizing plate 18 each has a stack construction that a polarizer is sandwiched by two protective films, and in the liquid crystal display device 10 of the present invention, the liquid crystal cell-side protective film of one polarizing plate preferably has the characteristic features of the following formulae (1) to (4), the liquid crystal cell-side protective film of another polarizing plate preferably has the characteristic features of the following formulae (8) to (12). In the liquid crystal display device 10 of the present invention, a transparent protective film, a polarizer, and the cellulose acylate film of the present invention are preferably stacked in this order from the outer side (the side farther from the liquid crystal cell) of the device.

The liquid crystal display device 10 includes an image direct viewing type, an image projection type and an optical modulation type. The present invention is effective for an active matrix liquid crystal display device using a three-terminal or two-terminal semiconductor element such as TFT or MIM. Of course, the present invention is effective also for a passive matrix liquid crystal display device as represented by an STN mode called a time-division driving system.

[Rth Forward-Dispersion Film]

The polarizing plate protective film having the characteristic features of the following formulae (8) to (12) is described below. Such a protective film is preferably disposed on the side opposite the liquid crystal cell-side protective film comprising the Re reverse-dispersion film of the present invention, across the liquid crystal cell.

Formula (8) is more preferably 0 nm<Re(548)<5 nm and most preferably 0 nm<Re(548)<3 nm.

Formula (9) is more preferably 70 nm<Rth(548)<280 nm and most preferably 70 nm<Rth(548)<250 nm.

Formula (10) is more preferably 15<Rth(548)/Re(548) and most preferably 20<Rth(548)/Re(548).

Formula (11) is more preferably 1.01<Rth(446)/Rth(548)<1.8 and most preferably 1.01<Rth(446)/Rth(548)<1.5.

Formula (12) is more preferably 0.5<Rth(629)/Rth(548)<1.0 and most preferably 0.7<Rth(629)/Rth(548)<0.98.

By setting Re(λ) and Rth(λ) to the above-described ranges, a polarizing protective film having a large effect of reducing the tint change depending on the viewing angle can be obtained.

As for the polarizing plate protective film having the characteristic features of formulae (8) to (12) (hereinafter sometimes referred to as an "Rth forward-dispersion film"), various polymer films can be used. The polymer film is preferably a polymer film such as polycarbonate, cycloolefin-based polymer and cellulose acylate. Among these, cellulose acylate is preferred in view of suitability for processing into a polarizing plat. Here, an Rth forward-dispersion film, containing cellulose acylate as a main component is hereinafter sometimes referred to as an "Rth forward-dispersion cellulose acylate film".

The retardation of the cellulose acylate film used for the Rth forward-dispersion cellulose acylate film of the present invention can be adjusted by various methods. Among these methods, adjustment by an Rth developer described later, and adjustment by stretching of the film may be preferably used.

The "Rth developer" as used herein means a compound having a property of developing birefringence in the thickness direction of the film.

The Rth forward-dispersion film may be a polymer film alone or may be a polymer film having provided thereon an optically anisotropic layer. As for the optically anisotropic layer, an optically anisotropic layer formed by fixing a cholesteric liquid crystal may be used. Examples of the optically anisotropic layer which can be preferably used include a cholesteric liquid crystal layer described in JP-A-3-67219, JP-A-3-140921, JP-A-5-61039, JP-A-6-186534 and JP-A-9-133810, and an optically anisotropic layer formed by fixing a discotic liquid crystal compound oriented in the horizontal alignment disclosed in JP-A-11-352328. The optically anisotropic layer may be provided directly on the polymer film, or a functional layer such as orientation layer and adhesion layer may be provided between the polymer film and the optically anisotropic layer. The polymer film on which the optically anisotropic layer is provided is preferably a polymer film such as polycarbonate, cycloolefin-based polymer and cellulose acylate. Among these, cellulose acylate is more preferred in view of suitability for processing into a polarizing plate.

Also when the Rth forward-dispersion film comprises a polymer film alone, a resin film such as polycarbonate, cycloolefin-based polymer and cellulose acylate is preferred. Among these; cellulose acylate is more preferred in view of suitability for processing into a polarizing plate.

The Rth developer for use in the present invention is preferably a compound having an absorption maximum in the wavelength range of 250 to 380 nm and having large polarizability anisotropy.
(Cellulose Acylate)

The cellulose acylate for use in the Rth forward-dispersion cellulose acylate film is described below.

The cellulose acylate is preferably a cellulose acetate having an acetylation degree of 2.00 to 2.98. The acetylation degree is more preferably from 2.2 to 2.96.

The cellulose acetate for use in the Rth forward-dispersion cellulose acylate film of the present invention preferably has a mass average polymerization degree of 350 to 800, more preferably from 370 to 600. Also, the cellulose acylate for use in the present invention preferably has a number average molecular weight of 70,000 to 230,000, more preferably from 75,000 to 230,000, and most preferably from 78,000 to 120,000.

The cellulose acylate for use in the Rth forward-dispersion cellulose acylate film of the present invention can be produced using the same raw materials and synthesis methods as those of the cellulose acylate used for the Re reverse-dispersion film of the present invention.

Also, the steps of dope preparation, casting, drying and separation in the production of the Rth forward-dispersion cellulose acylate film of the present invention may be performed in the same manner as in the production of the Re reverse-dispersion cellulose acylate film of the present invention.
(Stretching)

The Rth forward-dispersion cellulose acylate film for use in the present invention may be subjected to a stretching treatment. The stretching is preferably uniaxial stretching only in the width direction or biaxial stretching in the width and conveying directions.

The method for stretching the film in the width direction is described, for example, in JP-A-62-115035, JP-A-4-152125, JP-A-4-284211, JP-A-4-298310 and JP-A-11-48271.

The stretching of the film is performed at ordinary temperature or under heating condition. The heating temperature is preferably not more than the glass transition temperature of the film. The film may be stretched by a treatment during drying, and this is effective particularly when the solvent remains. In the case of stretching in the longitudinal direction, for example, the film can be stretched by adjusting the speed of the film conveying roller to make the film take-up speed higher than the film separation speed. In the case of stretching in the width direction, the film can be stretched also by conveying the film while holding the film width by a tenter, and gradually increasing the width of the tenter. The film may also be stretched after drying, by using a stretching machine (preferably uniaxial stretching using a long stretching machine).

The biaxial stretching includes a simultaneous biaxial stretching method and a sequential biaxial stretching method, but a sequential biaxial stretching is preferred in view of continuous production. After casting a dope and separating the film from the band or drum, the film is stretched in the width direction (or longitudinal direction) and then stretched in the longitudinal direction (or width direction).

The stretch ratio of the Rth forward-dispersion cellulose acylate film for use in the present invention is, in the case of uniaxial stretching only in the width direction, preferably from 1.0 to 1.1 times, more preferably from 1.02 to 1.07 times.

In the case of biaxial stretching, the stretch ratios in the conveying direction and the width direction preferably satisfy the relationship of the following formula (D).

$$0.01 < \text{(stretch ratio in perpendicular direction)} - \text{(stretch ratio in parallel direction)} < 0.1 \quad \text{Formula (D)}$$

Formula (D) is more preferably 0.02<(stretch ratio in perpendicular direction)−(stretch ratio in parallel direction) <0.08.

By adjusting the stretch ratio to such a range, the orientation of cellulose acylate molecular chain, generated during conveyance is cancelled and the film can be adjusted to the preferred Re range and greatly improved in the surface state.
(Thickness of Rth Forward-Dispersion Cellulose Acylate Film)

The thickness of the Rth forward-dispersion cellulose acylate film for use in the present invention is preferably from 10 to 200 μm, more preferably from 20 to 150 μm, and most preferably from 30 to 100 μm.
[VA Mode]

The liquid crystal cell of the liquid crystal display device of the present invention is preferably a VA-mode liquid crystal cell.

The VA-mode liquid crystal cell is produced by forming a layer from a liquid crystal having a negative dielectric anisotropy on the order of $\Delta n=0.0813$ and $\Delta \varepsilon =-4.6$ between upper and lower substrates and performing rubbing orientation such that the director indicating the alignment direction of liquid crystal molecules, so-called a tilt angle, becomes about 89°. In FIG. 2, the thickness d of the liquid crystal layer 7 is set to 3.5 μm. Here, the brightness at the white display time varies depending on the size of the product Δnd of thickness d and refractive index anisotropy Δn. Therefore, the thickness of the liquid crystal layer is set to the range from 0.2 to 0.5 μm so as to obtain maximum brightness.

The polarizing plates of the liquid crystal cell are stacked such that the absorption axis 2 of the upper polarizing plate 1 and the absorption axis 13 of the lower polarizing plate 12 cross nearly at right angles. A transparent electrode (not shown) is formed on the inner side of each orientation film of the liquid crystal cell upper electrode substrate 5 and the liquid crystal cell lower electrode substrate 8. In the non-driven state of not applying a driving voltage to the electrodes, the liquid crystal molecules in the liquid crystal layer 7 are oriented in an alignment nearly vertical to the substrate surface, as a result, the polarizing state of light passing through the liquid crystal panel is scarcely changed. That is, the liquid crystal display realizes an ideal black display in the non-driven state. On the other hand, in the driven state, the liquid crystal molecules are tilted to the direction parallel to the substrate surface, and the polarizing state of light passing through the liquid crystal panel is changed by these tilted liquid crystal molecules. In other words, the liquid crystal display provides a white display in the driven state. Incidentally, in FIG. 2, the reference numerals 6 and 9 indicate the alignment control direction.

Here, an electric field is applied between the upper and lower substrates and therefore, a liquid crystal material having negative dielectric anisotropy is used so that the liquid crystal molecule responds vertically with respect to the electric field direction. In the case where the electrodes are disposed on one substrate and the electric field is applied in the transverse direction parallel to the substrate surface, a liquid crystal material having positive dielectric anisotropy is used.

In the VA-mode liquid crystal display, addition of a chiral material, which is generally performed in a TN-mode liquid crystal display, causes deterioration in the dynamic response characteristics and therefore, a chiral compound is used less often but in some cases, may be added for reducing the alignment failure.

The characteristic features of the VA-mode liquid crystal display are high-speed response and high contrast. However, this mode has a problem that the contrast which is high in the front deteriorates in the oblique direction. At the black display time, the liquid crystal molecules are oriented in an alignment vertical to the substrate surface. When viewed from the front, high contrast is obtained because the liquid crystal molecule has almost no birefringence and the transmittance is low. However, when viewed from an oblique direction, birefringence is produced in the liquid crystal molecule. Furthermore, the crossing angle between absorption axes of the upper and lower polarizing plates is a right angle of 90° when viewed from the front but exceeds 90° when viewed from the oblique direction. Because of these two factors, light leakage occurs in the oblique direction and the contrast decreases. In order to solve this problem, an optically-compensatory sheet is disposed.

At the white display time, the liquid crystal molecules are tilted, but the size of birefringence of the liquid crystal molecule when viewed from the oblique direction greatly differs between the tilted direction and the opposite direction, and there arises a difference in the brightness or color tone. In order to solve this problem, a structure called multi-domain, where one picture element of the liquid crystal display is divided into a plurality of regions, is employed.

[Multi-Domain]

For example, in the VA mode, when an electric field is applied, the liquid crystal molecules are tilted in a plurality of different regions within one picture element, whereby the viewing angle characteristics are averaged. For dividing the orientation within one picture element, a slit or protrusion is provided on the electrode to change the electric field direction or make uneven the electric-field density. In order to obtain a uniform viewing angle in all directions, this may be attained by increasing the number of divided regions. The viewing angle can be made nearly uniform by the division into 4 regions or 8 or more regions. In particular, when divided into 8 regions, the angle formed by absorption axes of the polarizing plates can be arbitrarily set and this is preferred.

However, the liquid crystal molecule can hardly respond on the border between regions created by the division of orientation. Therefore, black display is maintained at the normally black display, and this causes a problem that the brightness lowers. For solving this problem, the boundary region may be decreased by adding a chiral agent to the liquid crystalline material.

EXAMPLES

The present invention is described in greater detail below by referring to Examples, but the present invention is not limited to these Examples.

Example 1

Production of Re Reverse-Dispersion Film 101

(Preparation of Cellulose Acylate Solution 11)

Cellulose Acylate Solution 11 is prepared by charging the following composition into a mixing tank and stirring it to dissolve respective components.

| Composition of Cellulose Acylate Solution 11 | |
|---|---|
| Cellulose acetate having acetyl substitution degree of 2.70 and polymerization degree of 420 | 100.0 parts by mass |
| Triphenyl phosphate (plasticizer) | 6.0 parts by mass |
| Biphenyl phosphate (plasticizer) | 3.0 parts by mass |
| Methylene chloride (first solvent) | 402.0 parts by mass |
| Methanol (second solvent) | 60.0 parts by mass |

(Preparation of Matting Agent Solution 12)

Matting Agent Solution 12 is prepared by charging the following composition into a disperser and stirring it to dissolve respective components.

| Composition of Matting Agent Solution 12 | |
|---|---|
| Silica particle having an average particle size of 20 nm (AEROSIL R972, produced by Nihon Aerosil Co., Ltd.) | 2.0 parts by mass |
| Methylene chloride (first solvent) | 75.0 parts by mass |
| Methanol (second solvent) | 12.7 parts by mass |
| Cellulose Acylate Solution 11 | 10.3 parts by mass |

(Preparation of Retardation Developer Solution 13)

Retardation Developer Solution 13 is prepared by charging the following composition into a mixing tank and stirring it under heating to dissolve respective components.

| Composition of Retardation Developer Solution 13 | |
|---|---|
| Re Developer (104) | 20.0 parts by mass |
| Methylene chloride (first solvent) | 67.2 parts by mass |
| Methanol (second solvent) | 10.0 parts by mass |
| Cellulose Acylate Solution 11 | 12.8 parts by mass |

1.3 Parts by mass of Matting Agent Solution 12 and 6.0 parts by mass of Retardation Developer Solution 13 are mixed using an in-line mixer after filtering each solution, 92.7 parts by mass of Cellulose Acylate Solution 11 is further added and mixed using an in-line mixer, the mixture is then cast using a band casting machine, and the film is dried at 100° C. until reaching a residual solvent content of 40% and then stripped off. The film having a residual solvent content of 15% is transversely stretched at a stretch ratio of 40% by using a tenter at an ambient temperature of 140° C. and further kept at 120° C. for 3 minutes. After removing the clips, the film is dried at 130° C. for 30 minutes to produce Re Reverse-Dispersion Cellulose Acylate Film 101. The produced Re Reverse-Dispersion Cellulose Acylate Film 101 has a residual solvent amount of 0.1% and a thickness of 99 μm.

Example 2

Production of Re Reverse-Dispersion Film 102

1.3 Parts by mass of Matting Agent Solution 12 and 6.0 parts by mass of Retardation Developer Solution 13 are mixed using an in-line mixer after filtering each solution, 92.7 parts by mass of Cellulose Acylate Solution 11 is further added and mixed using an in-line mixer, the mixture is then cast using a band casting machine, and the film is dried at 80° C. until reaching a residual solvent content of 25% and then stripped off. The film is dried at an ambient temperature of 100° C. until reaching a residual solvent content of 5% and further dried at 130° C. for 30 minutes to produce a cellulose acylate film having a thickness of 108 μm.

This film is stretched by 15% in the width direction at 160° C. while conveying the film, then shrunk by 5% in the conveying direction, and gripped at 120° C. for 3 minutes. After removing the clips, the film is further dried at 120° C. for 30 minutes to produce Re Reverse-Dispersion Cellulose Acylate Film 102. The produced Re Reverse-Dispersion Cellulose Acylate Film 102 has a residual solvent amount of 0.2% and a thickness of 96 μm.

Example 3

Production of Re Reverse-Dispersion Film 103

(Preparation of Cellulose Acylate Solution 21)
Cellulose Acylate Solution 21 is prepared by charging the following composition into a mixing tank and stirring it to dissolve respective components.

| Composition of Cellulose Acylate Solution 21 | |
|---|---|
| Cellulose acetate benzoate having acetyl substitution degree of 2.36, benzoyl substitution degree of 0.42 (benzoyl substitution degree at 6-position/total benzoyl substitution degree = 0.89) and polymerization degree of 320 | 100.0 parts by mass |
| Triphenyl phosphate (plasticizer) | 6.0 parts by mass |
| Biphenyl phosphate (plasticizer) | 3.0 parts by mass |
| Methylene chloride (first solvent) | 315.0 parts by mass |
| Methanol (second solvent) | 47.0 parts by mass |

(Preparation of Matting Agent Solution 22)
Matting Agent Solution 22 is prepared by charging the following composition into a disperser and stirring it to dissolve respective components.

| Composition of Matting Agent Solution 22 | |
|---|---|
| Silica particle having an average particle size of 20 nm (AEROSIL R972, produced by Nihon Aerosil Co., Ltd.) | 2.0 parts by mass |
| Methylene chloride (first solvent) | 75.0 parts by mass |
| Methanol (second solvent) | 12.7 parts by mass |
| Cellulose Acylate Solution 21 | 10.3 parts by mass |

(Preparation of Retardation Developer Solution 23)
Retardation Developer Solution 23 is prepared by charging the following composition into a mixing tank and stirring it under heating to dissolve respective components.

| Composition of Retardation Developer Solution 23 | |
|---|---|
| Re Developer (104) | 20.0 parts by mass |
| Methylene chloride (first solvent) | 67.2 parts by mass |
| Methanol (second solvent) | 10.0 parts by mass |
| Cellulose Acylate Solution 21 | 12.8 parts by mass |

1.3 Parts by mass of Matting Agent Solution 22 and 6.0 parts by mass of Retardation Developer Solution 23 are mixed using an in-line mixer after filtering each solution, 92.7 parts by mass of Cellulose Acylate Solution 21 is further added and mixed using an in-line mixer, the mixture is then cast using a band casting machine, and the film is dried at 70° C. until reaching a residual solvent content of 40% and then stripped off. The film having a residual solvent content of 20% is transversely stretched at a stretch ratio of 35% by using a tenter at an ambient temperature of 130° C. and further kept at 120° C. for 3 minutes. After removing the clips, the film is dried at 120° C. for 30 minutes to produce Re Reverse-Dispersion Film 103. The produced Re Reverse-Dispersion Cellulose Acylate Film 103 has a residual solvent amount of 0.1% and a thickness of 70 μm.

Example 4

Production of Re Reverse-Dispersion Film 104

1.3 Parts by mass of Matting Agent Solution 22 and 6.0 parts by mass of Retardation Developer Solution 23 are mixed using an in-line mixer after filtering each solution, 92.7 parts by mass of Cellulose Acylate Solution 21 is further added and mixed using an in-line mixer, the mixture is then cast using a band casting machine, and the film is dried at 120° C. until reaching a residual solvent content of 15% and then stripped off. The film is dried at an ambient temperature of 100° C. until reaching a residual solvent content of 5% and further dried at 120° C. for 30 minutes to produce a cellulose acylate film having a thickness of 95 μm.

This film is stretched by 30% in the width direction at 140° C. while conveying the film, then shrunk by 10% in the conveying direction, and gripped at 120° C. for 3 minutes. After removing the clips, the film is further dried at 120° C. for 30 minutes to produce Re Reverse-Dispersion Cellulose Acylate Film 104. The produced Re Reverse-Dispersion Cellulose Acylate Film 104 has a residual solvent amount of 0.1% and a thickness of 90 μm.

Example 5

Production of Re Reverse-Dispersion Film 105

(Preparation of Cellulose Acylate Solution 31)

Cellulose Acylate Solution 31 is prepared by charging the following composition into a mixing tank and stirring it to dissolve respective components.

| Composition of Cellulose Acylate Solution 31 | |
|---|---|
| Cellulose acetate having an acetyl substitution degree of 2.94 and a polymerization degree of 400 | 100.0 parts by mass |
| Triphenyl phosphate (plasticizer) | 3.5 parts by mass |
| Biphenyl phosphate (plasticizer) | 1.8 parts by mass |
| Methylene chloride (first solvent) | 402.0 parts by mass |
| Methanol (second solvent) | 60.0 parts by mass |

(Preparation of Matting Agent Solution 32)

Matting Agent Solution 32 is prepared by charging the following composition into a disperser and stirring it to dissolve respective components.

| Composition of Matting Agent Solution 32 | |
|---|---|
| Silica particle having an average particle size of 20 nm (AEROSIL R972, produced by Nihon Aerosil Co., Ltd.) | 2.0 parts by mass |
| Methylene chloride (first solvent) | 75.0 parts by mass |
| Methanol (second solvent) | 12.7 parts by mass |
| Cellulose Acylate Solution 31 | 10.3 parts by mass |

(Preparation of Retardation Developer Solution 33)

Retardation Developer Solution 33 is prepared by charging the following composition into a mixing tank and stirring it under heating to dissolve respective components.

| Composition of Retardation Developer Solution 33 | |
|---|---|
| Re Developer (104) | 20.0 parts by mass |
| Methylene chloride (first solvent) | 67.2 parts by mass |
| Methanol (second solvent) | 10.0 parts by mass |
| Cellulose Acylate Solution 31 | 12.8 parts by mass |

1.3 Parts by mass of Matting Agent Solution 32 and 4.9 parts by mass of Retardation Developer Solution 33 are mixed using an in-line mixer after filtering each solution, 93.8 parts by mass of Cellulose Acylate Solution 31 is further added and mixed using an in-line mixer, the mixture is then cast using a band casting machine, and the film is dried at 100° C. until the residual solvent content becomes 3%, and then stripped off. This film is transversely stretched at a stretch ratio of 25% by using a tenter at an ambient temperature of 155° C. and after removing the clips, dried at 130° C. for 20 minutes to produce Re Reverse-Dispersion Cellulose Acylate Film 105. The produced Re Reverse-Dispersion Cellulose Acylate Film 105 has a residual solvent amount of less than 0.1% and a thickness of 95 μm.

Example 6

Production of Re Reverse-Dispersion Films 107 to 109

Re Reverse-Dispersion Films 107 to 109 are produced in the same manner as in Example 5 except that in Re Reverse-Dispersion Film 105 of Example 5, the kind and amount added of the Re developer and the stretching temperature are changed to the contents shown in Table 1.

Example 7

Production of Re Reverse-Dispersion Film 110

Re Reverse-Dispersion Film 110 is produced in the same manner as in Example 5 except that in Re Reverse-Dispersion Film 105 of Example 5, triphenyl phosphate and biphenyl phosphate in Cellulose Acylate Solution 31 are not added and the kind and amount added of the Re developer and the stretching temperature are changed to the contents shown in Table 1.

Comparative Example 1

Production of Re Reverse-Dispersion Film 201

120 Parts by mass of cellulose acetate having an average acetylation degree of 59.7%, 9.36 parts by mass of triphenyl phosphate, 4.68 parts by mass of biphenyl diphenyl phosphate, 1.00 part by mass of Retardation Developer B shown below, 543.14 parts by mass of methylene chloride, 99.35 parts by mass of methanol and 19.87 parts by mass of n-butanol are mixed at room temperature to prepare a solution (dope).

Retardation Developer B:

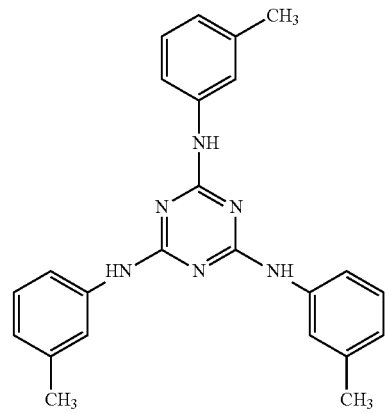

The dope obtained is cast on a glass plate, dried at room temperature for 1 minute and then dried at 45° C. for 5 minutes. The residual solvent amount after drying is 30 mass %. The cellulose acylate film is separated from the glass plate and dried at 120° C. for 10 minutes. The film is cut into an appropriate size and stretched in the direction parallel to the casting direction at 130° C. The direction perpendicular to the stretching direction is allowed to freely shrink. After stretching, the film in this state is directly dried at 120° C. for 30 minutes, and the stretched film is then taken out. The residual solvent amount after stretching is 0.1 mass %. The thickness of the obtained film is 95 μm. Also, the stretch ratio is 1.42 times.

Comparative Example 2

Production of Re Reverse-Dispersion Film 202

The following composition is charged into a mixing tank and stirred to dissolve respective components, and the obtained solution is heated at 90° C. for about 10 minutes and then subjected to constant flow filtration using a filter paper having an average pore size of 34 μm to prepare Cellulose Acylate Solution 41.

| Cellulose Acylate Solution 41 | |
| --- | --- |
| Cellulose acylate having an acetyl substitution degree of 2.79, in which the ratio of the substitution degree at the 6-position to the entire substitution degree is 0.327 | 100.0 parts by mass |
| Triphenyl phosphate | 8.0 parts by mass |
| Biphenyl diphenyl phosphate | 4.0 parts by mass |
| Methylene chloride | 403.0 parts by mass |
| Methanol | 60.2 parts by mass |

The following composition containing Cellulose Acylate Solution 41 prepared above is charged into a disperser to prepare Matting Agent Liquid Dispersion 42.

| Matting Agent Liquid Dispersion 42 | |
| --- | --- |
| Silica particle having an average particle size of 16 nm (aerosil R972, produced by Nihon Aerosil Co., Ltd.) | 2.0 parts by mass |
| Methylene chloride | 72.4 parts by mass |
| Methanol | 10.8 parts by mass |
| Cellulose Acylate Solution 41 | 10.3 parts by mass |

The following composition containing the cellulose acylate solution prepared above is charged into a mixing tank and dissolved by stirring under heating to prepare Retardation Developer Solution 43.

| Retardation Developer Solution 43 | |
| --- | --- |
| Retardation Developer C | 20.0 parts by mass |
| Methylene chloride | 58.3 parts by mass |
| Methanol | 8.7 parts by mass |
| Cellulose Acylate Solution 41 | 12.8 parts by mass |

100 Parts by mass of Cellulose Acylate Solution 41, 1.35 parts by mass of Matting Agent Liquid Dispersion 42, and Retardation Developer Solution 43 in an amount of giving a ratio shown in Table 1 are mixed to prepare a dope for film formation.

Retardation Developer C:

Retardation Developer C:

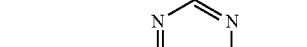

The dope prepared above is cast using a band casting machine, and the film with a residual solvent amount of 35 mass % is stripped off from the band and stretched at a stretch ratio of 25% by using a tenter to produce a cellulose acylate film. In the tenter, the film is stretched in the width direction while drying by applying hot air and then shrunk by about 5% and after transfer to roll conveyance from the tenter conveyance, the film is further dried, knurled and taken up in a width of 1,500 mm.

Comparative Example 3

Production of Re Reverse-Dispersion Film 203

The following composition is charged into a mixing tank and stirred to dissolve respective components, and the obtained solution is filtered through a filter paper having an average pore size of 34 μm and a calcined metal filter having an average pore size of 10 μm.

| Cyclic Polyolefin Solution D-3 | |
| --- | --- |
| Cyclic polyolefin: ARTON-G | 150 parts by mass |
| Liquid paraffin: Daphne Oil CP68 (Idemitsu Kosan Co., Ltd.) | 15 parts by mass |
| Dichloromethane | 450 parts by mass |

The following composition containing the cyclic polyolefin solution prepared above is charged into a disperser to prepare a fine particle liquid dispersion.

| Fine Particle Liquid Dispersion M-3 | |
| --- | --- |
| Silica particle having an average primary particle diameter of 16 nm (AEROSIL R972, produced by Nihon Aerosil Co., Ltd.) | 2 parts by mass |
| Dichloromethane | 83 parts by mass |
| Cyclic Polyolefin Solution D-3 | 10 parts by mass |

100 Parts by mass of Cyclic Polyolefin Solution D-3 and 1.35 parts by mass of Fine Particle Liquid Dispersion M-1 are mixed to prepare a dope for film formation. This dope is cast using a band casting machine, and the film having a residual solvent content of about 25 mass % is stripped off from the band and dried at 120° C.

Thereafter, in a tenter, the film is stretched to 1.15 times in the direction perpendicular to the conveying direction under heating at 130° C., then cooled by keeping this state for 1 minute under an atmosphere at 90° C., and further cooled at room temperature. The film is taken out from the tenter to obtain Stretched Polymer Film 202 of Comparative Example. The thickness is 88 μm.

Comparative Example 4

Production of Re Reverse-Dispersion Film 204

Re Reverse-Dispersion Film 204 is produced in the same manner as in Example 5 except that in Re Reverse-Dispersion Film 105 of Example 5, the kind and amount added of the Re developer and the stretching temperature are changed to the contents shown in Table 1.

TABLE 1

| | Film Thickness (μm) | Polymer | Re Developer 1 Kind | Amount Added* |
|---|---|---|---|---|
| 101 | 99 | cellulose acetate with acetyl substitution degree of 2.70 | (104) | 7.4 |
| 102 | 96 | cellulose acetate with acetyl substitution degree of 2.70 | (104) | 7.4 |
| 103 | 70 | cellulose acetate benzoate with acetyl substitution degree of 2.36 and benzoyl substitution degree of 0.42 | (104) | 7.4 |
| 104 | 90 | cellulose acetate benzoate with acetyl substitution degree of 2.36 and benzoyl substitution degree of 0.42 | (104) | 7.4 |
| 105 | 95 | cellulose acetate with acetyl substitution degree of 2.94 | (104) | 6.0 |
| 107 | 50 | " | (104) | 6.0 |
| 108 | 40 | " | (104) | 8.0 |
| 109 | 81 | " | — | — |
| 110 | 55 | " | (104) | 2.0 |
| 201 | 95 | cellulose acetate with acetyl substitution degree of 2.77 | B | 1.0 |
| 202 | 91 | cellulose acetate with acetyl substitution degree of 2.79 | C | 6.0 |
| 203 | 88 | ARTON | — | — |
| 204 | 78 | cellulose acetate with acetyl substitution degree of 2.94 | (104) | 3.0 |
| 205 | 91 | modified polycarbonate | — | — |

| | Re Developer 2 Kind | Amount Added* | Weight Ratio of Liquid Crystalline Compound** | Transition Temperature of Liquid Crystalline Compound** Tm (° C.) | Ti (° C.) | Stretching Temperature (° C.) | Remarks |
|---|---|---|---|---|---|---|---|
| 101 | — | — | 45% | 160 | 250 | 130 | Invention |
| 102 | — | — | 45% | 160 | 250 | 130 | Invention |
| 103 | — | — | 45% | 160 | 250 | 130 | Invention |
| 104 | — | — | 45% | 160 | 250 | 130 | Invention |
| 105 | — | — | 47% | 160 | 250 | 155 | Invention |
| 107 | Rod-like Compound (8) | 5.0 | 67% | 110 | 185 | 175 | Invention |
| 108 | Rod-like Compound (8) | 5.0 | 71% | 80 | 163 | 155 | Invention |
| 109 | Rod-like Compound (8) | 5.0 | 49% | 110 | 158 | 155 | Invention |
| 110 | Rod-like Compound (8) | 8.0 | 100% | 75 | 161 | 155 | Invention |
| 201 | — | — | 0% | — | — | 130 | Comparative Example |
| 202 | — | — | 0% | — | — | 140 | Comparative Example |
| 203 | — | — | 0% | — | — | 130 | Comparative Example |
| 204 | — | — | 36% | 160 | 250 | 175 | Comparative Example |
| 205 | — | — | 0% | — | — | — | Comparative Example |

*Weight % based on the polymer.

**Re Developer (104) and Rod-like Compound (8) are liquid crystalline compounds, Re Developers B and C are non-liquid crystalline compounds, and triphenyl phosphate and biphenyl diphenyl phosphate are also non-liquid crystalline compounds.

With respect to the thus-produced Re Reverse-Dispersion Films 101 to 110, Comparative Examples 201 to 204, and commercially available Pure-Ace (Film 205) described later, Re and Rth at wavelengths of 446 nm, 548 nm and 628 nm are measured at 25° C. and a relative humidity of 10%, 60% or 80% by an automatic birefringence meter (KOBRA-WR, manufactured by Oji Test Instruments).

Furthermore, the film is cut into a size of 3.5 cm×12 cm, and Re of the film is measured without a load or under a load of 250 g, 500 g, 1,000 g or 1,500 g by an ellipsometer (M-150, JASCO Corp.). Then, the photoelastic coefficient is determined by the calculation from the gradient of a straight line of the Re change for the stress.

The results are shown in Table 2 below.

TABLE 2

| | Re(446) | Re(548) | Re(629) | Re(446)/Re(548) | Re(629)/Re(548) | Humidity Dependency of Re* | Photoelastic Coefficient ($\times 10^{-8}$ cm$^2$/N) | Remarks |
|---|---|---|---|---|---|---|---|---|
| 101 | 43 | 51 | 54 | 0.84 | 1.06 | 17% | 12 | Invention |
| 102 | 54 | 65 | 69 | 0.83 | 1.06 | 18% | 12 | Invention |
| 103 | 46 | 57 | 61 | 0.81 | 1.07 | 4% | 20 | Invention |
| 104 | 76 | 96 | 105 | 0.79 | 1.09 | 4% | 20 | Invention |
| 105 | 33 | 59 | 67 | 0.56 | 1.14 | 19% | 13 | Invention |
| 107 | 112 | 129 | 134 | 0.87 | 1.04 | 3% | 18 | Invention |
| 108 | 100 | 120 | 126 | 0.83 | 1.05 | 2% | 19 | Invention |
| 109 | 67 | 70 | 72 | 0.96 | 1.03 | 15% | 13 | Invention |
| 110 | 92 | 97 | 99 | 0.95 | 1.02 | 2% | 20 | Invention |
| 201 | 117 | 137 | 143 | 0.85 | 1.04 | 24% | 14 | Comparative Example |
| 202 | 64 | 62 | 60 | 1.03 | 0.97 | 14% | 18 | Comparative Example |
| 203 | 55 | 55 | 55 | 1.00 | 1.00 | less than 1% | less than 5 | Comparative Example |
| 204 | 8 | 19 | 23 | 0.42 | 1.21 | 17% | 12 | Comparative Example |
| 205 | 125 | 155 | 163 | 0.81 | 1.05 | less than 1% | 42 | Comparative Example |

*Humidity dependency of Re = {(Re(548) at 25° C.-10% RH − Re(548) at 25° C.-80% RH)}/Re(548) at 25° C.-60% RH

Example 7

Saponification of Re Reverse-Dispersion Film 101

Re Reverse-Dispersion Film 101 produced is dipped in an aqueous 2.3 mol/L sodium hydroxide solution at 55° C. for 3 minutes, and the film is then washed in a water-washing bath at room temperature, further neutralized using 0.05 mol/L sulfuric acid at 30° C., again washed in a water-washing bath at room temperature and dried with hot air at 100° C. In this way, the surface of Re Reverse-Dispersion Film 101 is saponified.

Example 8

Saponification of Re Reverse-Dispersion Films 102 to 105 and 107 to 110

Re Reverse-Dispersion Films 102 to 105 and 107 to 110 each is subjected to surface saponification in the same manner as Re Reverse-Dispersion Film 101.

Comparative Example 4

Saponification of Re Reverse-Dispersion Films 201, 202 and 204

Each of Re Reverse-Dispersion Films 201, 202 and 204 is saponified in the same manner as Re Reverse-Dispersion Film 101.

Comparative Example 5

Surface Treatment of Re Reverse-Dispersion Film 203

The surface of Re Reverse-Dispersion Film 203 is treated under the condition of 12 W·min/m$^2$ by using a corona discharger manufactured by Kasuga Electric Works Ltd. and thereby imparted with hydrophilicity.

Comparative Example 6

Surface Treatment of Re Reverse-Dispersion Film 205

The surface of a commercially available polycarbonate film (Pure-Ace WR, trade name (produced by Teijin, Ltd.)) is treated under the condition of 12 W·min/m$^2$ by using a corona discharger manufactured by Kasuga Electric Works Ltd. and thereby imparted with hydrophilicity, and this film is designated as Re Reverse-Dispersion Film 205 of Comparative Example.

Example 10

Production of Polarizing Plate 101

A polarizer is produced by adsorbing iodine to a stretched polyvinyl alcohol film.

Re Reverse-Dispersion Film 101 saponified in Example 7 is laminated to one side of the polarizer by using a polyvinyl alcohol-based adhesive. Furthermore, a commercially available cellulose triacetate film (FUJI-TAC TD80UF, produced by Fuji Photo Film Co., Ltd.) is saponified in the same manner and laminated to the side opposite the Re Reverse-Dispersion Film 101 by using a polyvinyl alcohol-based adhesive.

The transmission axis of the polarizer and the slow axis of Re Reverse-Dispersion Film 101 are arranged to run in parallel. Also, the transmission axis of the polarizer and the slow axis of the commercially available cellulose triacetate film are arranged to cross at right angles.

In this way, Polarizing Plate 101 is produced.

Example 11

Production of Polarizing Plates 102 to 105 and 107 to 1110

Polarizing Plates 102 to 105 and 107 to 110 are produced in the same manner as in Example 10 by using Re Reverse-Dispersion Films 102 to 105 and 107 to 110, respectively.

Comparative Example 7

Production of Polarizing Plates 201 to 205

Polarizing Plates 201 to 205 are produced in the same manner as in Example 10 by using Re Reverse-Dispersion Films 201 to 205, respectively.

Reference Example 1

Production of Rth Forward-Dispersion Cellulose Acylate Film 301

(Preparation of Cellulose Acylate Solution)

Cellulose Acylate Solution 51 is prepared by charging the following composition into a mixing tank and stirring it to dissolve respective components.

| Composition of Cellulose Acylate Solution 51 | |
|---|---|
| Cellulose acetate having acetyl substitution degree of 2.81 and average polymerization degree of 360 | 100.0 parts by mass |
| Triphenyl phosphate | 7.0 parts by mass |
| Biphenyl phosphate | 4.0 parts by mass |
| Methylene chloride (first solvent) | 402.0 parts by mass |
| Methanol (second solvent) | 60.0 parts by mass |

(Preparation of Matting Agent Solution 52)

Matting Agent Solution 52 is prepared by charging the following composition into a disperser and stirring it to dissolve respective components.

| Composition of Matting Agent Solution 52 | |
|---|---|
| Silica particle having an average particle size of 20 nm (AEROSIL R972, produced by Nihon Aerosil Co., Ltd.) | 2.0 parts by mass |
| Methylene chloride (first solvent) | 75.0 parts by mass |
| Methanol (second solvent) | 12.7 parts by mass |
| Cellulose Acylate Solution 51 | 10.3 parts by mass |

(Preparation of Wavelength-Dispersion Controlling Agent Solution 53)

A wavelength-dispersion controlling agent solution is prepared by charging the following composition into a mixing tank and stirring it under heating to dissolve respective components.

| Composition of Wavelength-Dispersion Controlling Agent Solution 53 | |
|---|---|
| Wavelength-Dispersion Controlling Agent A | 20.0 parts by mass |
| Methylene chloride (first solvent) | 58.4 parts by mass |
| Methanol (second solvent) | 8.7 parts by mass |
| Cellulose Acylate Solution 51 | 12.8 parts by mass |

Wavelength-Dispersion Controlling Agent A:

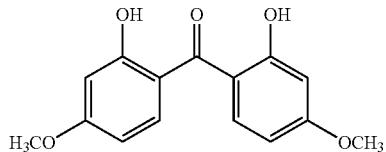

90.4 Parts by mass of Cellulose Acylate Solution 51, 1.3 parts by mass of Matting Agent Solution 52 and 8.3 parts by mass of Wavelength-Dispersion Controlling Agent Solution 53 are mixed after filtration, and the mixture is then cast in a width of 1,600 mm by using a band casting machine. The film having a residual solvent content of 50 mass % is separated from the band, transversely stretched at a stretch ratio of 4% while holding the film with tenter clips under the condition of 100° C., and dried until reaching a residual solvent content of 5 mass % (Drying 1). Furthermore, the film is held at 100° C. for 30 seconds by keeping the width after stretching and then liberated from the tenter clips. After slitting respective portions of 5% from both ends in the width direction, the film is passed through a drying zone at 135° C. over 20 minutes in the state of the width direction being in a free state (not held) (Drying 2) and then taken up into a roll. The cellulose acylate film obtained has a residual solvent amount of 0.1 mass % and a thickness of 81 µm. Also, Rth(446) is 209 nm, Rth(548) is 175 nm, and Rth(629) is 165 nm.

Reference Example 2

Production of Rth Forward-Dispersion Cellulose Acylate Film 302

(Preparation of Cellulose Acylate Solution)

Cellulose Acylate Solution 61 is prepared by charging the following composition into a mixing tank and stirring it to dissolve respective components.

| Composition of Cellulose Acylate Solution 61 | |
|---|---|
| Cellulose acetate having an acetyl substitution degree of 2.87 and an average polymerization degree of 390 | 100.0 parts by mass |
| Triphenyl phosphate | 8.0 parts by mass |
| Biphenyl phosphate | 4.0 parts by mass |
| Methylene chloride (first solvent) | 402.0 parts by mass |
| Methanol (second solvent) | 60.0 parts by mass |

(Preparation of Matting Agent Solution 62)

Matting Agent Solution 62 is prepared by charging the following composition into a disperser and stirring it to dissolve respective components.

| Composition of Matting Agent Solution 62 | |
|---|---|
| Silica particle having an average particle size of 20 nm (AEROSIL R972, produced by Nihon Aerosil Co., Ltd.) | 2.0 parts by mass |
| Methylene chloride (first solvent) | 75.0 parts by mass |
| Methanol (second solvent) | 12.7 parts by mass |
| Cellulose Acylate Solution 61 | 10.3 parts by mass |

(Preparation of Wavelength-Dispersion Controlling Agent Solution 63)

A wavelength-dispersion controlling agent solution is prepared by charging the following composition into a mixing tank and stirring it under heating to dissolve respective components.

| Composition of Wavelength-Dispersion Controlling Agent Solution 63 | |
|---|---|
| Retardation Developer C | 20.0 parts by mass |
| Methylene chloride (first solvent) | 58.4 parts by mass |
| Methanol (second solvent) | 8.7 parts by mass |
| Cellulose Acylate Solution 61 | 12.8 parts by mass |

92.2 Parts by mass of Cellulose Acylate Solution 61, 1.3 parts by mass of Matting Agent Solution 62 and 6.5 parts by mass of Wavelength-Dispersion Controlling Agent Solution 63 are mixed after filtration, and the mixture is then cast in a width of 1,600 mm by using a band casting machine. The film with a residual solvent content of 60 mass % is separated from the band, transversely stretched at a stretch ratio of 4% while holding the film with tenter clips under the condition of 100° C., and dried until the residual solvent content becomes 5 mass % (Drying 1). Furthermore, the film is held at 100° C. for 30 seconds by keeping the width after stretching and then liberated from the tenter clips. After slitting respective portions of 5% from both ends in the width direction, the film is passed through a drying zone at 130° C. over 20 minutes in the state of the width direction being in a free state (not held) (Drying 2) and then taken up into a roll. The cellulose acylate film obtained has a residual solvent amount of 0.1 mass % and a thickness of 51 µm. Also, Rth(446) is 113 nm, Rth(548) is 109 nm, and Rth(629) is 107 nm.

Reference Example 3

Saponification Treatment of Rth Forward-Dispersion Cellulose Acylate Films 301 and 302

Each of Rth Forward-Dispersion Cellulose Acylate Films 301 and 302 produced is dipped in an aqueous 2.3 mol/L sodium hydroxide solution at 55° C. for 3 minutes, and the film is then washed in a water-washing bath at room temperature, further neutralized using 0.05 mol/L sulfuric acid at 30° C., again washed in a water-washing bath at room temperature and dried with hot air at 100° C. In this way, the surface of each of Rth Forward-Dispersion Films 301 and 302 is saponified.

[Production of Polarizing Plate 301]
(Saponification of Polarizing Plate Protective Film)

A commercially available cellulose triacetate film (FUJI-TAC TD80, produced by Fuji Photo Film Co., Ltd.) is dipped in an aqueous 1.5 mol/L sodium hydroxide solution at 55° C. for 1 minute, and the film is then washed in a water-washing bath at room temperature, further neutralized using 0.05 mol/L sulfuric acid at 30° C., again washed in a water-washing bath at room temperature and dried with hot air at 100° C. (Production of Polarizer)

A polarizer is produced by adsorbing iodine to a stretched polyvinyl alcohol film, and Rth Forward-Dispersion Cellulose Acylate Film 301 saponified above is laminated to one side of the polarizer by using a polyvinyl alcohol-based adhesive. The absorption axis of the polarizer and the slow axis of the cellulose acylate film are arranged to run in parallel.

Furthermore, the commercially available cellulose triacetate film saponified above is laminated to the opposite side by using a polyvinyl alcohol-based adhesive. In this way, Polarizing Plate 301 is produced.
[Production of Polarizing Plate 302]

Using Rth Forward-Dispersion Cellulose Acylate Film 302, Polarizing Plate 302 is produced in the same manner as in the production of Polarizing Plate 301.

Example 12

Production of Liquid Crystal Display Device

On the VA-mode liquid cell, one sheet of Polarizing plate 101 as the upper polarizing plate 1 in FIG. 2 is laminated to the viewer side through a pressure-sensitive adhesive such that Re Reverse-Dispersion Film 101 of the present invention comes to the liquid cell side, and one sheet of Polarizing Plate 301 as the lower polarizing plate 12 is laminated to the backlight side through a pressure-sensitive adhesive such that Rth Forward-Dispersion Cellulose Acylate Film 301 comes to the liquid crystal cell side. These polarizing plates are disposed in a cross-Nicol arrangement where the transmission axis of the polarizing plate on the viewer side runs in the up/down direction and the transmission axis of the polarizing plate runs in the right/left direction. In this way, Liquid Crystal Display Device (A) is produced.

Also, Liquid Crystal Display Devices (B) to (N) of the present invention and Comparative Examples are produced by changing the film on the liquid crystal cell side of the upper polarizing plate as shown in Table 3 below.
[Evaluation of Liquid Crystal Display Device]

On Liquid Crystal Display Devices (A) to (N) produced above, the tint change between the azimuthal angle of 0° and the azimuthal angle of 80° is observed at a polar angle of 600. Furthermore, the presence or absence of light leakage when continuously lighted for 250 hours under an environment of 35° C. and 80% RH is confirmed. The results are shown in Table 3.

TABLE 3

| Liquid Crystal Display Device | Upper Polarizing Plate | Lower Polarizing Plate | Tint Change | Light Leakage[a] After Continuous Lighting for 250 Hours at 35° C.-80% RH | Remarks |
|---|---|---|---|---|---|
| (A) | 101 | 301 | small | C | Invention |
| (B) | 102 | 301 | small | C | Invention |
| (C) | 103 | 301 | small | B | Invention |
| (D) | 104 | 301 | small | B | Invention |
| (E) | 105 | 301 | small | C | Invention |
| (F) | 107 | 302 | small | A | Invention |
| (G) | 108 | 302 | small | A | Invention |
| (H) | 109 | 302 | medium | B | Invention |
| (I) | 110 | 302 | medium | A | Invention |
| (J) | 201 | 302 | small | D | Comparative Example |

TABLE 3-continued

| Liquid Crystal Display Device | Upper Polarizing Plate | Lower Polarizing Plate | Tint Change | Light Leakage[a] After Continuous Lighting for 250 Hours at 35° C.-80% RH | Remarks |
|---|---|---|---|---|---|
| (K) | 202 | 302 | large | D | Comparative Example |
| (L) | 203 | 301 | large | B | Comparative Example |
| (M) | 204 | 301 | large | B | Comparative Example |
| (N) | 205 | 301 | small | D | Comparative Example |

[a]A: No light leakage, B: Light leakage in an area of less than 10% of the entirety, C: Light leakage in an area of 5 to less than 10% of the entirety, D: Light leakage in an area of 10% or more of the entirety.

It is seen from the results in Table 3 that Liquid Crystal Display Devices (A) to (I) of the present invention are advantageously assured of small tint change depending on the viewing angle and less light leakage even when continuously lighted under high-temperature high-humidity conditions. Above all, Liquid Crystal Display Devices (F), (G) and (H) using Reverse-Dispersion Films (107) to (109) having a small thickness are advantageous in that light leakage does not occur even when continuously lighted under high-temperature high-humidity conditions. On the other hand, in Liquid Crystal Display Devices (J) and (N) of Comparative Examples, the tint change due to viewing angle is small, but there is a serious problem in the light leakage under high-temperature high-humidity conditions. Also, in Liquid Crystal Display Devices (L) and (M) of Comparative Examples, the light leakage under high-temperature high-humidity conditions is small but the tint change due to viewing angle is disadvantageously large.

Example 13

Preparation of Applying Solution

| <Applying Solution 1 for Coat Layer> | |
|---|---|
| Chlorine-containing polymer: R204 {"Saran Resin R204", produced by Asahi Kasei Life & Living Corp.} | 12 g |
| Tetrahydrofuran | 63 g |

<Applying Solution S1 for Undercoat Layer>
(Applying Solution for First Layer (for antistatic layer))

| | |
|---|---|
| Distilled water | 781.7 parts by weight |
| Polyacrylic resin (JURYMER ET-410, produced by Nihon Junyaku Co., Ltd., solid content: 30%) | 30.9 parts by weight |
| Tin oxide particle having an acicular structure (FS-10D, produced by Ishihara Sangyo Kaisha, Ltd., solid content: 20%) | 131.1 parts by weight |
| Carbodiimide compound (CARBODILITE V-02-L2, produced by Nisshinbo Industries, Inc., solid content: 40%) | 6.4 parts by weight |
| Surfactant (SANDET BL, produced by Sanyo Chemical Industries, Ltd., solid content: 44.6%) | 1.4 parts by weight |
| Surfactant (NAROACTY HN-100, produced by Sanyo Chemical Industries, Ltd., solid content: 100%) | 0.7 parts by weight |
| Silica fine particle liquid dispersion (SEAHOSTAR KE-W30, produced by Nippon Shokubai Co., Ltd., 0.3 μm, solid content: 20%) | 5.0 parts by weight |

(Applying Solution for Second Layer (for surface layer))

| | |
|---|---|
| Distilled water | 941.0 parts by weight |
| Polyacrylic resin (JURYMER ET-410, produced by Nihon Junyaku Co., Ltd., solid content: 30%) | 57.3 parts by weight |
| Epoxy compound (DENACOL EX-521, produced by Nagase Chemicals Ltd., solid content: 100%) | 1.2 parts by weight |
| Surfactant (SANDET BL, produced by Sanyo Chemical Industries, Ltd., solid content: 44.6%) | 0.5 parts by weight |

<Applying Solution S2 for Undercoat Layer>
(Applying Solution for First Layer)

| | |
|---|---|
| Distilled water | 823.0 parts by weight |
| Styrene-butadiene copolymer latex (Nipol Latex LX407C5, produced by Zeon Corp., solid content: 40%) | 151.5 parts by weight |
| 2,4-Dichloro-6-hydroxy-s-triazine sodium salt (H-232, produced by Sankyo Chemical Co., Ltd., solid content: 8%) | 25.0 parts by weight |
| Polystyrene fine particle (average particle diameter: 2 μm) (Nipol UFN1008, produced by Zeon Corp., solid content: 10%) | 0.5 parts by weight |

(Applying Solution for Second Layer)

| | |
|---|---|
| Distilled water | 982.4 parts by weight |
| Gelatin (alkali-treated) | 14.8 parts by weight |
| Methyl cellulose (TC-5, produced by Shin-Etsu Chemical Co., Ltd.) | 0.46 parts by weight |
| Compound (Cpd-21) | 0.33 parts by weight |
| Proxel (Cpd-22, solid content: 3.5%) | 2.0 parts by weight |

Compound (Cpd-21):

HO[CO(CH$_2$)$_4$CONH(CH$_2$)$_2$N(CH$_2$)$_2$NH]H·HCl
                            |
                            CH$_2$
                            |
                            CHOH
                            |
                            CH$_2$Cl

Cpd-22:

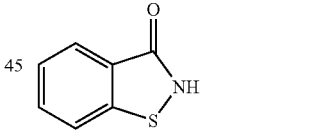

<Preparation of Applying Solution for Hardcoat Layer>
(Preparation of Sol Solution a-2)

In a 1,000 ml-volume reaction vessel equipped with a thermometer, a nitrogen inlet tube and a dropping funnel, 187 g (0.80 mol) of acryloxyoxypropyltrimethoxysilane, 27.2 g (0.20 mol) of methyltrimethoxysilane, 320 g (10 mol) of methanol and 0.06 g (0.001 mol) of KF are charged, and 15.1 g (0.86 mol) of water is gradually added dropwise with stirring at room temperature. After the completion of dropwise addition, the solution is stirred for 3 hours at room temperature and then heated with stirring for 2 hours under reflux of methanol. Thereafter, the low boiling point fraction is removed by distillation under reduced pressure, and the residue is filtered to obtain 120 g of Sol Solution a-2. The thus-obtained substance is measured by GPC, as a result, the mass average molecular weight is 1,500 and out of the oligomer or higher components, the proportion of the components having a molecular weight of 1,000 to 20,000 is 30%.

Also, from the $^1$H-NMR measurement results, the structure of the obtained substance is found to be a structure represented by the following formula.

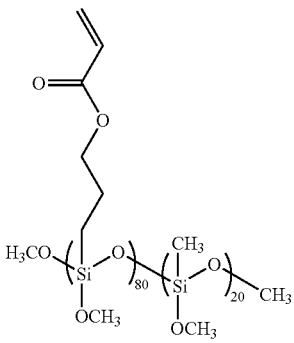

80:20 represents the molar ratio

Furthermore, the condensation ratio α by the $^{29}$Si-NMR measurement is 0.56. This analysis result reveals that a linear structure moiety occupies the majority of this silane coupling agent sol.

From the gas chromatography analysis, the residual ratio of the raw material acryloxypropyltrimethoxysilane is found to be 5% or less.

(1) Preparation of Applying Solution for Light-Scattering Layer

| Composition of Applying Solution 1 for Hardcoat Layer | |
|---|---|
| PET-30 | 40.0 g |
| DPHA | 10.0 g |
| Irgacure 184 | 2.0 g |
| SX-350 (30%) | 2.0 g |
| Crosslinked acryl-styrene particle (30%) | 13.0 g |
| FP-13 | 0.06 g |
| Sol Solution a-2 | 11.0 g |
| Toluene | 38.5 g |

The applying solution above is filtered through a polypropylene-made filter having a pore size of 30 μm to prepare Applying Solution 1 for Hardcoat Layer.

The compounds used are as follows.
PET-30:

A mixture of pentaerythritol triacrylate and pentaerythritol tetraacrylate [produced by Nippon Kayaku Co., Ltd.].
Irgacure 184:

A polymerization initiator [produced by Ciba Specialty Chemicals]
SX-350:

A crosslinked polystyrene particle having an average particle diameter of 3.5 μm [refractive index: 1.60, produced by Soken Kagaku K.K., a 30% toluene liquid dispersion, used after dispersion in a polytron dispersing machine at 10,000 rpm for 20 minutes]
Crosslinked Acryl-Styrene Particle:

Average particle diameter of 3.5 μm [refractive index: 1.55, produced by Soken Kagaku, K.K., a 30% toluene liquid dispersion, used after dispersion in a polytron dispersing machine at 10,000 rpm for 20 minutes]

FP-13: A Fluorine-Based Surface Modifier

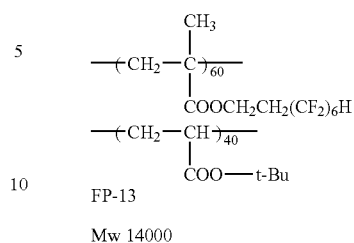

Mw 14000

(Preparation of Applying Solution for Low Refractive Index Layer)
(Synthesis of Perfluoroolefin Copolymer (1))
Perfluoroolefin Copolymer (1):

Perfluoroolefin Copolymer (1):

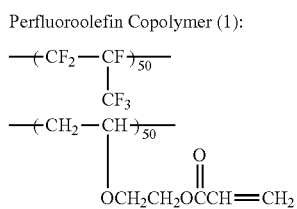

(50:50 represents the molar ratio)

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide are charged, and the inside of the system is degassed and displaced with nitrogen gas. Furthermore, 25 g of hexafluoropropylene (HFP) is introduced into the autoclave, and the temperature is elevated to 65° C. The pressure when the temperature in the autoclave reaches 65° C. is 0.53 MPa (5.4 kg/cm$^2$). The reaction is continued for 8 hours while keeping this temperature and when the pressure reaches 0.31 MPa (3.2 kg/cm$^2$), the heating is stopped and the system is allowed to cool. At the time when the inner temperature drops to room temperature, the unreacted monomer is expelled and the autoclave is opened to take out the reaction solution. The obtained reaction solution is poured in a large excess of hexane and after removing the solvent by decantation, the precipitated polymer is taken out. This polymer is dissolved in a small amount of ethyl acetate, and the residual monomer is completely removed by performing reprecipitation from hexane twice. After drying, 28 g of a polymer is obtained. Subsequently, 20 g of this polymer is dissolved in 100 ml of N,N-dimethylacetamide, and 11.4 g of acrylic acid chloride is added dropwise thereto under ice cooling, followed by stirring at room temperature for 10 hours. Thereafter, ethyl acetate is added to the reaction solution, and the resulting solution is washed with water. The organic layer is extracted and then concentrated, and the obtained polymer is reprecipitated from hexane to obtain 19 g of Perfluoroolefin Copolymer (1). The refractive index of the obtained polymer is 1.421.
(Preparation of Sol Solution)

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethyl acetate are added and mixed and after adding 30 parts of ion-exchanged water, the reaction is allowed to proceed at 60° C. for 4 hours. The reaction solution is cooled to room temperature to obtain Sol Solution a. The mass average molecular weight is 1,600 and out of the oligomer or higher components, the proportion of the components having a molecular weight of 1,000 to 20,000 is 100%. Also, the gas chromatography analysis reveals that the raw material acryloyloxypropyltrimethoxysilane is not remaining at all.

(Preparation of Applying Solution 1 for Low Refractive Index Layer)

A thermal crosslinking fluorine-containing polymer (13 g) (JTA113, solid content concentration: 6%, produced by JSR Corp.) containing polysiloxane and a hydroxyl group and having a refractive index of 1.44, 1.3 g of colloidal silica liquid dispersion MEK-ST-L (trade name, produced by Nissan Chemicals Industries, Ltd., average particle diameter: 45 nm, solid content concentration: 30%), 0.65 g of the sol solution prepared above, 4.4 g of methyl ethyl ketone and 1.2 g of cyclohexanone are added and after stirring, the resulting solution is filtered through a polypropylene-made filter having a pore size of 1 μm to prepare Applying Solution 1 for Low Refractive Index Layer. The refractive index of the layer formed of this applying solution is 1.45.

(Production of Protective Film 401 for Polarizing Plate)

(Applying of Undercoat Layer 1)

A rolled 80 μm-thick triacetyl cellulose film (TAC-TD80U, produced by Fuji Photo Film Co., Ltd.) is unrolled, and Applying Solution S1 for Undercoat Layer is coated on one surface (surface working out to the adhesion interface with the hardcoat layer) to have a dry thickness of 90 nm.

(Applying of Coat Layer)

The rolled 80 μm-thick triacetyl cellulose film (TAC-TD80U, produced by Fuji Photo Film Co., Ltd.) having provided thereon Undercoat Layer 1 is unrolled, and Applying Solution 1 for Coat Layer is coated using a coater having a throttle die by directly extruding the solution on the Undercoat Layer S1-coated surface of the polarizing plate protective film on a backup roll. The solution is coated under the condition of a conveying speed of 30 m/min, and after dried at 100° C. for 5 minutes, the film is taken up.

(Applying of Undercoat Layer 2)

The rolled 80 μm-thick triacetyl cellulose film (TAC-TD80U, produced by Fuji Photo Film Co., Ltd.) having provided thereon Undercoat Layer 1 and a coat layer is unrolled, and Applying Solution S2 for Undercoat Layer is coated to have a dry thickness of 90 nm.

(Applying of Hardcoat Layer)

The rolled 80 μm-thick triacetyl cellulose film (TAC-TD80U, produced by Fuji Photo Film Co., Ltd.) having provided thereon Undercoat Layer 1, a coat layer and Undercoat Layer 2 is unrolled, and Applying Solution 1 for Hardcoat Layer is coated using a coater having a throttle die by directly extruding the solution on Undercoat Layer 2 of the polarizing plate protective film on the backup roll. The solution is coated under the condition of a conveying speed of 30 m/min and after drying at 30° C. for 15 seconds and at 90° C. for 20 seconds, the coated layer is cured by irradiating thereon an ultraviolet ray at an irradiation dose of 90 mJ/cm$^2$ with use of an air-cooled metal halide lamp (manufactured by Eye Graphics Co., Ltd.) of 160 W/cm under nitrogen purging to form a 6 μm-thick antiglare layer having an antiglare property. The resulting film is taken up.

(Applying of Low Refractive Index Layer)

The rolled 80 μm-thick triacetyl cellulose film (TAC-TD80U, produced by Fuji Photo Film Co., Ltd.) having provided thereon Undercoat Layer 1, a coat layer, Undercoat Layer 2 and a hardcoat layer is unrolled, and Applying Solution 1 for Low Refractive Index Layer is coated using a coater having a throttle die by directly extruding the solution on the hardcoat layer-coated surface of the polarizing plate protective film on the backup roll. After drying at 120° C. for 150 seconds and further at 140° C. for 8 minutes, an ultraviolet ray at an irradiation dose of 300 mJ/cm$^2$ is irradiated thereon using an air-cooled metal halide lamp (manufactured by Eye Graphics Co., Ltd.) of 240 W/cm in an atmosphere having an oxygen concentration reduced to 0.1% by nitrogen purging, to form a 100 nm-thick low refractive index layer, and the resulting film is taken up. In this way, Polarizing Plate Protective Film 401 is produced.

(Saponification Treatment of Polarizing Plate Protective Film 401)

Polarizing Plate Protective Film 401 produced above is subjected to a saponification treatment in the same manner as in Example 7.

(Production of Polarizing Plate 401)

Polarizing Plate 401 is produced in the same manner as in Example 11 except that in the production of Polarizing Plate 107 of Example 11, the protective film laminated to the opposite side to Resin Film 107 of the present invention with respect to the polarizer is changed to Polarizing Plate Protective Film 401. The film is laminated such that the surface not coated with the moisture-resistant layer (coat layer) comes into contact with the polarizer.

(Production and Evaluation of Liquid Crystal Display Device 401)

Liquid Crystal Display Device O is produced in the same manner as in Example 12 except that in the production of Liquid Crystal Display Device F of Example 12, Polarizing Plate 107 is changed to Polarizing Plate 401. The thus-produced Liquid Crystal Display Device O is lighted for 500 hours in an environment of 50% and 90% RH and thereafter, the presence or absence of display unevenness is confirmed. As a result, display unevenness is not confirmed with an eye on Liquid Crystal Display Device O of the present invention, and this is particularly preferred.

According to the present invention, a resin film with Re having reverse dispersion, which is assured of small photoelastic coefficient, excellent adhesion to the polarizer and low humidity dependence of retardation, and a production method can be provided.

Also, according to the present invention, a polarizing plate and a liquid crystal display device, ensuring that by virtue of using the resin film, tint change depending on the viewing angle is small and even when used under high-temperature high-humidity conditions, display unevenness, light leakage and tint change scarcely occur, can be provided.

The entire disclosure of each and every foreign patent application from which the benefit of foreign priority has been claimed in the present application is incorporated herein by reference, as if fully set forth.

What is claimed is:
1. A liquid crystal display device comprising:
  a liquid crystal cell; and
  two polarizing plates, between which the liquid crystal cell is sandwiched, and each of which comprises:
    a polarizer; and
    two protective films, between which the polarizer is sandwiched, wherein one of two protective films on the liquid crystal cell side of the four protective films is a resin film having:

a photoelastic coefficient of from 0 to $30\times10^{-8}$ cm$^2$/N; and Re satisfying the following formulae (1) to (4):

$$20\ nm < Re(548) < 300\ nm \qquad \text{Formula (1)}$$

$$0.5 < Re(446)/Re(548) < 1 \qquad \text{Formula (2)}$$

$$1.0 < Re(629)/Re(548) < 2.0 \qquad \text{Formula (3)}$$

$$0.1\% \leq [\{Re(548)\ \text{at}\ 25°\ \text{C.},\ 10\%\ RH - Re(548)\ \text{at}\ 25°\ \text{C.},\ 80\%\ RH\}/Re(548)\ \text{at}\ 25°\ \text{C.},\ 60\%\ RH] \leq 20\%, \qquad \text{Formula (4)}$$

wherein Re(λ) represents an in-plane retardation at a wavelength of λ, and the other of two protective films on the liquid crystal cell side of the four protective films satisfies the following formulae (8) to (12):

$$0\ nm < Re(548) < 10\ nm \qquad \text{Formula (8)}$$

$$100\ nm < Rth(548) < 300\ nm \qquad \text{Formula (9)}$$

$$10 < Rth(548)/Re(548) \qquad \text{Formula (10)}$$

$$1.0 < Rth(446)/Rth(548) < 2.0 \qquad \text{Formula (11)}$$

$$0.5 < Rth(629)/Rth(548) < 1.0, \qquad \text{Formula (12)}$$

wherein Re(λ) represents an in-plane retardation at a wavelength of λ, and Rth(λ) represents a retardation in a thickness-direction at a wavelength of λ.

2. The liquid crystal display device according to claim 1, wherein the liquid crystal cell is a VA-mode liquid crystal cell.

3. The liquid crystal display device according to claim 1, wherein the resin film has:
Re and a film thickness satisfying the following formula (5):

$$0.00125 < Re(548)/\text{film thickness} < 0.00700. \qquad \text{Formula (5)}$$

4. The liquid crystal display device according to claim 1, wherein the resin film comprises:
at least one liquid crystalline compound in an amount of 0.1 to 30 mass %,
wherein a mass ratio of the liquid crystalline compound to all additives is from 40 to 100 mass %.

5. The liquid crystal display device according to claim 4, wherein the resin film comprises:
a mixture of two or more kinds of liquid crystalline compounds in an amount of 0.1 to 30 mass %,
wherein a mass ratio of the two or more kinds of liquid crystalline compounds to all additives is from 50 to 100 mass %.

6. The liquid crystal display device according to claim 5, wherein the two or more kinds of liquid crystalline compounds in an amount of 0.1 to 30 mass % comprises:
a compound represented by formula (1) in an amount of 0.1 to 30 mass %; and
a rod-like compound represented by formula (i) in an amount of 0.1 to 30 mass %:

Formula (I):

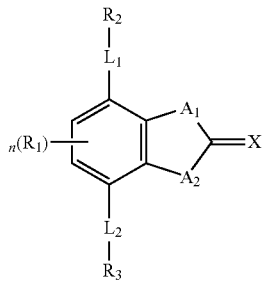

wherein $L_1$ and $L_2$ each independently represents a single bond or a divalent linking group, $A_1$ and $A_2$ each independently represents a group selected from the group consisting of —O—, —NR—, —S— and —CO—, wherein R represents a hydrogen atom or a substituent $R_1$, $R_2$ and $R_3$ each independently represents a substituent, X represents =O, =S, =NR or =C(R)R wherein R represents a hydrogen atom or a substituent, and n represents an integer of 0 to 2; and $$Ar^1\text{-}L^2\text{-}X\text{-}L^3\text{-}Ar^2 \qquad \text{Formula (i)}$$

wherein $Ar^1$ and $Ar^2$ each independently represents an aromatic group, $L^2$ and $L^3$ each independently represents a divalent linking group selected from the group consisting of a —O—CO— group and a —CO—O— group, and X represents 1,4-cyclohexylene group, a vinylene group or an ethynylene group.

7. The liquid crystal display device according to claim 1, wherein the resin film comprises:
a cellulose acylate as a main component.

* * * * *